(12) United States Patent
Fujisawa et al.

(10) Patent No.: US 10,723,264 B2
(45) Date of Patent: Jul. 28, 2020

(54) INFORMATION PRESENTATION APPARATUS

(71) Applicant: DENSO CORPORATION, Kariya, Aichi-pref. (JP)

(72) Inventors: Yuki Fujisawa, Kariya (JP); Hiroaki Tanaka, Kariya (JP); Ifushi Shimonomoto, Kariya (JP); Mitsuo Tamagaki, Kariya (JP); Takuya Mori, Kariya (JP); Akira Kamiya, Kariya (JP); Takeshi Kawashima, Kariya (JP); Akihiro Hayashi, Kariya (JP); Takuya Kume, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 235 days.

(21) Appl. No.: 15/562,712

(22) PCT Filed: Mar. 29, 2016

(86) PCT No.: PCT/JP2016/001816
§ 371 (c)(1),
(2) Date: Sep. 28, 2017

(87) PCT Pub. No.: WO2016/157892
PCT Pub. Date: Oct. 6, 2016

(65) Prior Publication Data
US 2018/0086346 A1 Mar. 29, 2018

(30) Foreign Application Priority Data

Apr. 3, 2015 (JP) .................................. 2015-77088
Mar. 11, 2016 (JP) .................................. 2016-48661

(51) Int. Cl.
*B60Q 9/00* (2006.01)
*B62D 15/02* (2006.01)
(Continued)

(52) U.S. Cl.
CPC .............. *B60Q 9/008* (2013.01); *B60K 35/00* (2013.01); *B60K 37/00* (2013.01); *B60Q 3/18* (2017.02);
(Continued)

(58) Field of Classification Search
CPC . B60Q 9/008; B60Q 3/18; B60Q 3/54; B60Q 3/78; B60R 16/02; G08G 1/165;
(Continued)

(56) References Cited

U.S. PATENT DOCUMENTS 6,614,344 B1 * 9/2003 Frasher ................ B60N 2/0252
340/425.5
8,144,002 B2 * 3/2012 Kiuchi ................... G08G 1/166
340/435
(Continued)

FOREIGN PATENT DOCUMENTS

JP 200563105 A 3/2005
JP 2005326292 A 11/2005
(Continued)

*Primary Examiner* — Adam R Mott
*Assistant Examiner* — Seyyed Mustafa Sahafeyan
(74) *Attorney, Agent, or Firm* — Maschoff Brennan

(57) ABSTRACT

An information presentation apparatus is provided. A light emission device and a HCU are mounted on a vehicle as the information presentation apparatus. The light emission device is arranged on an instrument panel, and displays at least one light emission spot in a linear light emission area arranged to extend in a width direction of the vehicle. The HCU acquires monitoring information including at least position information of the risk target detected by the peripheral monitoring device, and calculates a risk level of the risk target, detected in a traveling direction of the vehicle, based on the monitoring information. When detecting a plurality of the risk targets, the HCU selects one of the risk targets having a highest risk level as a highest risk
(Continued)

target, and displays the light emission spot, indicative of a direction of the highest risk target, in the linear light emission area.

16 Claims, 28 Drawing Sheets

(51) Int. Cl.
```
G08G 1/16      (2006.01)
G08G 1/0962    (2006.01)
G02B 27/01     (2006.01)
B60Q 3/78      (2017.01)
B60K 35/00     (2006.01)
B60K 37/00     (2006.01)
B60Q 3/54      (2017.01)
B60Q 3/18      (2017.01)
B60W 40/08     (2012.01)
B60R 16/02     (2006.01)
B60W 30/08     (2012.01)
B60W 40/04     (2006.01)
B60W 50/14     (2020.01)
```

(52) U.S. Cl.
CPC .............. *B60Q 3/54* (2017.02); *B60Q 3/78* (2017.02); *B60R 16/02* (2013.01); *B60W 30/08* (2013.01); *B60W 40/04* (2013.01); *B60W 40/08* (2013.01); *B60W 50/14* (2013.01); *B62D 15/021* (2013.01); *B62D 15/025* (2013.01); *B62D 15/029* (2013.01); *B62D 15/0255* (2013.01); *G02B 27/01* (2013.01); *G08G 1/0962* (2013.01); *G08G 1/165* (2013.01); *G08G 1/166* (2013.01); *B60K 2370/178* (2019.05); *B60K 2370/194* (2019.05); *B60K 2370/338* (2019.05); *B60W 2040/0872* (2013.01); *G02B 2027/0141* (2013.01)

(58) Field of Classification Search
CPC ..... G08G 1/166; G08G 1/0962; B60W 50/14; B60W 40/04; B60W 30/08; B60W 40/08; B60W 2040/0872; B62D 15/025; B62D 15/021; B62D 15/029; B62D 15/0255; B60K 2370/338; B60K 2370/178; B60K 2370/194; B60K 37/00; B60K 35/00; G02B 2027/0141; G02B 27/01
See application file for complete search history.

(56) References Cited

U.S. PATENT DOCUMENTS

| | | | | |
|---|---|---|---|---|
| 8,447,072 | B2* | 5/2013 | Takahashi | G08G 1/167 382/103 |
| 2004/0150514 | A1* | 8/2004 | Newman | B60Q 9/008 340/435 |
| 2007/0069872 | A1* | 3/2007 | Arakawa | B60Q 9/008 340/435 |
| 2007/0076958 | A1* | 4/2007 | Venkatesh | G06K 9/00604 382/218 |
| 2008/0060497 | A1* | 3/2008 | Lambert | B60K 28/02 84/307 |
| 2009/0022368 | A1* | 1/2009 | Matsuoka | B60K 35/00 382/103 |
| 2009/0058678 | A1* | 3/2009 | Matsuoka | B60Q 9/008 340/904 |
| 2009/0147080 | A1* | 6/2009 | Inada | G06K 9/00604 348/77 |
| 2009/0187343 | A1* | 7/2009 | Koch-Groeber | B60K 35/00 701/301 |
| 2009/0273687 | A1* | 11/2009 | Tsukizawa | G06F 3/012 348/222.1 |
| 2009/0303078 | A1* | 12/2009 | Mochizuki | B60W 40/02 340/901 |
| 2010/0007479 | A1* | 1/2010 | Smith | B60K 28/066 340/436 |
| 2010/0020170 | A1* | 1/2010 | Higgins-Luthman | B60Q 1/1423 348/135 |
| 2010/0253594 | A1* | 10/2010 | Szczerba | G01S 13/723 345/7 |
| 2011/0260846 | A1* | 10/2011 | Mochizuki | B60Q 9/008 340/435 |
| 2012/0065841 | A1* | 3/2012 | Nagata | B60W 50/06 701/36 |
| 2012/0068859 | A1* | 3/2012 | Mochizuki | G08G 1/161 340/903 |
| 2012/0081236 | A1* | 4/2012 | Best | G02B 27/0093 340/945 |
| 2012/0083974 | A1* | 4/2012 | Sandblom | A61B 5/18 701/45 |
| 2012/0268262 | A1* | 10/2012 | Popovic | B60Q 9/008 340/438 |
| 2013/0169785 | A1* | 7/2013 | Matthews | B60Q 9/008 348/77 |
| 2013/0249395 | A1* | 9/2013 | Hatakeyama | B60K 35/00 315/77 |
| 2013/0249684 | A1* | 9/2013 | Hatakeyama | B60K 35/00 340/435 |
| 2013/0342337 | A1* | 12/2013 | Kiefer | G08B 6/00 340/438 |
| 2014/0139655 | A1* | 5/2014 | Mimar | G08B 21/06 348/77 |
| 2014/0346823 | A1* | 11/2014 | Stebbins | B60Q 9/008 297/217.1 |
| 2015/0009046 | A1* | 1/2015 | Senfleben | G09F 21/04 340/901 |
| 2015/0138043 | A1* | 5/2015 | Rawlinson | B60R 11/0235 345/2.2 |
| 2015/0193664 | A1* | 7/2015 | Marti | G06K 9/00845 382/103 |
| 2015/0266486 | A1* | 9/2015 | Silvlin | B60W 40/09 701/70 |
| 2016/0110618 | A1* | 4/2016 | Oba | G06K 9/00805 348/148 |
| 2016/0152182 | A1* | 6/2016 | Aoki | B60W 50/14 340/435 |
| 2016/0288709 | A1* | 10/2016 | Nespolo | B60Q 9/008 |
| 2016/0379498 | A1* | 12/2016 | Aoki | G08G 1/166 340/436 |
| 2017/0050542 | A1* | 2/2017 | Shigeta | G02B 27/0149 |

FOREIGN PATENT DOCUMENTS

| | | |
|---|---|---|
| JP | 2012113672 A | 6/2012 |
| JP | 2014240228 A | 12/2014 |
| JP | 2014240229 A | 12/2014 |

* cited by examiner

INFORMATION PRESENTATION APPARATUS

CROSS REFERENCE TO RELATED APPLICATIONS

This application is based on Japanese Patent Applications No. 2015-77088 filed on Apr. 3, 2015, and No. 2016-48661 filed on Mar. 11, 2016, the disclosures of which are incorporated herein by reference.

TECHNICAL FIELD

The present disclosure relates to an information presentation apparatus which presents vehicle information to a driver.

BACKGROUND ART

For example, a vehicle display device disclosed in Patent Literature 1 includes an instrument display provided on an instrument panel of a vehicle. The instrument display is capable of displaying a plurality of images around the vehicle, and a marker which shifts in a width direction of the vehicle. The vehicle display device in Patent Literature 1 selects an attention image requiring attention of a driver, and guides the visual line of the driver by a shift of the marker toward the attention image.

PRIOR ART LITERATURES

Patent Literature

Patent Literature 1: JP-2012-113672-A

SUMMARY OF INVENTION

According to the vehicle display device disclosed in Patent Literature 1, however, no process is performed for calculating a risk level of each risk target requiring attention of the driver. Accordingly, in such a scene where a plurality of risk targets, such as an oncoming vehicle on the opposite lane and a pedestrian crossing a crosswalk, are detected, for example, the vehicle display device of Patent Literature 1 displays both a marker shifting toward an attention image showing the oncoming vehicle, and an arrow attracting attention to the crossing pedestrian. Attention is therefore simultaneously attracted to the plurality of risk targets regardless of the respective risk levels. In this case, however, it may become difficult to attract attention of the driver to an important risk target.

In view of the above points, it is an object of the present disclosure to provide an information presentation apparatus capable of accurately attracting attention of a driver to an important risk target even in such a scene where a plurality of risk targets are detected.

According to an aspect of the present disclosure, an information presentation apparatus is mounted on a vehicle together with a peripheral monitoring device for detecting a risk target, to which a driver should pay attention, and presents information about the vehicle to the driver. The information presentation apparatus includes: a light emission display unit that is disposed on an instrument panel of the vehicle, and displays at least one light emission spot in a light emission area arranged to extend in a width direction of the vehicle; a light emission control unit that controls a light emission mode of the light emission spot in the light emission area; an information acquisition unit that acquires monitoring information including at least position information of the risk target detected by the peripheral monitoring device; and a risk calculation unit that calculates a risk level of the risk target, detected in an area along a traveling direction of the vehicle, based on the monitoring information acquired by the information acquisition unit. When the peripheral monitoring device detects a plurality of the risk targets, the light emission control unit selects one of the risk targets having a highest risk level calculated by the risk calculation unit as a highest risk target, and displays the light emission spot, indicative of a direction of the highest risk target as viewed from the driver, in the light emission area.

According to this information presentation apparatus, the light emission control unit selects a highest risk target at a highest risk level from the plurality of risk targets when the plurality of risk targets are detected by the peripheral monitoring device as risk targets requiring attention of the driver. In this case, the light emission spot indicating the direction of the highest risk target as viewed from the driver is displayed in the light emission display area of the light emission display unit.

According to this example, attention is not easily attracted toward a risk target at a relatively low risk level in the plurality of risk targets, but is attracted toward a risk target at a high risk level with priority, depending on the light emission spot. Accordingly, attention of the driver is accurately attracted by the information presentation apparatus toward an important risk target even in such a scene where a plurality of risk targets are detected.

BRIEF DESCRIPTION OF DRAWINGS

The above and other objects, features and advantages of the present disclosure will become more apparent from the following detailed description made with reference to the accompanying drawings. In the drawings.

EMBODIMENTS

A plurality of embodiments are hereinafter described with reference to the drawings. Equivalent elements in the respective embodiments are given identical reference numbers to omit some repeated description. When configurations are only partially described in the respective embodiments, the remaining parts not described may be understood from the corresponding configurations of the other embodiments already described. In addition, in combining configurations described in the plurality of embodiments, not only combinations explicitly described in the respective embodiments, but also partial combinations not explicitly described may be made as long as no problem particularly occurs. It is assumed that not explicit combinations of the configurations included in the plurality of embodiments and modified examples have been similarly disclosed in the following description.

First Embodiment

Figure 1:
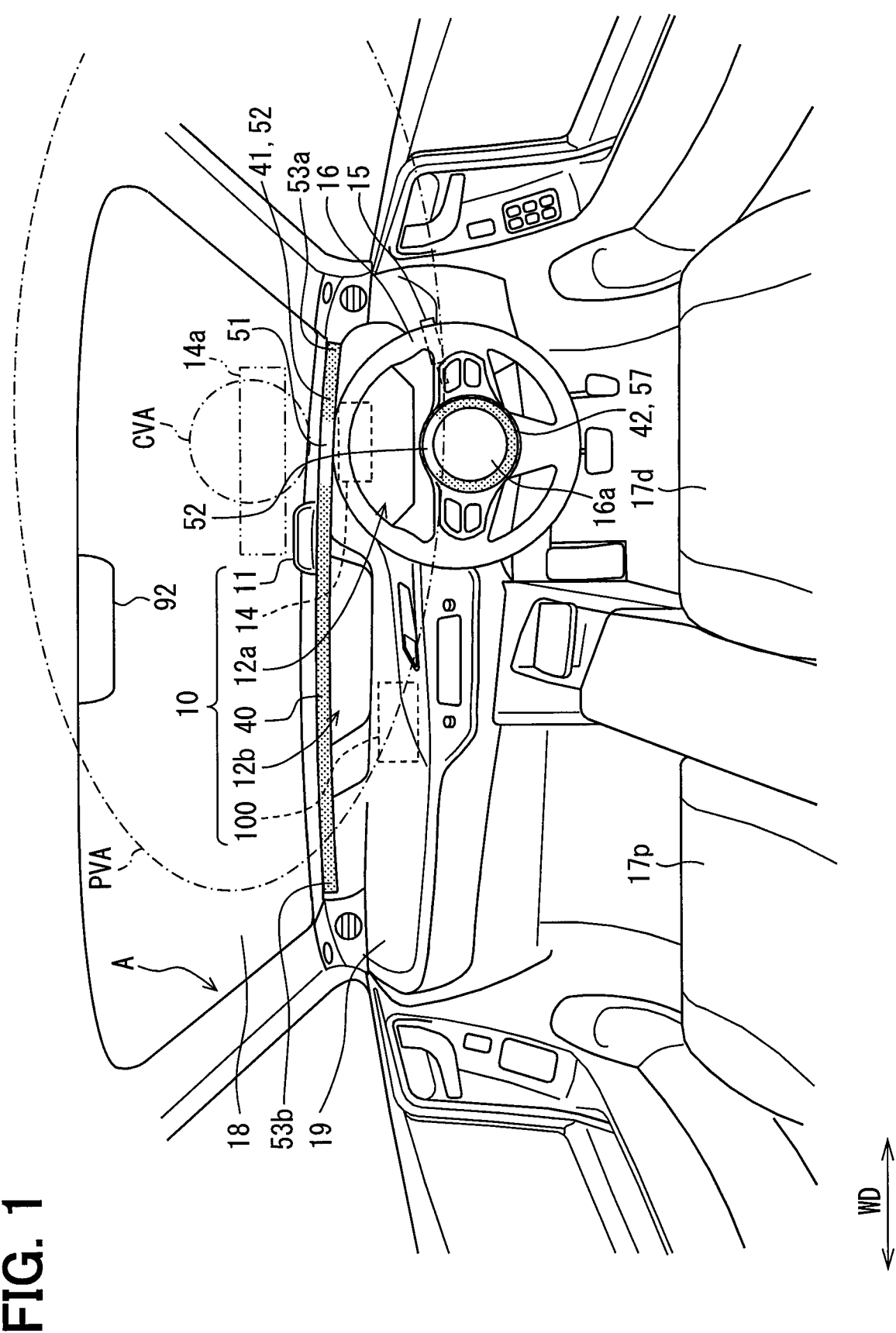
FIG. 1 is a view illustrating a layout of a driver's seat and its surroundings in a self-vehicle.
Figure 2:
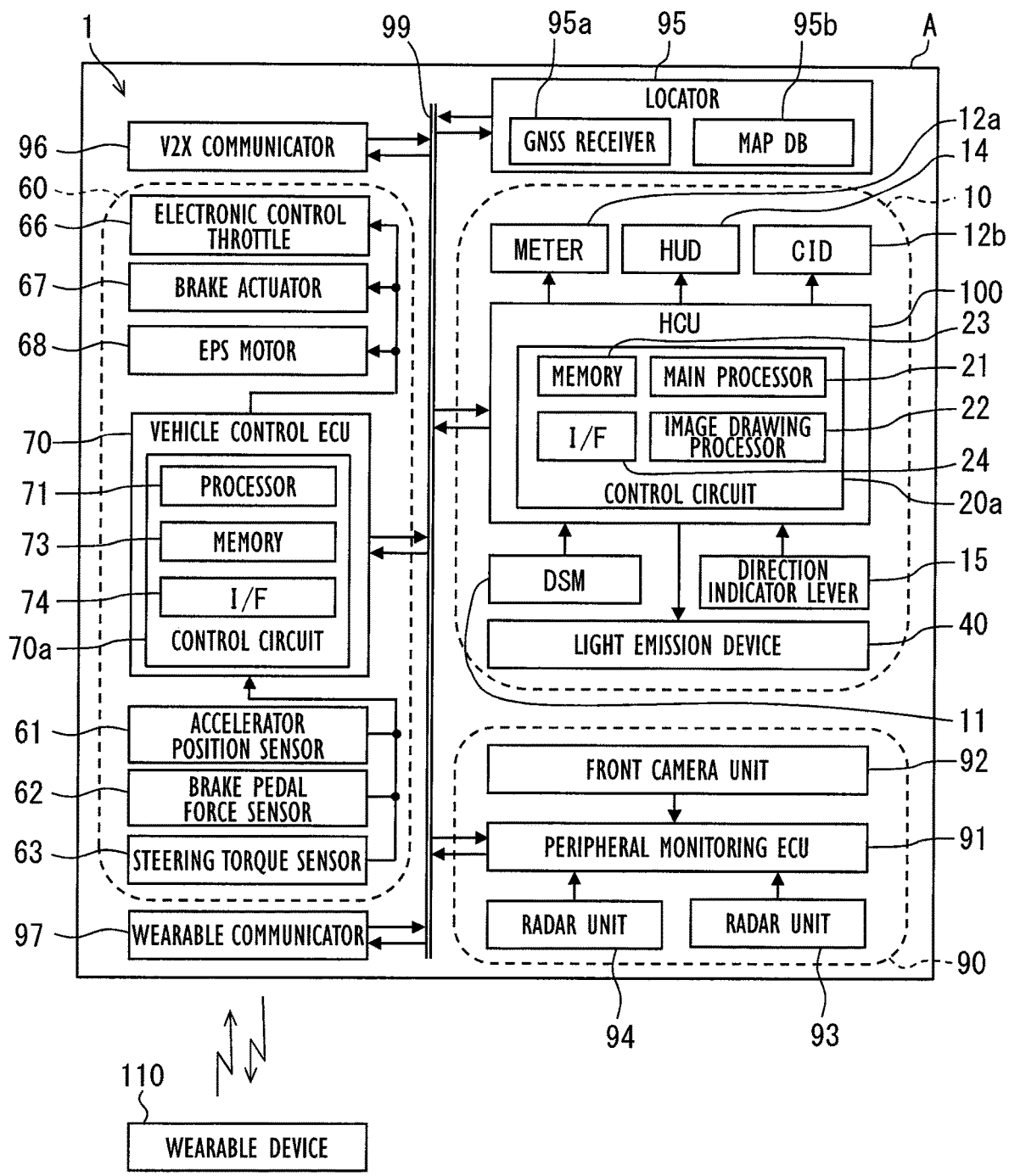
FIG. 2 is a block diagram showing a general configuration of a vehicle onboard network.

As illustrated in FIGS. 1 and 2, a human machine interface (HMI) control unit (HCU) 100 according to a first embodiment is an electronic device mounted on a self-vehicle A. The HCU 100 constitutes one of a plurality of nodes included in a vehicle onboard network 1. The vehicle onboard network 1 is configured by an external recognition system 90, a locator 95, a V2X communicator 96, a vehicle control system 60, a wearable communicator 97, an HMI system 10, a communication bus 99 to which these components are connected, and others.

The external recognition system 90 includes external sensors such as a front camera unit 92 and radar units 93 and 94, and a peripheral monitoring electronic control unit (ECU) 91 to detect a risk target requiring attention of the driver. More specifically, the external recognition system 90 detects a moving object such as a pedestrian, an animal other than a human, a bicycle, a motorcycle, and other vehicles, and further detects a stationary object such as a falling object on a road, a traffic signal, a guard rail, a curb, a road sign, a road marking, a mark lane, and a tree. The external recognition system 90 may include an external sensor such as a laser imaging detection and ranging (LIDAR), sound navigation and ranging (SONAR), in addition to the units 92 to 94.

The front camera unit 92 is a monocular or compound-eye camera provided in the vicinity of a back mirror of the self-vehicle A, for example. The front camera unit 92 faces in a traveling direction of the self-vehicle A, and is capable of imaging a range of approximately 80 meters from the self-vehicle A at a horizontal viewing angle of approximately 45 degrees, for example. The front camera unit 92 sequentially outputs data indicating a captured image of a moving object or a stationary object to the peripheral monitoring ECU 91.

The radar unit 93 is provided on a front portion of the self-vehicle A, for example. The radar unit 93 emits millimeter waves in a band of 77 GHz in the traveling direction of the self-vehicle A from a transmission antenna. The radar unit 93 receives, via a reception antenna, millimeter waves reflected on a moving object, a stationary object, or the like present in the traveling direction. The radar unit 93 scans a range of approximately 60 meters from the self-vehicle A at a horizontal scanning angle of approximately 55 degrees, for example. The radar unit 93 sequentially outputs a scanning result indicating a reception signal to the peripheral monitoring ECU 91.

The radar units 94 are provided on a left and a right part of a rear portion of the self-vehicle A, respectively, for example. Each of the radar units 94 emits near millimeter waves in a band of 24 GHz from a transmission antenna toward the rear side of the self-vehicle A. Each of the radar units 94 receives, via a reception antenna, near millimeter waves reflected on a moving object, a stationary object, and the like present on the rear side. Each of the radar units 94 scans a range of approximately 30 meters from the self-vehicle A at a horizontal scanning angle of approximately 120 degrees, for example. Each of the radar units 94 sequentially outputs a scanning result based on a reception signal to the peripheral monitoring ECU 91.

The peripheral monitoring ECU 91 is mainly configured by a microcomputer including a processor and a memory. The peripheral monitoring ECU 91 is communicatively connected to the front camera unit 92, the radar units 93 and 94, and the communication bus 99. The peripheral monitoring ECU 91 combines items of information acquired from the respective units 92 and 93 to detect relative positions or the like of a moving object and a stationary object present in the traveling direction (hereinafter referred to as "detection objects"). The peripheral monitoring ECU 91 further detects relative positions or the like of detection objects present on the rear side based on information acquired from the radar units 94. The peripheral monitoring ECU 91 outputs monitoring information which includes relative position information indicating relative positions of vehicles traveling ahead and parallel around the self-vehicle A, relative position information indicating relative positions of pedestrians or the like present around the self-vehicle A, and shape information indicating shapes of mark lanes in the traveling direction of the self-vehicle A, and others, to the communication bus 99.

The locator 95 includes a global navigation satellite system (GNSS) receiver 95a, a map database 95b, an inertial sensor, and the like. The GNSS receiver 95a receives positioning signals transmitted from a plurality of artificial satellites. The locator 95 measures a position of the self-vehicle A by combining a positioning signal received via the GNSS receiver 95a and a measurement result obtained by the inertial sensor. The map database 95b includes a storage medium that stores a large number of items of map information. The locator 95 supplies position information indicating the position of the self-vehicle A, and map information indicating surroundings or traveling direction of the self-vehicle A to the vehicle control system 60 and the HMI system 10 via the communication bus 99.

The V2X communicator 96 exchanges information with an in-vehicle communicator mounted on a different vehicle, and a roadside device provided on a roadside to wireless communication. The V2X communicator 96 acquires monitoring information, which includes at least position information indicating positions of risk targets, such as a different vehicle and a pedestrian, difficult to be directly viewed by the driver, through road-to-vehicle communication with a roadside device provided at an intersection or other places, for example. The V2X communicator 96 sequentially outputs acquired information to the communication bus 99.

The vehicle control system 60 includes detection sensors that detect a driving operation, such as an accelerator position sensor 61, a brake pedal force sensor 62, and a steering torque sensor 63. The vehicle control system 60 further includes traveling control devices such as an electronic control throttle 66, a brake actuator 67, and an electric power steering (EPS) motor 68, and includes a vehicle control ECU 70. The vehicle control system 60 controls traveling of the self-vehicle A, based on a driving operation by a driver, monitoring information acquired by the external recognition system 90, and others.

The accelerator position sensor 61 detects a depression amount of an accelerator pedal depressed by the driver, and outputs the detected amount to the vehicle control ECU 70. The brake pedal force sensor 62 detects a force applied to the brake pedal by the driver, and outputs the detected force to the vehicle control ECU 70. The steering torque sensor 63 detects steering torque applied to a steering wheel (hereinafter referred to as steering) 16 by the driver, and outputs the detected steering torque to the vehicle control ECU 70.

The electronic control throttle 66 controls a throttle position, based on a control signal output from the vehicle control ECU 70. The brake actuator 67 controls a braking force generated by brake pressure in accordance with a control signal of the vehicle control ECU 70, and applied to wheels. The EPS motor 68 controls steering force and steering retention force applied to a steering mechanism in accordance with control signals output from the vehicle control ECU 70.

The vehicle control ECU 70 is constituted by one or a plurality of units selected from a power unit control ECU, a brake control ECU, an integration control ECU, and others. The vehicle control ECU 70 includes at least the integration control ECU. A control circuit 70a of the vehicle control ECU 70 includes a processor 71, a rewritable non-volatile memory 73, an input/output interface 74 through which information is input or output, and a bus for connecting these components, for example. The vehicle control ECU 70 is connected to the sensors 61 to 63 and traveling control devices. The vehicle control ECU 70 receives detection signals output from the respective sensors 61 to 63, and outputs control signals to the respective traveling control devices. The vehicle control ECU 70 is further connected to the communication bus 99 to communicate with the HCU 100 and the peripheral monitoring ECU 91.

Figure 3:
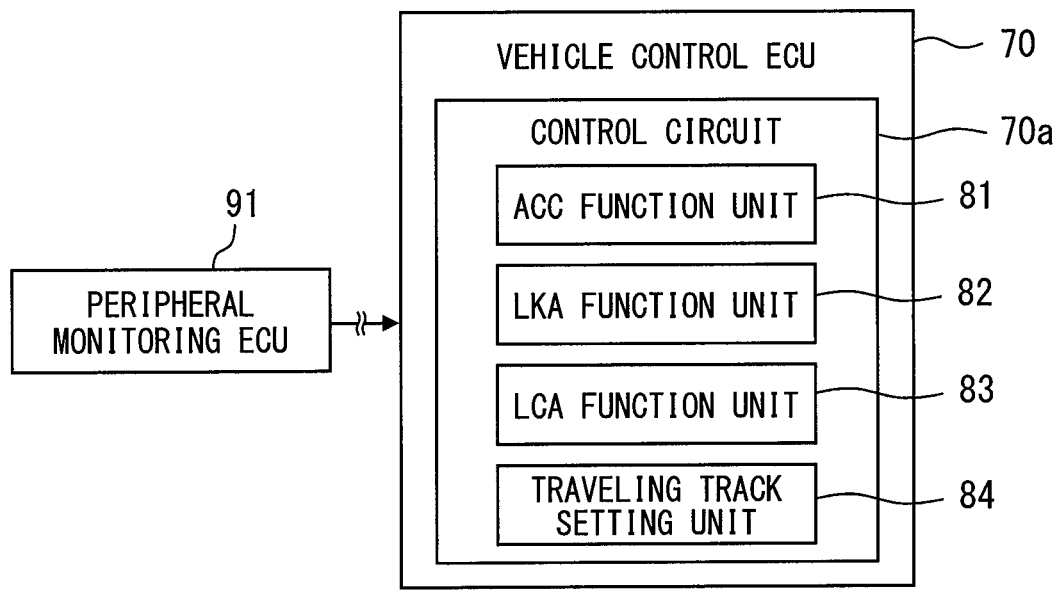
FIG. 3 is a diagram showing function blocks constituted in a control circuit of a vehicle control ECU.

The vehicle control ECU 70 performs a plurality of driving assist functions for controlling a driving force, a braking force, a steering force, and the like of the self-vehicle A to assist or substitute for a driving operation performed by the driver. As shown in FIG. 3, the vehicle control ECU 70 constitutes a plurality of function blocks (81 to 84) for realizing the driving assist functions under vehicle control programs stored in the memory 73 and executed by the processor 71. The vehicle control ECU 70 is capable of outputting, to the communication bus 99, operation information about the driving assist functions performed by the respective function blocks.

An adaptive cruise control (ACC) function unit 81 adjusts a driving force and a braking force, based on monitoring information acquired from the peripheral monitoring ECU 91 and indicating information about a vehicle traveling ahead to realize an ACC function for controlling a traveling speed of the self-vehicle A (see FIG. 1). The ACC assists or substitutes for an acceleration/deceleration operation included in a plurality of driving operations performed by the driver. The ACC function unit 81 drives the self-vehicle A at a target speed set by the driver in a state that no vehicle traveling ahead is detected. In a state that a vehicle traveling ahead is detected, however, the ACC function unit 81 controls traveling of the self-vehicle A such that the self-vehicle A follows the vehicle traveling ahead with a constant distance kept between the self-vehicle A and the vehicle traveling ahead.

A lane keeping assist (LKA) function unit 82 adjusts a steering force to realize a LKA function for controlling a steering angle of the steering wheel of the self-vehicle A (see FIG. 1). The LKA assists or substitutes for steering included in a plurality of driving operations performed by the driver. The LKA function unit 82 generates a steering force in a direction preventing approach toward a mark lane to maintain the self-vehicle A within a traveling lane and allow the self-vehicle A to travel along the lane.

A lane change assist (LCA) function unit 83 realizes an automatic lane change function for shifting the self-vehicle A (see FIG. 1) from current traveling lane to adjacent lane. The automatic lane change is realizable during operation of the LKA, and assists or substitutes for steering by the driver similarly to the LKA. The LCA function unit 83 shifts the self-vehicle A to an adjacent lane by generating a steering force in a direction toward an adjacent lane in a state that a lane change is allowable.

A traveling track setting unit 84 calculates an expected traveling track of the self-vehicle A, based on shape information indicating a mark lane in the traveling direction and acquired from the peripheral monitoring ECU 91. The traveling track setting unit 84 calculates a target steering direction and a target steering amount appropriate for the self-vehicle to travel along the expected traveling track. The LKA function unit 82 and the LCA function unit 83 control steering based on the target steering direction and the target steering amount calculated by the traveling track setting unit 84. The traveling track setting unit 84 is capable of outputting steering information indicating the target steering direction and the target steering amount to the communication bus 99. The traveling track setting unit 84 is capable of calculating the steering information and outputs the steering information to the communication bus 99 even in a state that the LKA function unit 82 and the LCA function unit 83 are not operating.

The wearable communicator 97 illustrated in FIGS. 1 and 2 is mounted on the self-vehicle A, and communicatively connected to the communication bus 99. The wearable communicator 97 includes an antenna for realizing wireless communication. The wearable communicator 97 is capable of wirelessly communicating with a wearable device 110 present in an interior of the self-vehicle A via a wireless local area network (LAN) and Bluetooth (registered trademark), for example.

The wearable device 110 is attached to a part of the body of the driver, such as the head, an ear, a wrist, a fingertip, and the neck. The wearable device 110 acquires biological information about the driver, such as a pulse rate, a heart rate, a body temperature, and blood pressure, and outputs the acquired biological information to the vehicle onboard network 1. In addition, the wearable device 110 is capable of detecting the face direction or the visual line of the driver. The wearable device 110 transmits, to the wearable communicator 97, visual line information that includes information indicating the face direction or the visual line direction of the driver. The visual line information is supplied to the HCU 100 and others via the wearable communicator 97.

The HMI system 10 includes operation devices such as a direction indicator lever 15, and a driver status monitor (DSM) 11 in addition to the HCU 100 described above. The HMI system 10 further includes a plurality of display devices such as a head-up display (HUD) 14, a combination meter 12a, a center information display (CID) 12b, and a light emission device 40. The HMI system 10 presents information to occupants of the self-vehicle A, such as the driver sitting on a driver's seat 17d.

The direction indicator lever 15 is provided on a column portion supporting the steering 16. A direction indicator is operated in accordance with an operation input to the direction indicator lever 15 from the driver. The direction indicator lever 15 outputs an operation signal indicating input by the driver to the HCU 100.

The DSM 11 includes a near infrared light source and a near infrared camera, and a control unit that controls these components. The DSM 11 is provided on an upper surface of an instrument panel 19 in such a position that the near infrared camera faces the driver's seat 17d. The DSM 11 captures, via the infrared camera, an image of the face of the driver illuminated by infrared light emitted from the near infrared light source. An image captured by the infrared camera is analyzed by the control unit. The control unit extracts the face direction of the driver, the visual line of the driver, the opening degrees of the eyes of the driver and the like from the captured image, for example.

The DSM 11 obtains the visual line information indicating the face direction or the visual line direction of the driver, based on analysis by the control unit, and outputs the visual line information to the HCU 100. The DSM 11 further outputs driver looking-aside information to the HCU 100 when determining that the driver is looking aside rather than front. The DSM 11 is capable of further outputting driver drowsy information to the HCU 100 when determining that the driver is in a drowsy driving state with the eyes closed.

The HCU 100 is connected to operation devices, the DSM 11, and display devices, for example. The HCU 100 acquires operation signals output from the operation devices, and information output from the DSM 11. The HCU 100 outputs control signals to the respective display devices to control display by the display devices. A control circuit 20a of the HCU 100 includes a main processor 21, an image drawing processor 22, a rewritable non-volatile memory 23, an input/output interface 24 through which information is input and output, and a bus connecting these components.

The HUD device 14 acquires data from the HCU 100, and projects light of an image of the data to a projection area 14a defined on a wind shield 18. The light of the image reflected on the wind shield 18 and traveling toward the interior of the vehicle is perceived by the driver sitting on the driver's seat 17d. The driver views a virtual image of the image projected by the HUD device 14 as a virtual image superimposed on an external scene present ahead of the self-vehicle A.

The combination meter 12a is provided in front of the driver's seat 17d in the interior of the self-vehicle A. The combination meter 12a includes a liquid crystal display visible from the driver sitting on the driver's seat 17d. The combination meter 12a displays, on a liquid crystal display, images of speed meters and the like based on data acquired from the HCU 100.

The CID 12b is provided at the center of the instrument panel 19 in the interior of the self-vehicle A. The CID 12b includes a liquid crystal display visible from the occupant sitting on an assistant driver's seat 17p as well as the driver. The CID 12b displays a guide screen for navigation, an operation screen of an air conditioner, an operation screen of an audio device, and others on the liquid crystal display based on data acquired from the HCU 100.

Figure 4:
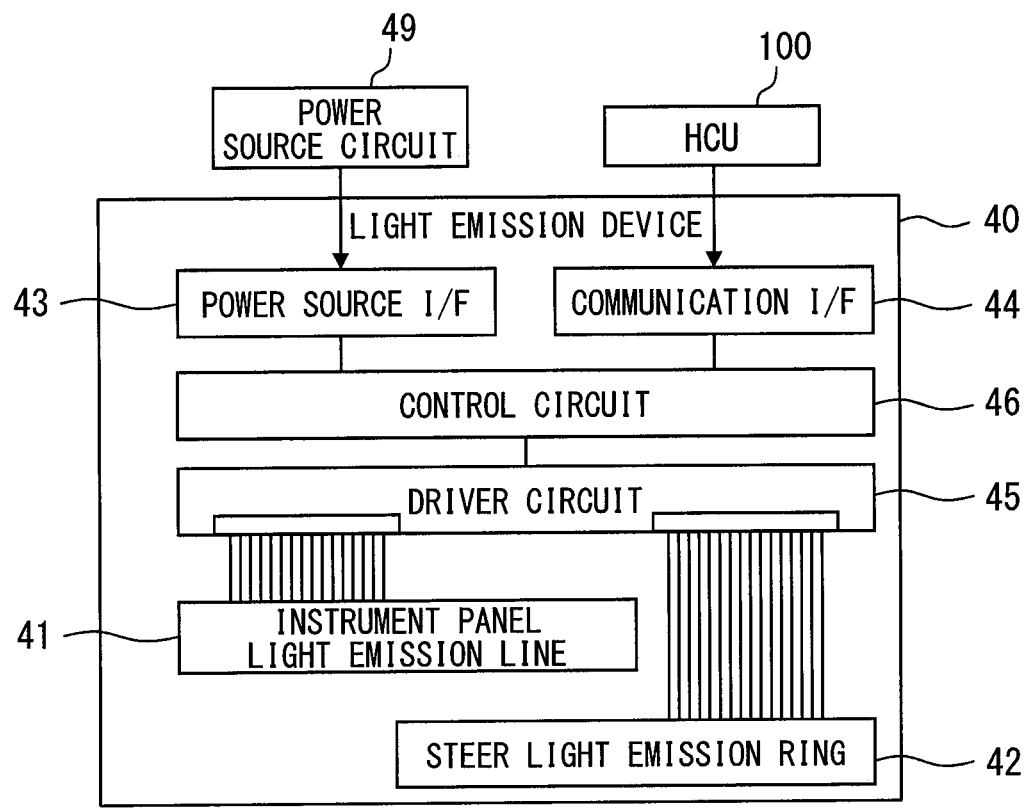
FIG. 4 is a block diagram showing a configuration of a light emission device.

As illustrated in FIGS. 1 and 4, the light emission device 40 includes an instrument panel light emission line 41, a steer light emission ring 42, a power source interface 43, a communication interface 44, a driver circuit 45, and a control circuit 46. The light emission device 40 displays light emission spots 51 and 56 on the instrument panel light emission line 41 and the steer light emission ring 42 to present information about the self-vehicle A to the driver.

The instrument panel light emission line 41 is provided on the instrument panel 19 of the self-vehicle A. The instrument panel light emission line 41 includes a linear light emission area 52. The linear light emission area 52 is defined in such a shape as to linearly extend in a width direction WD of the self-vehicle A. The linear light emission area 52 is located above the CID 12b. The linear light emission area 52 has ends 53a and 53b in the width direction WD. The ends 53a and 53b are extended to bases of pillars disposed at one and the other sides of the wind shield 18, respectively. The linear light emission area 52 is located out of a center vision range CVA of the driver sitting on the driver's seat 17d. On the other hand, substantially the entire linear light emission area 52 lies within a peripheral vision range PVA of the driver sitting on the driver's seat 17d. The linear light emission area 52 includes a plurality of light emitting elements disposed in a line in the width direction WD. The instrument panel light emission line 41 emits light from at least a part of the large number of light emitting elements to display at least the one light emission spot 51 in the linear light emission area 52. The instrument panel light emission line 41 is capable of shifting the light emission spot 51 in the width direction WD within the linear light emission area 52. The instrument panel light emission line 41 is further capable of changing an emission color and an emission size of the light emission spot 51.

The steer light emission ring 42 is provided on the steering 16 of the self-vehicle A. The steer light emission ring 42 includes an annular light emission area 57. The annular light emission area 57 is defined in such a shape as to annularly extend along an edge of a setter pad portion 16a of the steering 16. The annular light emission area 57 is disposed below the combination meter 12a. A top portion of the annular light emission area 57 lies within the peripheral vision range PVA of the driver sitting on the driver's seat 17d. A plurality of light emitting elements are disposed in the annular light emission area 57 in a circumferential direction of the steering 16. The steer light emission ring 42 emits light from at least a part of the large number of light emitting elements to display at least the one light emission spot 56 in the annular light emission area 57. The steer light emission ring 42 is capable of shifting the light emission spot 56 in the circumferential direction within the annular light emission area 57. The steer light emission ring 42 is further capable of changing an emission color and an emission size of the light emission spot 56.

The power source interface 43 receives power from an in-vehicle battery or the like via a power source circuit 49. The power source interface 43 supplies power to the components of the light emission device 40. The instrument panel light emission line 41 and the steer light emission ring 42 display the light emission spots 51 and 56, respectively, by using power supplied via the power source interface 43.

The communication interface 44 is connected to the HCU 100. Command signals are input from the HCU 100 to the communication interface 44 to instruct light emission modes of the instrument panel light emission line 41 and the steer light emission ring 42.

The driver circuit 45 controls electric currents flowing in the respective light emitting elements provided on the instrument panel light emission line 41 and the steer light emission ring 42. The driver circuit 45 converts power supplied from the power source interface 43 into electric currents to apply the currents to the light emitting elements designated by a control signal received from the control circuit 46.

The control circuit 46 is mainly configured by a microcomputer including a processor and a memory. The control circuit 46 receives a command signal from the HCU 100 via the communication interface 44. The control circuit 46 generates a control signal and outputs the control signal to the driver circuit 45 to allow the light emitting elements to emit light in a light emission pattern corresponding to the received command signal.

Figure 5:
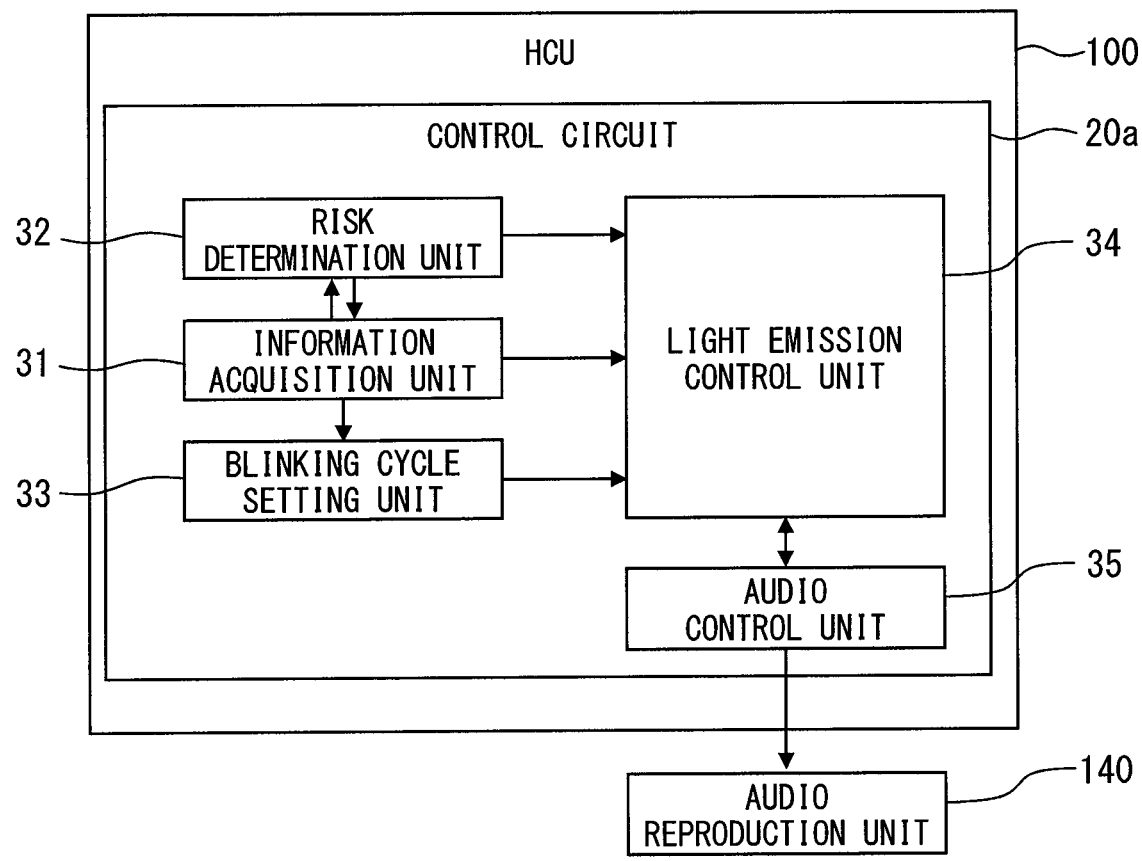
FIG. 5 is a diagram showing function blocks constituted in a control circuit of an HCU.

The control circuit 20a of the HCU 100 shown in FIG. 5 constitutes a plurality of function blocks (31 to 35) under light emission control programs stored in the memory 23 and executed by the processors 21 and 22 to control light emission of the light emission device 40 thus configured. Details of the function blocks associated with information presentation by using the instrument panel light emission line 41 and the steer light emission ring 42 are hereinafter described with reference to FIG. 5 in conjunction with FIGS. 1 and 4.

The information acquisition unit 31 acquires various types of information associated with the self-vehicle A. The information acquisition unit 31 outputs acquired information to a risk determination unit 32, a blinking cycle setting unit 33, and a light emission control unit 34. More specifically, the information acquisition unit 31 receives visual line information and looking-aside information from the DSM 11, monitoring information from the peripheral monitoring ECU 91 and the V2X communicator 96, visual line information and biological information from the wearable device 110, and others. The information acquisition unit 31 further acquires operation information and steering information associated with the driving assist function of the vehicle control ECU 70, and map information indicating the traveling direction supplied from the locator 95. The information acquisition unit 31 further acquires event occurrence information at the time of occurrence of an event requiring attention to the left and right sides of the self-vehicle A by the driver. More specifically, the information acquisition unit 31 receives the event occurrence information indicating that an operation of the direction indicator has been initiated by the driver or the vehicle control ECU 70 in order to perform a lane change.

The risk determination unit 32 determines a plurality of types of risk levels of the self-vehicle A, based on information received from the information acquisition unit 31. For example, the risk determination unit 32 is capable of calculating an internal risk level caused by the driver, and an external risk level caused by a different vehicle, a pedestrian, a traffic environment, and the like. The risk determination unit 32 supplies a determination result and a calculation result of respective risk levels to the light emission control unit 34.

For example, the risk determination unit 32 determines the internal risk level caused by the driver on a scale of one to five. The risk determination unit 32 determines a lowest risk level as a "normal state", and a highest risk level as a "risk level 4". The risk determination unit 32 increases the risk level with a rise of the degree of carelessness of the driver. The risk determination unit 32 outputs a determination result of the risk level to the information acquisition unit 31.

The risk determination unit 32 calculates a risk level of each of dynamic risk targets, such as a moving object and a traffic signal, based on monitoring information supplied from the external recognition system 90 and the V2X communicator 96. The risk determination unit 32 is capable of sequentially calculating risk levels of at least risk targets detected in the area in the traveling direction of the self-vehicle A.

The risk determination unit 32 further extracts stationary risk targets produced by a road structure, such as a blind intersection and a sharp curve, based on map information supplied from the locator 95, for example. The risk determination unit 32 is capable of calculating risk levels of the stationary risk targets similarly to the risk levels of the dynamic risk targets.

The risk determination unit 32 is further capable of calculating a risk level of each of risk targets of a plurality of risk targets in case of detection of a plurality of risk targets by the external recognition system 90 or the like. The risk level calculated by the risk determination unit 32 rises as the importance of the risk target for the driver increases.

Figure 6:
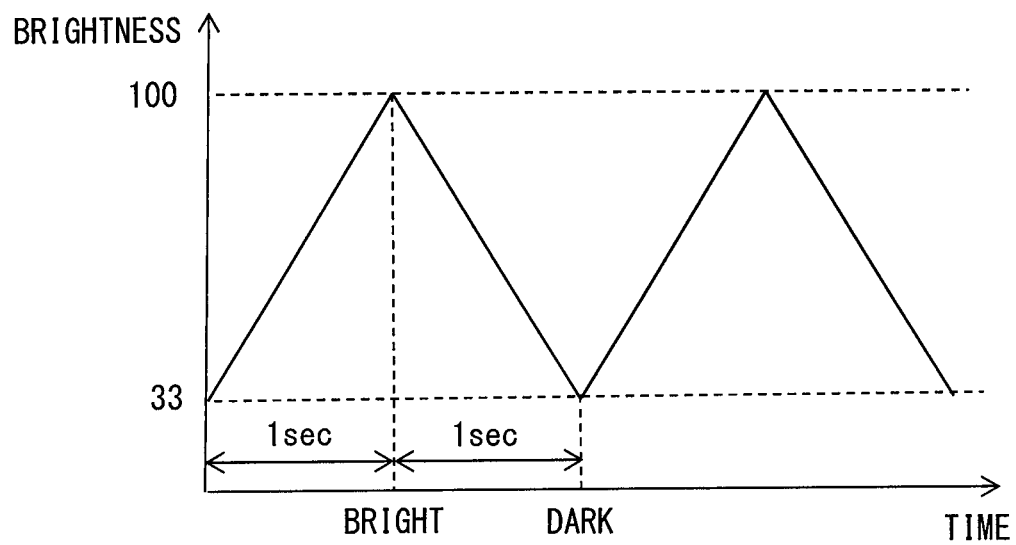
FIG. 6 is a graph showing a transition of brightness variations repeated in a light emission spot.

The blinking cycle setting unit 33 sets a cycle for blinking the light emission spots 51 and 56 in a state notification mode described below. The blinking cycle of each of the light emission spots 51 and 56 is set to a cycle corresponding to a heart rate and a pulse rate of the driver in the normal state. The heart rate and the pulse rate may be determined based on biological information acquired by the wearable device 110, or may be set to ordinary values determined beforehand (such as 60 per minute). In case of a heart rate set to 60 per minute, for example, the blinking cycle setting unit 33 sets the blinking cycle such that a bright state and a dark state are repeated for every one second as shown in FIG. 6. For example, luminance in the dark state is set to approximately one third of luminance in the bright state.

The light emission control unit 34 shown in FIG. 5 generates a command signal in correspondence with information acquired by the information acquisition unit 31, and outputs the command signal to the light emission device 40. The light emission control unit 34 controls light emission modes of the light emission spots 51 and 56 of the instrument panel light emission line 41 and the steer light emission ring 42. The light emission control unit 34 is capable of switching the light emission control mode of the light emission device 40 between a plurality of modes, based on at least a part of information acquired by the information acquisition unit 31.

Figure 7:
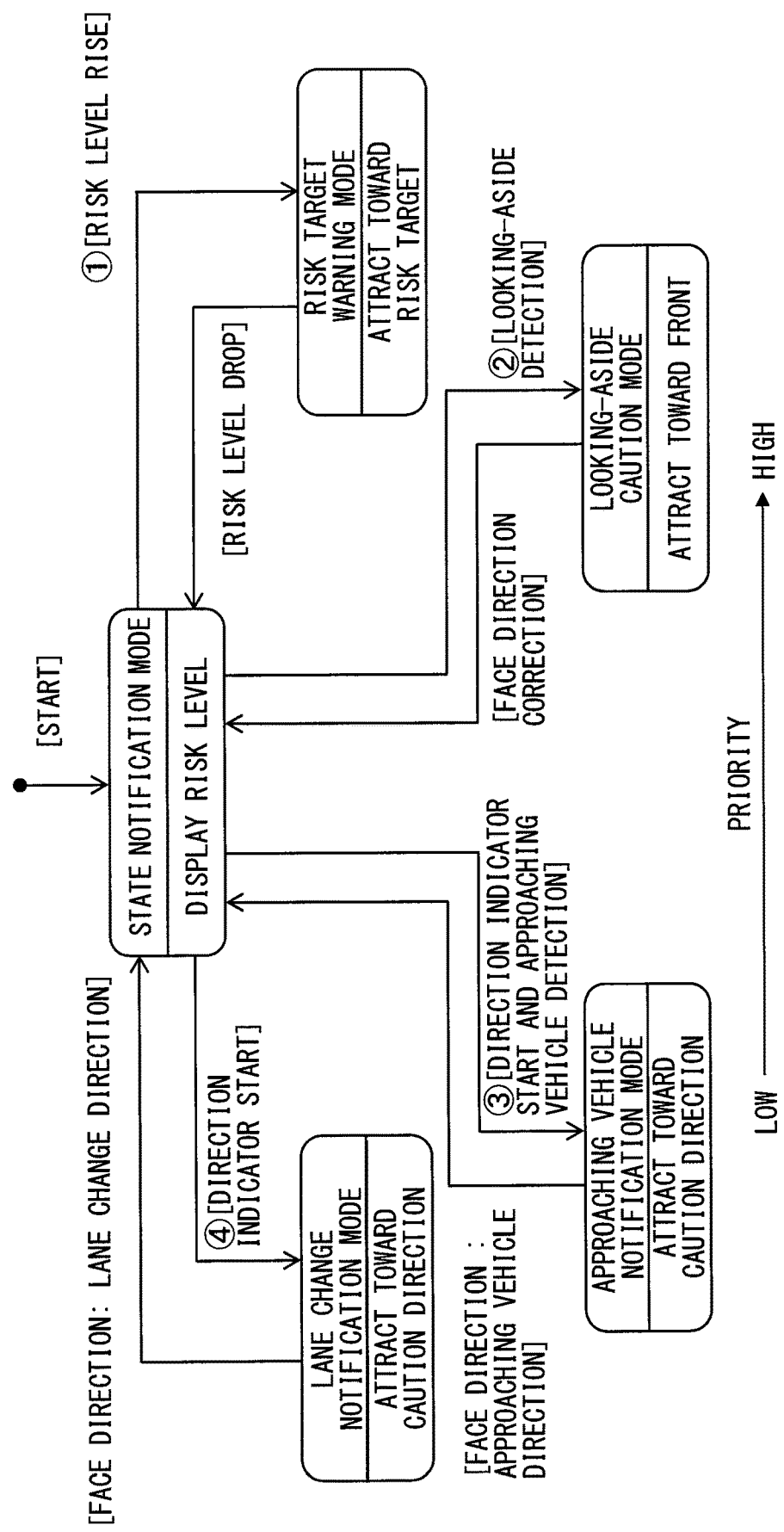
FIG. 7 is a state transition chart showing details of transitions of light emission control modes of the light emission device.

As shown in FIG. 7, the plurality of light emission control modes include the state notification mode, a lane change notification mode, an approaching vehicle notification mode, a looking-aside caution mode, and a risk target warning mode. Relative priorities are established for the event notification modes, i.e., the lane change notification mode, the approaching vehicle notification mode, the looking-aside caution mode, and the risk target warning mode in the plurality of light emission control modes described above. According to the first embodiment, the relative priorities are determined as the risk target warning mode, the looking-aside caution mode, the approaching vehicle notification mode, and the lane change notification mode in the descending order.

The state notification mode is a light emission control mode for notifying the driver about a current internal risk level of the self-vehicle A. In the state notification mode, the light emission mode of the light emission spots 51 and 56 is switched in accordance with a determination result of the risk level caused by the driver and determined by the risk determination unit 32 (see FIG. 5).

Each of the lane change notification mode and the approaching vehicle notification mode is a light emission control mode for guiding the visual line of the driver in such a direction as to extend in an attention direction toward either the left side or the right side of the self-vehicle A, i.e., the side where an event requiring attention from the driver has occurred. The light emission control unit 34 (see FIG. 5) switches the light emission control mode from the state notification mode to the lane change notification mode in response to operation of the direction indicator performed at the time of the lane change. The visual line of the driver is guided in such a direction as to extend in the attention direction toward the lane corresponding to a shift destination in accordance with light emission display in the lane change notification mode.

In case of detection of a vehicle traveling in parallel in the lane of destination under operation of the direction indicator performed in response to the lane change, the light emission control unit 34 (see FIG. 5) switches the light emission control mode from the state notification mode to the approaching vehicle notification mode. The visual line of the driver is guided in such a direction as to extend in the attention direction toward the vehicle traveling in parallel in accordance with light emission display in the approaching vehicle notification mode.

The light emission control unit 34 (see FIG. 5) determines whether the face of the driver has been directed toward either the left or the right corresponding to the attention direction at a predetermined angle (e.g., 45 degrees) or larger based on the visual line information. In case of determination that the direction of the face of the driver is identical to the attention direction, the light emission control mode is returned to the state notification mode from the lane change notification mode or the approaching vehicle notification mode.

The looking-aside caution mode is a light emission control mode for guiding the visual line of the driver looking aside toward the front. The light emission control unit 34 (see FIG. 5) switches the state notification mode to the looking-aside caution mode, based on the looking-aside information about the driver. The visual line of the driver is guided toward the front in accordance with light emission display in the looking-aside caution mode. Thereafter, the light emission control unit 34 determines whether the face direction of the driver has been corrected, based on the visual line information. In case of determination that the face direction of the driver has been corrected, the light emission control mode is returned to the state notification mode from the looking-aside caution mode.

The risk target warning mode is a light emission control mode for guiding the visual line of the driver toward a risk target located around or in the traveling direction of the self-vehicle A and requiring attention of the driver. The light emission control unit 34 acquires position information indicating a relative position of a risk target from the information acquisition unit 31, and acquires a risk level calculated for the risk target from the risk determination unit 32. A threshold $th_L$ is set for the light emission control unit 34 beforehand as a threshold for determining whether a risk target is a warning target for the driver. The light emission control unit 34 switches the light emission control mode from the state notification mode to the risk target warning when at least one risk target at a risk level exceeding the threshold $th_L$ is produced. When the risk target at the risk level exceeding the threshold $th_L$ disappears, the light emission control unit 34 returns the light emission control mode from the risk target warning mode to the state notification mode. The threshold $th_L$ as a trigger for switching from the state notification mode to the risk target warning mode may be equivalent to or higher than the trigger $th_L$ for switching from the risk target warning mode to the state notification mode.

The light emission control unit 34 displays the light emission spot 51 in a range of the linear light emission area 52 in a direction of the risk target as viewed from the driver in the risk target warning mode. The light emission control unit 34 shifts the position of the light emission spot 51 in the linear light emission area 52, based on position information acquired by the information acquisition unit 31, such that the position of the light emission spot 51 follows a relative positional change of the risk target with respect to the self-vehicle A. The light emission control unit 34 further changes the mode of the light emission spot 51, such as the emission color and the emission size, in accordance with the risk level of the risk target.

The light emission control unit 34 further selects a highest risk target at a highest risk level in a plurality of risk targets in case of detection of a plurality of risk targets by the external recognition system 90 or the like. The light emission control unit 34 displays, in the linear light emission area 52, the light emission spot 51 indicating the direction of the highest risk target selected from the plurality of risk targets. The light emission control unit 34 is capable of switching the display position of the light emission spot 51 in accordance with a change of the highest risk target at the highest risk level in case of a transition of the highest risk target. In case of detection of two or more highest risk targets at a highest risk level in a plurality of risk targets, the light emission control unit 34 is further capable of displaying, in the linear light emission area 52, the plurality of light emission spots 51 each of which indicates the direction of the corresponding highest risk target.

An audio control unit 35 controls an audio reproduction device 140 to give aural notification to the driver. The audio reproduction device 140 includes a speaker or the like, and reproduces a notification sound and an audio message audible by all the occupants of the self-vehicle A in the interior of the vehicle. The audio control unit 35 combines the light emission spot 51 and the audio message in cooperation with the light emission control unit 34 to securely give the driver a warning about presence of a risk.

Described hereinafter are details of the light emission modes of the instrument panel light emission line 41 in each of the state notification mode, the lane change notification mode, the approaching vehicle notification mode, and the looking-aside caution mode, as well as details of the light emission modes of the steer light emission ring 42, with reference to FIGS. 8 to 17 in conjunction with FIG. 2. In each of the linear light emission areas 52 and the annular light emission area 57 in FIGS. 8 to 17, a dotted area indicates an area in a turned-off state, while a white area indicates an area in a turned-on state.

Figure 8:
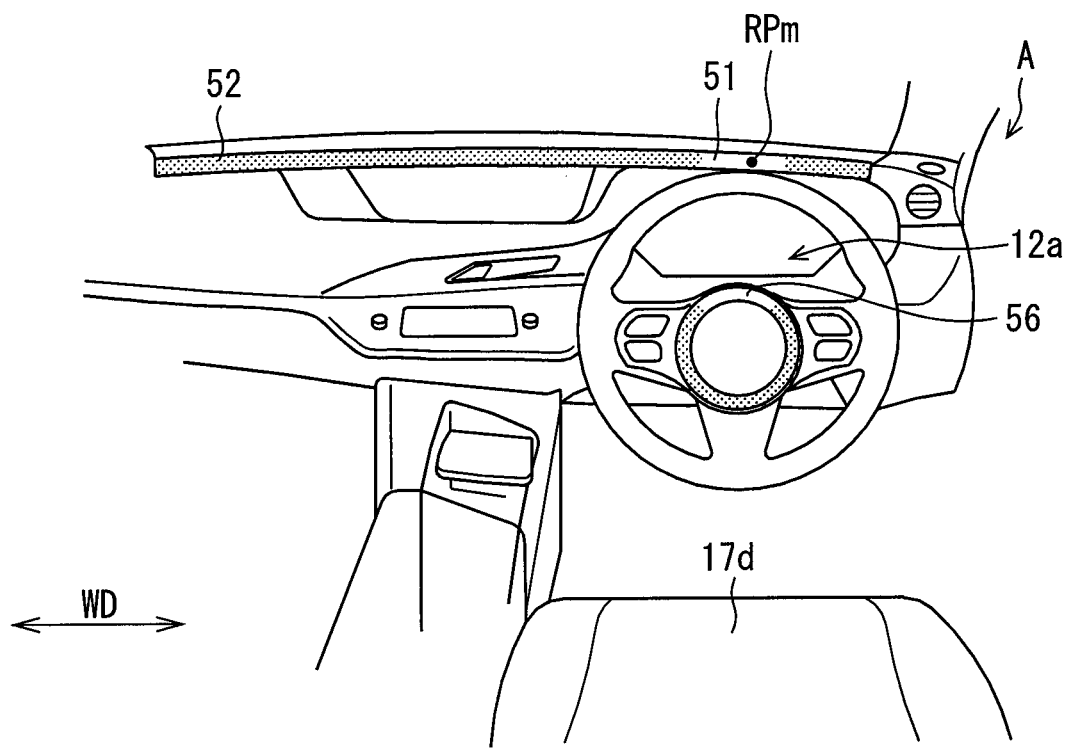
FIG. 8 is a view illustrating display of light emission spots during manual driving.
Figure 9:
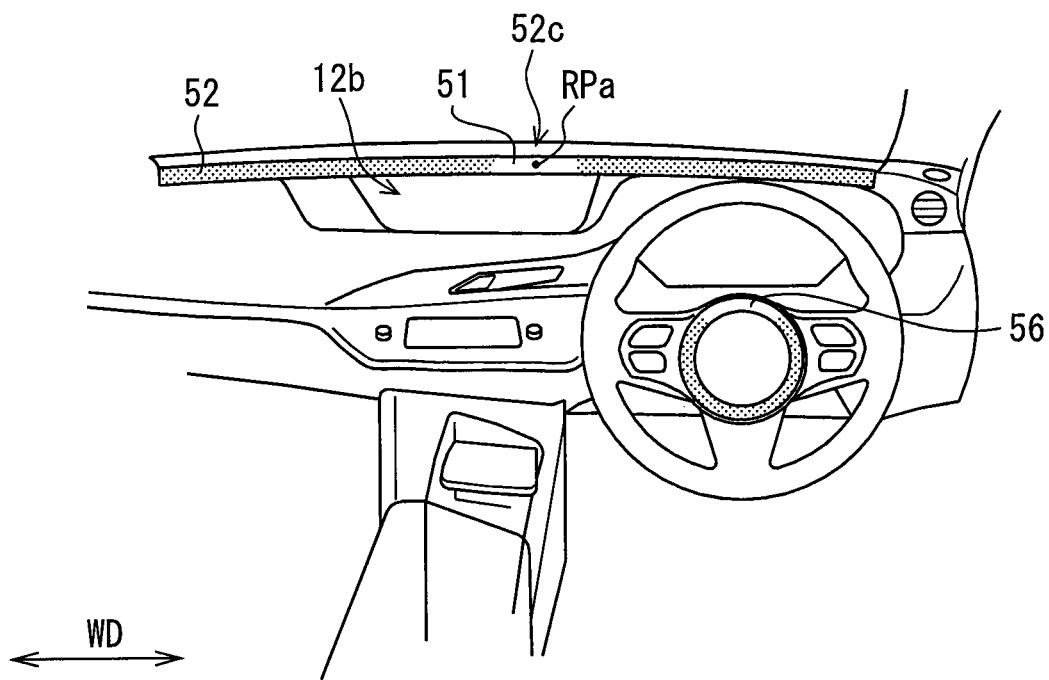
FIG. 9 is a view illustrating display of the light emission spots during LKA operation.

In the state notification mode, a reference position indicating the light emission spot 51 is switched between RPa and RPm in accordance with an operative state or inoperative state of the driving assist function as illustrated in FIGS. 8 and 9. Each of the reference positions RPa and RPm indicates the center position of the light emission spot 51. According to the first embodiment, the reference position of the light emission spot 51 is switched between RPa and RPm in accordance with an operative state or an inoperative state of LKA in the plurality of driving assist functions. The reference position RPa in the operative state of LKA is defined at a position closer to the center in the width direction WD of the self-vehicle A than the reference position RPm in the inoperative state of LKA is. Accordingly, the reference position RPm in the inoperative state of LKA is positioned above the center of the combination meter 12a disposed on the front of the driver's seat 17d (see FIG. 8). In other words, the reference position RPm is set in front of the driver. On the other hand, the reference position RPa in the operative state of LKA is positioned above the center 52c of the linear light emission area 52 in the width direction WD, i.e., above the center of the CID 12b (see FIG. 9).

Figure 10:
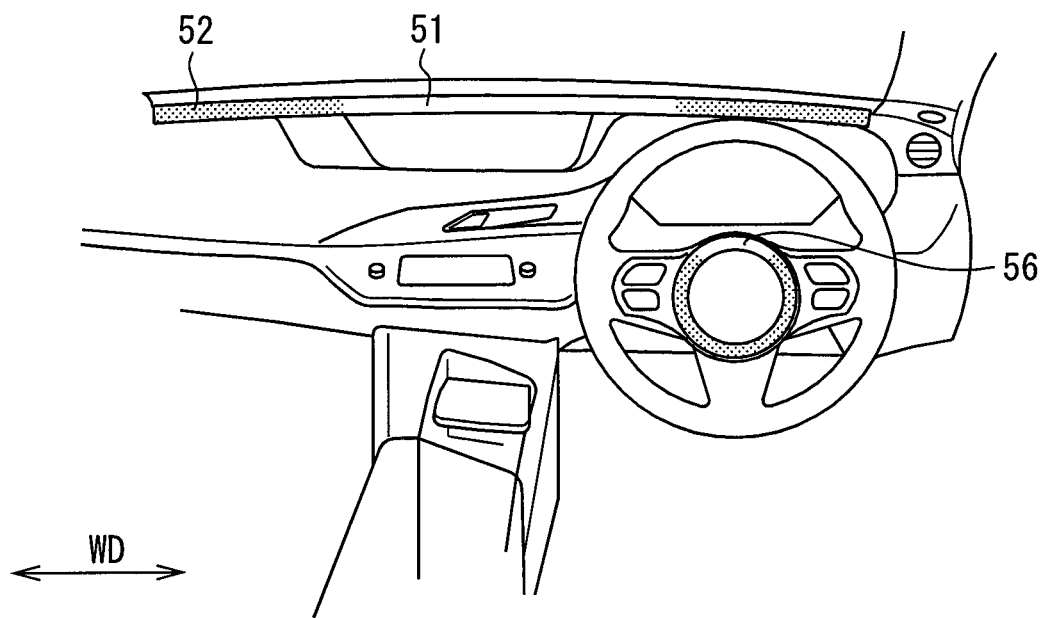
FIG. 10 is a view illustrating the light emission spots each of which has a longer display width with a rise of a risk level.

The light emission spots 51 and 56 in the state notification mode change the emission color to show the current risk level of the self-vehicle A to the driver. In the normal state corresponding to the lowest risk level, the light emission spots 51 and 56 emit green light. On the other hand, in the highest risk level "4", the light emission spots 51 and 56 emit yellow light. The emission color of each of the light emission spots 51 and 56 gradually changes from green to yellow with a rise of the risk level. In addition, the display width of the light emission spot 51 in the width direction WD increases or decreases in accordance with the risk level. More specifically, the display width of the light emission spot 51 increases in the width direction WD with a rise of the risk level, and decreases in the width direction WD with a drop of the risk level as illustrated in FIG. 10. Furthermore, the light emission spots 51 and 56 repeatedly change brightness of emission light in a cycle set by the blinking cycle setting unit 33 (see FIG. 5).

Figure 11:
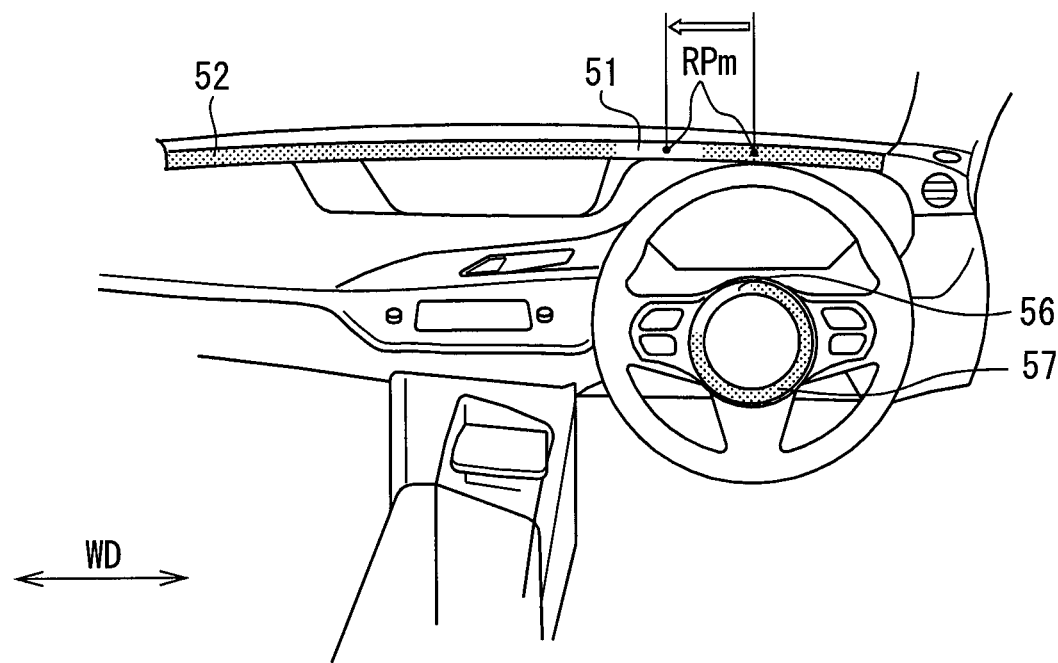
FIG. 11 is a view illustrating the light emission spots whose reference positions have been shifted to show an expected traveling track of the self-vehicle during manual driving.
Figure 12:
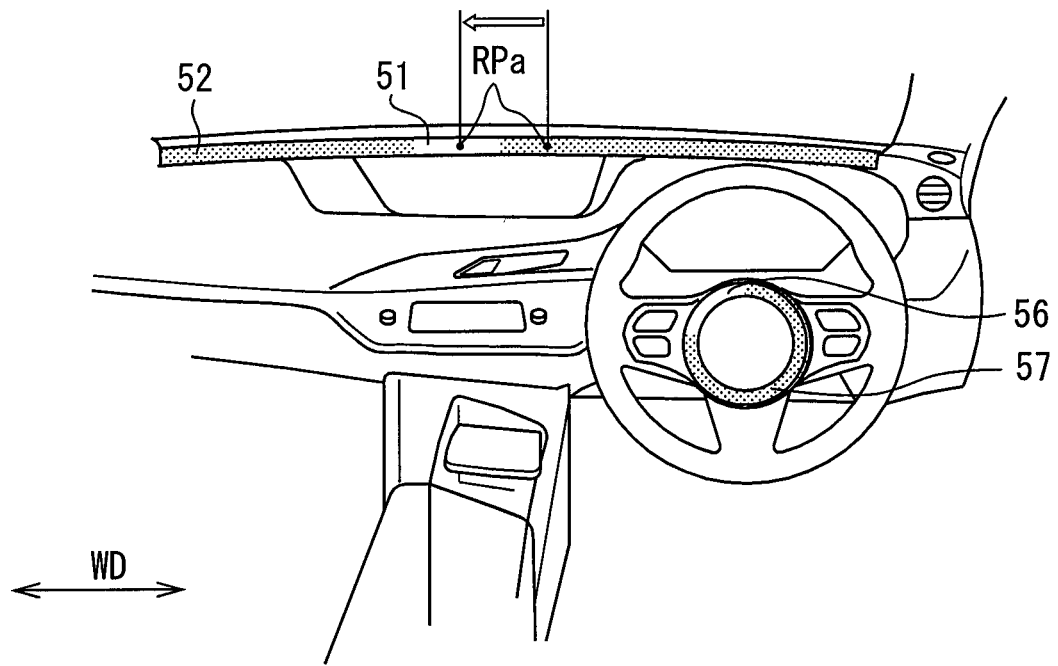
FIG. 12 is a view illustrating the light emission spots whose reference positions have been shifted to show an expected traveling track of the self-vehicle during LKA operation.
Figure 13:
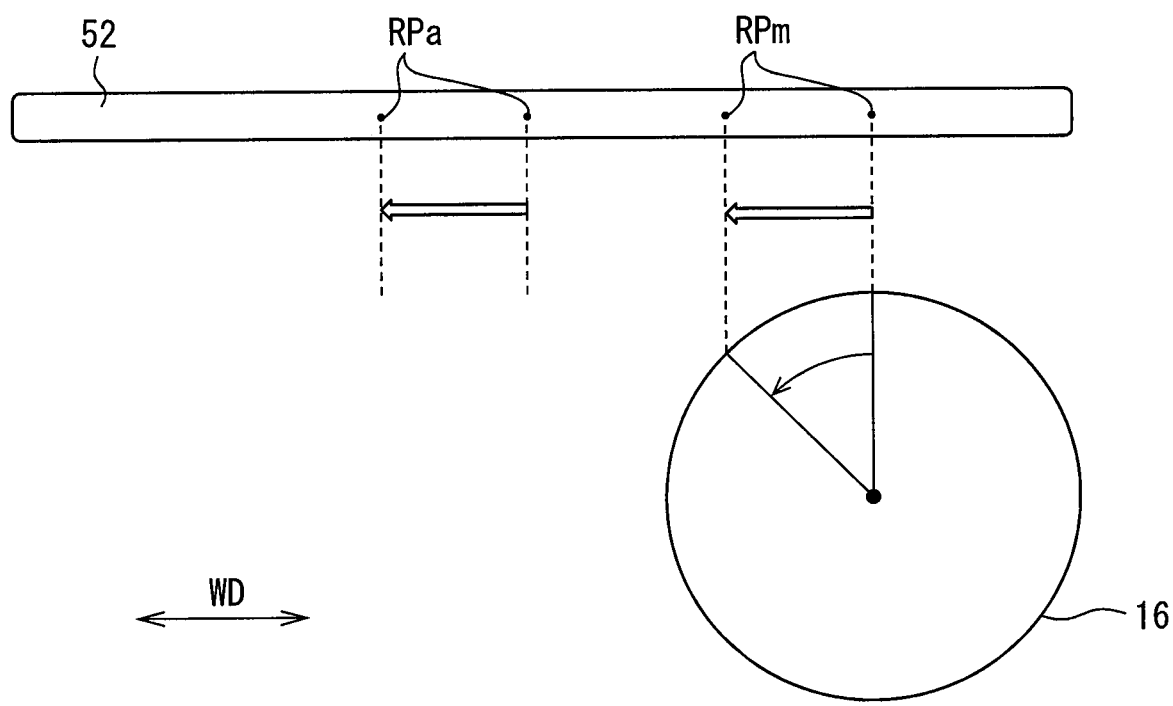
FIG. 13 is a view illustrating uniform shift amounts of the reference positions during LKA operation and manual driving.

As illustrated in FIGS. 11 and 12, the light emission spots 51 and 56 are shifted in the width direction WD in accordance with an expected traveling track set by the traveling track setting unit 84 (see FIG. 3) as an expected track after several seconds. The respective reference positions RPa and RPm of the light emission spot 51 of the linear light emission area 52 are shifted within the linear light emission area 52 by a shift amount corresponding to a target steering amount toward either the left or the right corresponding to the target steering direction after several seconds based on steering information. For example, as schematically illustrated in FIG. 13, shift amounts of the reference positions RPa and RPm are matched with a shift amount of the outer edge of the steering 16 in the width direction WD at the time of a shift of the outer edge by the target steering amount. In addition, the shift amount of the reference position RPa in the operative state of LKA is substantially equivalent to the shift amount of the reference position RPm in the inoperative state of LKA. Furthermore, the light emission spot 56 in the annular light emission area 57 illustrated in FIGS. 11 and 12 is similarly shifted in the circumferential direction by an angle corresponding to the target steering amount toward either the left or the right corresponding to the target steering direction after several seconds.

Light emission display of the instrument panel light emission line 41 in each of the lane change notification mode and the approaching vehicle notification mode is hereinafter described with reference to FIGS. 14 and 15.

Figure 14:
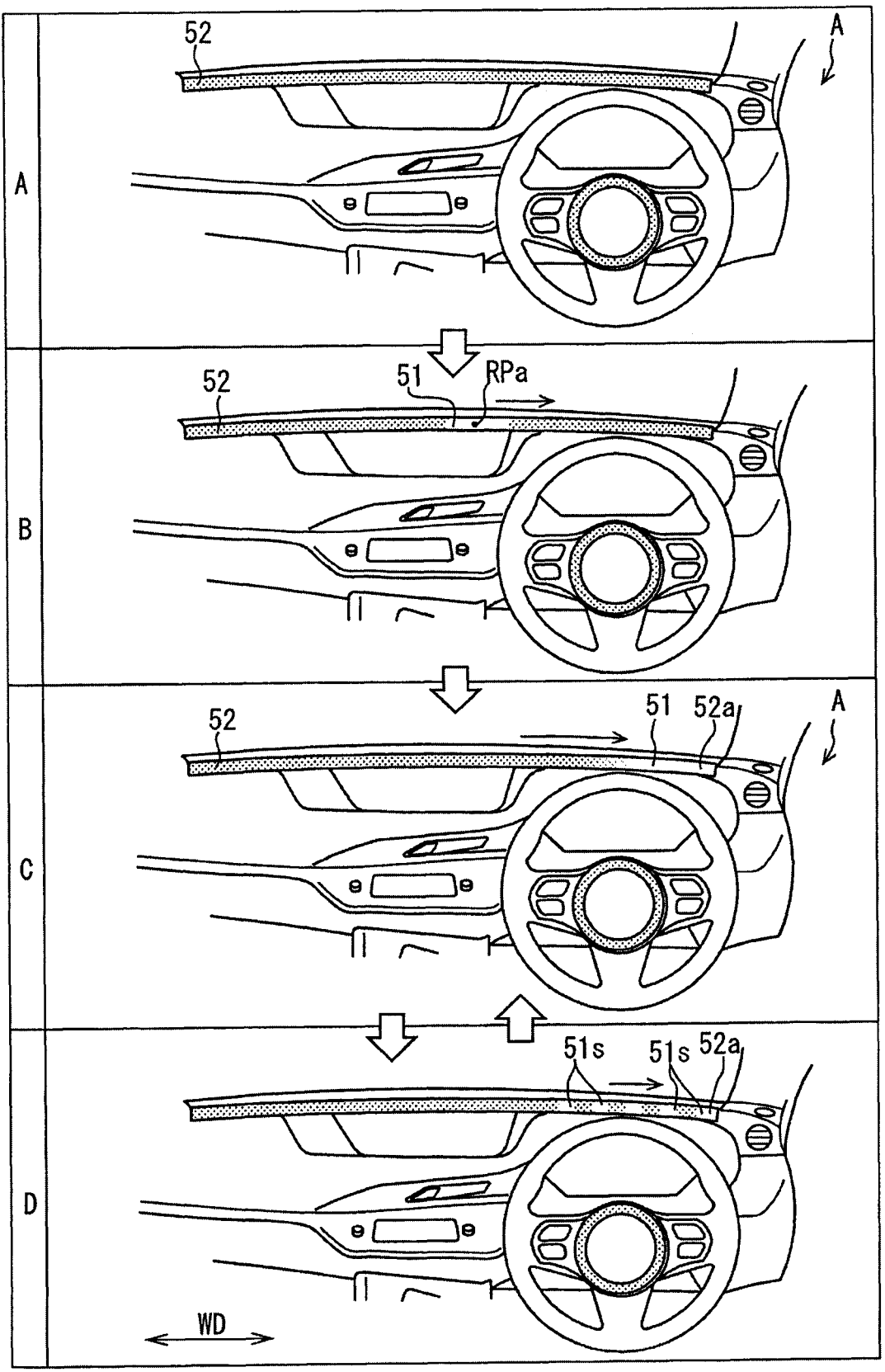
FIG. 14 is a view illustrating a series of display for guiding a visual line of a driver toward the right during LKA operation.

FIG. 14 illustrates display of the lane change notification mode for guiding the visual line of the driver toward the right corresponding to a shift destination at the time of a shift of the self-vehicle A to the right adjacent lane by utilizing an automatic lane change. In case of an absence of an approaching vehicle located in the shift destination lane and approaching the self-vehicle A, the light emission control mode is switched from the state notification mode to the lane change notification mode. The light emission spot 51 is temporarily turned off in the linear light emission area 52 in accordance with switching to the lane change notification mode (A of FIG. 14). Thereafter, the light emission spot 51 is displayed again at the reference position RPa in an emission color corresponding to the risk level similarly to the state notification mode (B of FIG. 14). The light emission spot 51 that has been displayed again starts shifting toward the right corresponding to the expected shift direction of the self-vehicle A in a shape leaving a trail of light backward. The light emission spot 51 reaches an end 52a of the linear light emission area 52 on the right side (C of FIG. 14).

The light emission spot 51 having reached the end 52a is divided into a plurality of divisional light emission spots 51s. The divisional light emission spots 51s continuously shift toward the right while maintaining a distance therebetween (D of FIG. 14). Thereafter, the divisional light emission spots 51s are stacked at the end 52a toward the inside in the width direction WD. As a result, the light emission spot 51 is integrally formed at the end 52a again (C of FIG. 14).

Figure 15:
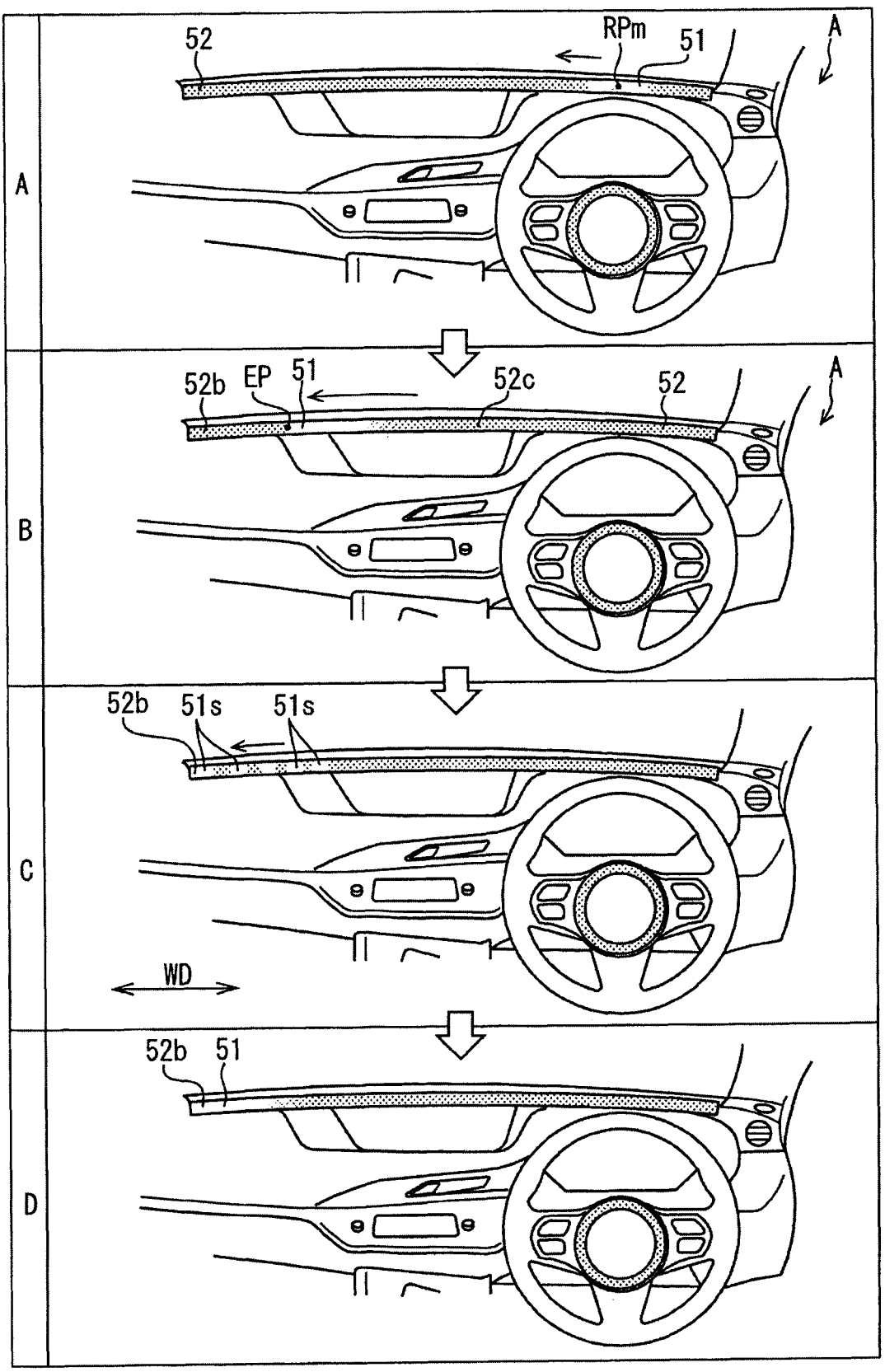
FIG. 15 is a view illustrating a series of display for guiding the visual line of the driver toward the left during manual driving.

FIG. 15 illustrates display of the lane change notification mode for guiding the visual line of the driver toward the left corresponding to a shift destination at the time of a shift of the self-vehicle A to the left adjacent lane by the driver performing a driving operation. The light emission spot 51 is temporarily turned off in accordance with switching to the lane change notification mode, and is displayed again at the reference position RPm in the emission color corresponding to the risk level (A of FIG. 15). The light emission spot 51 that has been displayed again shifts toward the left corresponding to the expected shifting direction of the self-vehicle A to reach an end position EP (B of FIG. 15). The end position EP is located between the center 52c and the left end 52b extended toward the assistant driver's seat 17p (see FIG. 1) in the linear light emission area 52. The end position EP is located inside the peripheral vision range PVA (see FIG. 1). In addition, the shift speed of the light emission spot 51 is kept substantially constant regardless of the operative or inoperative state of LKA. Furthermore, the shift speed of the light emission spot 51 toward the left is substantially equal to the shift speed of the light emission spot 51 toward the right.

With arrival of the light emission spot 51 at the end position EP, the plurality of divisional light emission spots 51s are displayed at the end 52b on the left side. The divisional light emission spots 51s continuously shift toward the left while maintaining a distance therebetween (C of FIG. 15). Thereafter, the divisional light emission spots 51s are stacked at the end 52b toward the inside in the width direction WD. As a result, the light emission spot 51 is integrally formed at the end 52b again (D of FIG. 15).

On the other hand, in case of presence of an approaching vehicle located in the shift destination lane and approaching the self-vehicle A, the light emission control mode is switched from the state notification mode to the approaching vehicle notification mode. In this case, the light emission spot 51 displayed again at each of the reference positions RPa and RPm (B of FIG. 14 and A of FIG. 15) has a particular emission color regardless of the current risk level. More specifically, in the approaching vehicle notification mode, the emission color of the light emission spot 51 in the linear light emission area 52 has a color of "amber (orange)" or like colors having a stronger warning impression than the color of the risk level "4". In addition, the display width of the light emission spot 51 that has been displayed again has a predetermined display width corresponding to the display width of the risk level "4", for example, regardless of the current risk level.

Light emission display of the instrument panel light emission line 41 in the looking-aside caution mode is hereinafter described with reference to FIGS. 16 and 17.

Figure 16:
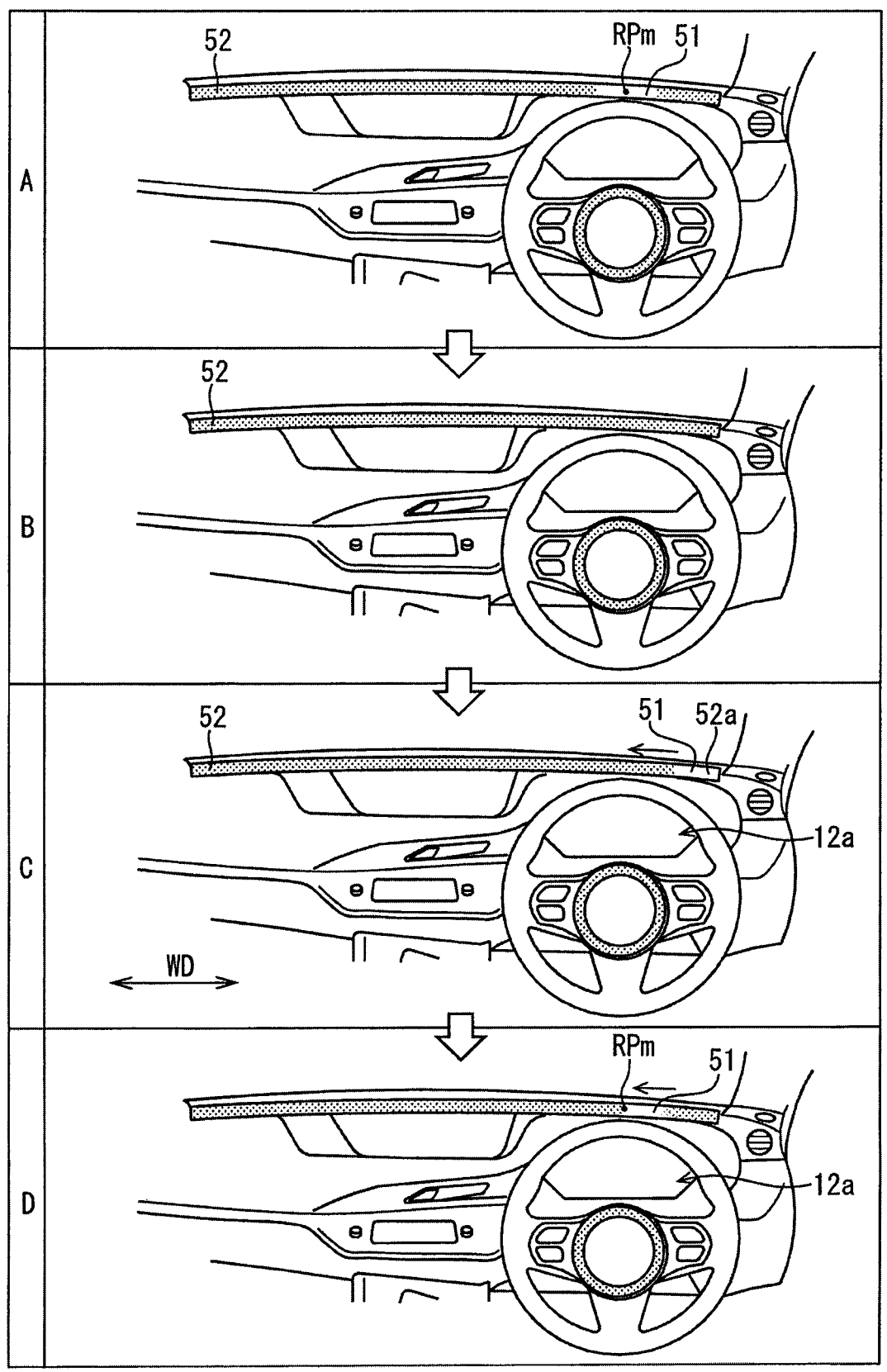
FIG. 16 is a view illustrating a series of display for guiding the visual line of the driver in a rightward looking-aside state toward the front during manual driving.

FIG. 16 illustrates display for correcting the visual line of the driver looking at the right side in the inoperative state of the LKA. When the state notification mode is switched to the looking-aside caution mode, based on rightward looking-aside information acquired by the DSM 11, the light emission spot 51 displayed at the reference position RPm is temporarily turned off in the linear light emission area 52 (A and B of FIG. 16).

Thereafter, the light emission spot 51 is displayed at a portion to which the visual line of the driver has been directed (such as the end 52a on the right side) in the linear light emission area 52 extending in the width direction WD, based on the visual line information acquired from the DSM 11 (C of FIG. 16). The light emission spot 51 is displayed again in the particular color such as amber similarly to the light emission spot 51 in the approaching vehicle notification mode. The light emission spot 51 that has been displayed again is shifted to the reference position RPm at the center of the combination meter 12a, i.e., the front of the driver.

Figure 17:
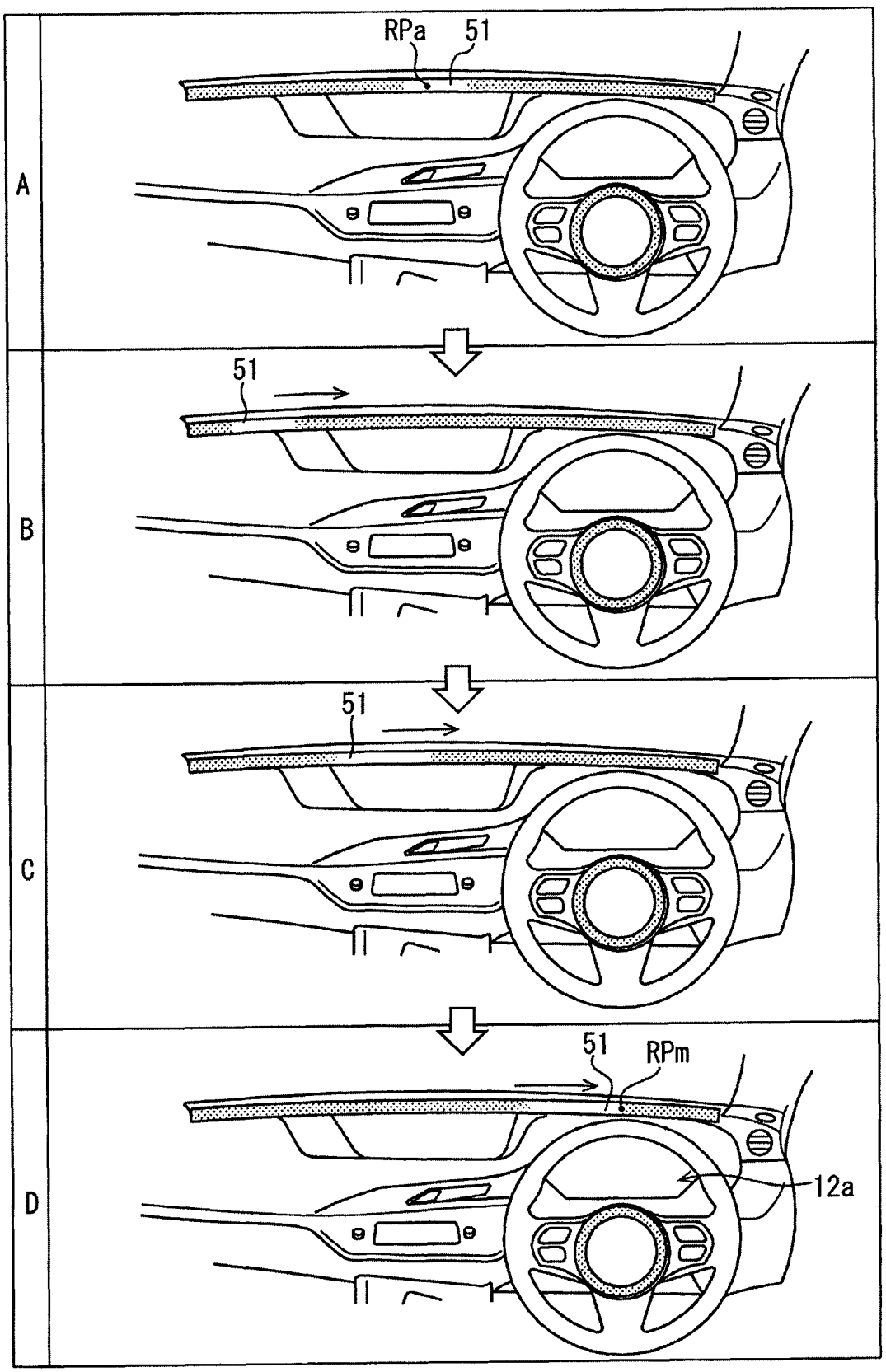
FIG. 17 is a view illustrating a series of display for guiding the visual line of the driver in a leftward looking-aside state toward the front during LKA operation.

FIG. 17 illustrates display for correcting the visual line of the driver looking at the left side in the operative state of the LKA. When the state notification mode is switched to the looking-aside caution mode based on leftward looking-aside information acquired by the DSM 11, the light emission spot 51 displayed at the reference position RPa (A of FIG. 17) is temporarily turned off. Thereafter, the light emission spot 51 emitting amber light is displayed in the direction corresponding to the visual line of the driver, based on the visual line information acquired from the DSM 11 (B of FIG. 17). The light emission spot 51 that has been displayed again starts shifting rightward (C of FIG. 17). The light emission spot 51 similarly shifts to the center of the combination meter 12a located in front of the driver even in the operative state of the LKA (D of FIG. 17). In the looking-aside caution mode, therefore, the light emission spot 51 finally arrives at the reference position RPm regardless of the operative or inoperative state of the LKA.

Figure 18:
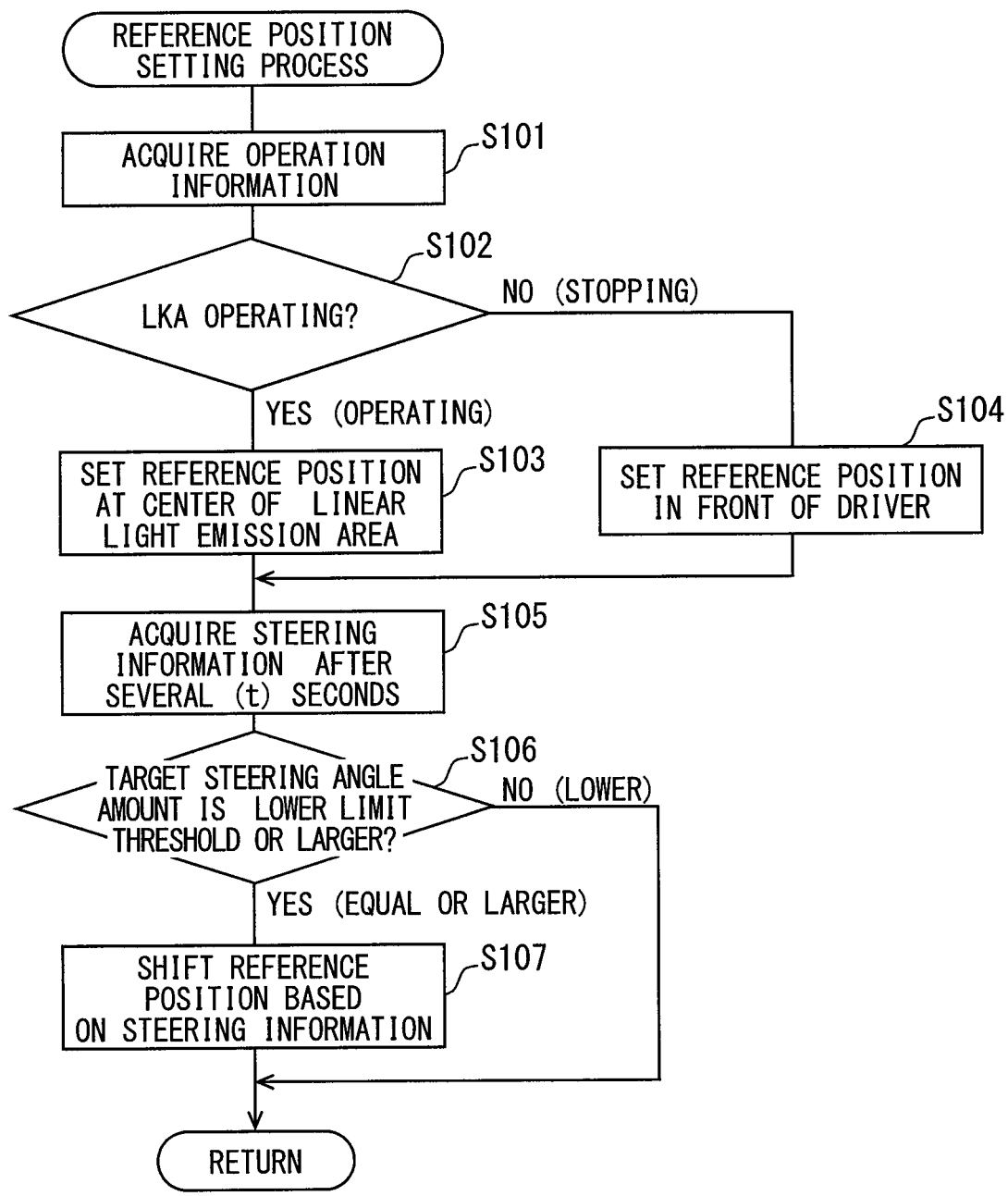
FIG. 18 is a flowchart showing a reference position setting process.

Described hereinafter are details of processes executed by the control circuit 20a to realize display of the light emission spot 51 in the state notification mode, the lane change notification mode, the approaching vehicle notification mode, and the looking-aside caution mode described above, with reference to FIGS. 18 and 19 in conjunction with FIG. 5. Initially, a reference position setting process for setting the reference positions RPa and RPm (see FIGS. 8 and 9) of the light emission spot 51 is described with reference to a flowchart in FIG. 18. The process shown in FIG. 18 repeatedly starts under the light emission control unit 34 of the control circuit 20a when the vehicle comes into a travelable state.

In S101, operation information indicating a start and an end of the LKA is acquired from the vehicle control ECU 70 (see FIG. 3). Thereafter, the flow proceeds to S102. In S102, whether the LKA is in the operative state is determined based on the operation information acquired in S101. In case of determination that the LKA is in the operative state, the flow proceeds to S103. In S103, the reference position RPa is set at the center 52c of the linear light emission area 52 (see FIG. 9). Thereafter, the flow proceeds to S105. On the other hand, in case of determination that the LKA is in the inoperative state in S102, the flow proceeds to S104. In S104, the reference position RPm is set in front of the driver (see FIG. 8). Thereafter, the flow proceeds to S105.

In S105, steering information associated with an expected traveling track after several (t) seconds is acquired from the vehicle control ECU 70 (see FIG. 3). Thereafter, the flow proceeds to S106.

In S106, whether a target steering amount included in the steering information acquired in S105 is equal to or larger than a lower limit threshold. The lower limit threshold is set to a value corresponding to a shift of the light emission spot 51 on limited occasions of a curve and a lane change. In other words, the lower limit threshold is set to a value excluding a steering amount necessary for maintaining traveling within the lane recognizable as a straight line. In case of determination that the target steering amount is smaller than the lower limit threshold in S106, a series of processes end. On the other hand, in case of determination that the target steering amount is the lower limit threshold or larger in S106, the flow proceeds to S107. In S107, the reference position RPa or RPm set in S103 or S104 is shifted to the left or the right in the width direction WD (see FIGS. 11 and 12), based on the steering information acquired in S105, and then the series of processes end. The value oft is set to a value sufficient for securing a time for override, such as three seconds, after the driver recognizes the shift of the reference position RPa or RPm and determines appropriateness of the traveling direction.

Figure 19:
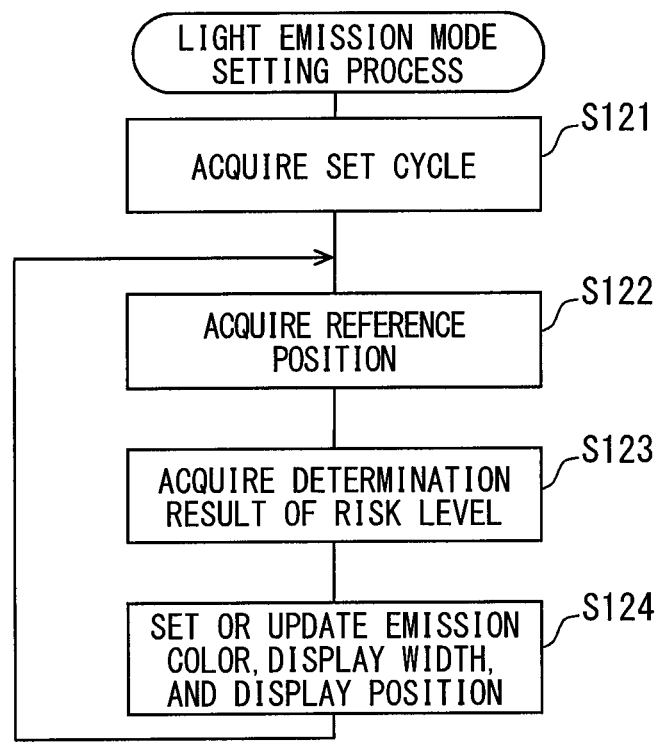
FIG. 19 is a flowchart showing a light emission mode setting process.

Details of the process for setting the light emission mode of the light emission spot 51 in the state notification mode are hereinafter described. The process shown in FIG. 19 is similarly started by the light emission control unit 34 (see FIG. 5), based on a travelable state of the vehicle.

In S121, a blinking cycle set by the blinking cycle setting unit 33 is acquired. Thereafter, the flow proceeds to S122. In S122, the latest reference position set by the reference position setting process is acquired. Thereafter, the flow proceeds to S123. In S123, a determination result of the latest risk level determined by the risk determination unit 32 is acquired. Thereafter, the process proceeds to S124. In S124, the emission color, display width, and display position of the light emission spot 51 are set or updated based on the items of information acquired in S121 to S123. Thereafter, the flow returns to S122. Values set by repeating the processes in S122 to S124 are output to the light emission device 40 in FIG. 1 as command signals to realize state notification based on the light emission spot 51.

Details of the light emission mode of the instrument panel light emission line 41 in the risk target warning mode are hereinafter described with reference to FIGS. 20 to 25 in conjunction with FIGS. 2 and 5.

Figure 20:
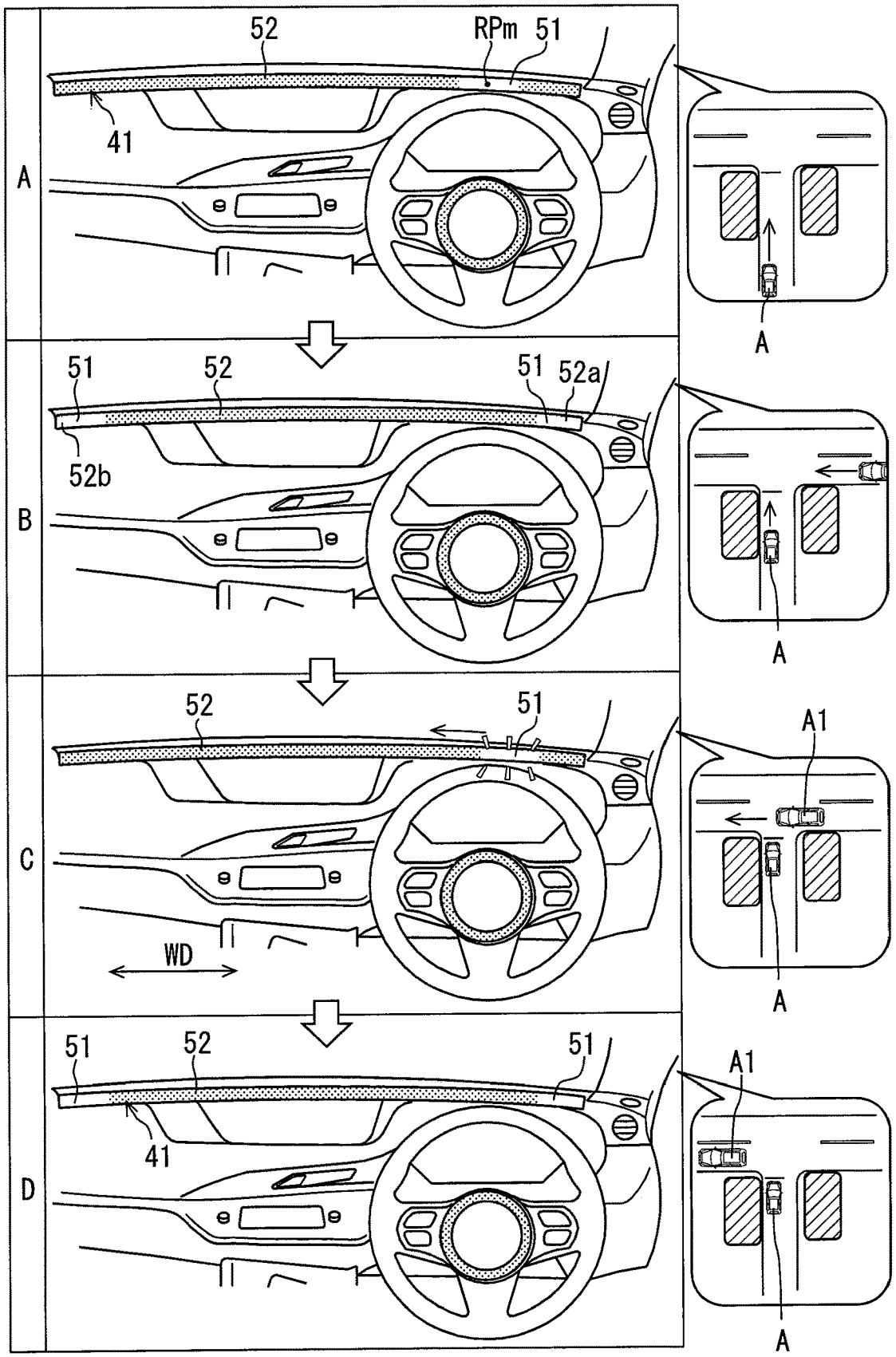
FIG. 20 is a view sequentially illustrating operations of an instrument panel light emission line in a risk target warning mode.

A scene illustrated in FIG. 20 shows the self-vehicle A in the inoperative state of the driving assist function, and arriving at a blind intersection as a result of a driving operation by the driver. While the self-vehicle A is traveling under the driving operation by the driver, the light emission spot 51 is displayed at the reference position RPm located in front of the driver in the linear light emission area 52 (see A of FIG. 20).

The stationary risk level based on the map information rises as the self-vehicle A approaches the blind intersection. In this case, the light emission control mode is switched from the state notification mode to the risk target warning mode. In this case, the risk level on the left and right sides of an expected stop position of the self-vehicle A rises with approach toward the blind intersection where objects blocking the field of vision of the driver are located on the left and right sides. Accordingly, the light emission spots 51 are displayed at both the ends 52a and 52b of the linear light emission area 52 to give a warning about blindness of the left and right sides (see B of FIG. 20). The state notification mode switches to the risk target warning mode several seconds (about 3 to 5 seconds) before arrival of the self-vehicle A at the expected stop position. The light emission spots 51 are displayed in an emission color of green, for example, to notify the driver about a substantially middle risk level.

When position information about a different vehicle A1 entering the intersection is acquired based on information output from the external recognition system 90 or the V2X communicator 96 (see FIG. 2), the different vehicle A1 becomes a risk target as a combination of a stationary risk caused by the blocking object, and a dynamic risk caused by approach to the self-vehicle A. In this case, a risk level calculated for the risk target of the different vehicle A1 having multiple risks is higher than the risk level for the risk target of the blind intersection. As a result, the left and right light emission spots 51 turned on to attract attention of the driver to the blind intersection are turned off, while the light emission spot 51 for the warning about the different vehicle A1 is turned on (see C of FIG. 20). The light emission spot 51 for the warning about the different vehicle A1 is displayed in an emission color of red, for example, to expressly notify the driver about the high level of the risk.

The light emission spot 51 for the warning about the different vehicle A1 may be shifted in the linear light emission area 52 in accordance with a shift of the different vehicle A1. More specifically, the light emission spot 51 shifts from the vicinity of the base of the front pillar located on the right side of the driver toward the left side of the driver during a shift of the different vehicle A1 from the right to the left in front of the self-vehicle A (see C of FIG. 20).

After the different vehicle A1 passes through the front of the self-vehicle A, the different vehicle A1 is not regarded as a risk target any longer. Accordingly, the light emission spot 51 for the warning about the different vehicle A1 is turned off. Thereafter, the pair of lighting light emission spots 51 for attracting attention to the blind intersection are displayed again at both the ends 52a and 52b of the linear light emission area 52 (see D of FIG. 20).

In the scenes described above, a warning about multiple risks associated with the different vehicle A1 is given by the light emission spots 51. For example, the light emission spots are always turned on with approach to an intersection or the like in case of only issue of notification about a stationary risk. This notification causes habituation for the driver, and induces distrust by the driver considering, "no car will come even in a lighting condition again", for example. On the other hand, only notification about a dynamic risk may induce overconfidence by the driver. More specifically, the driver may make an incorrect determination, considering, "no car will come in a not-lighting condition", during no detection of a risk target. It is desirable to issue a warning about combined two types of risks of both a stationary risk and a dynamic risk to avoid such distrust and overconfidence.

Figure 21:
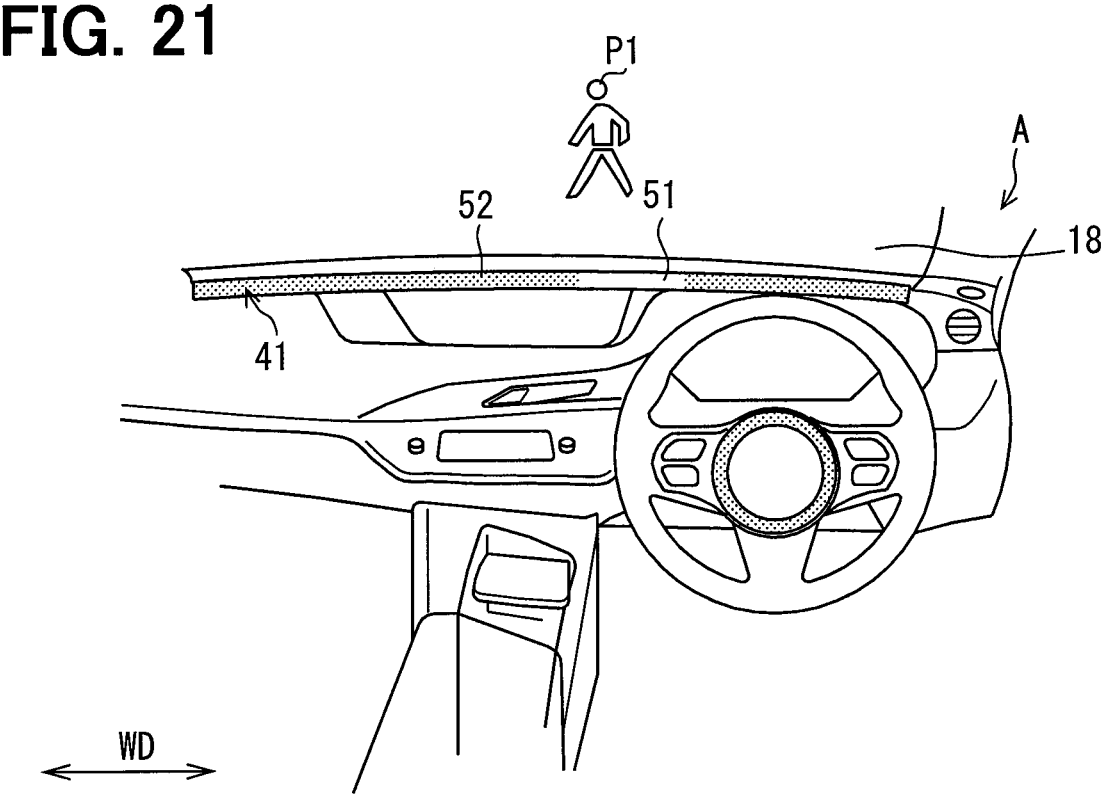
FIG. 21 is a view illustrating a light emission mode in a scene where a risk target is present inside front pillars.
Figure 22:
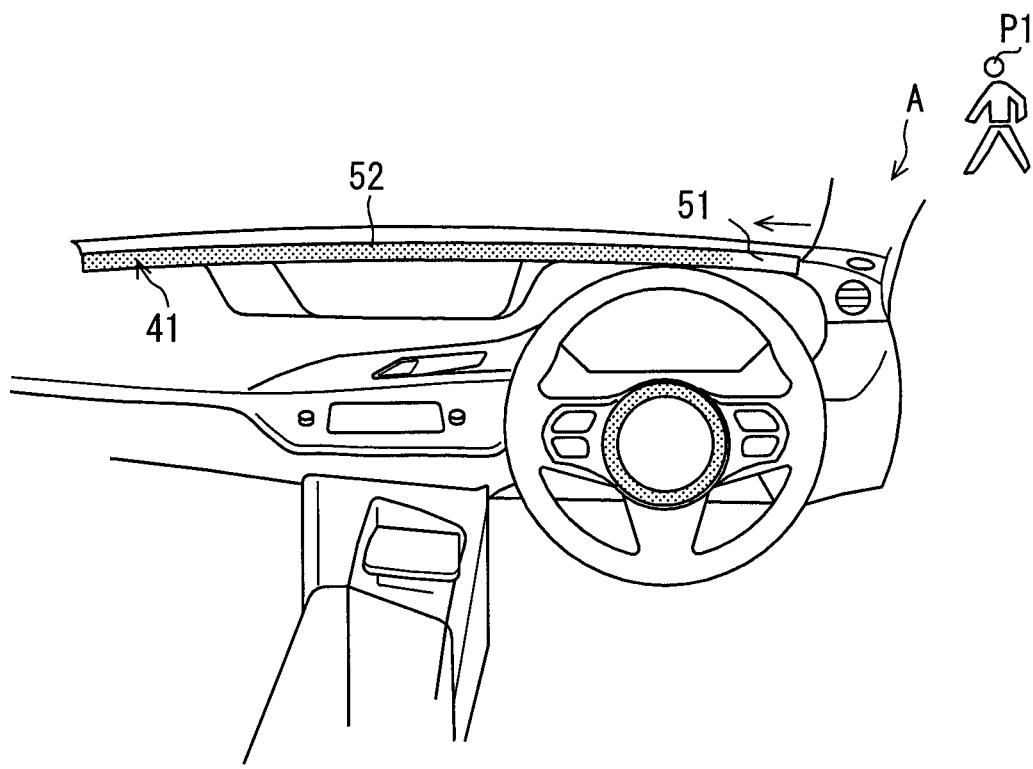
FIG. 22 is a view illustrating a light emission mode in a scene where a risk target is present outside the front pillars.

The warning mode in the risk warning mode switches in accordance with a relative position of a risk target with respect to the self-vehicle A as illustrated in FIGS. 21 and 22. A scene illustrated in FIG. 21 shows a pedestrian P1 who corresponds to a highest risk target and visible on a front scene viewed by the driver between the pair of front pillars above the linear light emission area 52 extending in the width direction WD. The instrument panel light emission line 41 displays the light emission spot 51 in a range located below the pedestrian P1 in the linear light emission area 52 as viewed from the driver. As a result, the light emission spot 51 displays the direction of the risk target as viewed from the driver.

In this case, the risk level of the pedestrian P1 rises as the pedestrian P1 and the self-vehicle A approach each other. Accordingly, the emission color of the light emission spot 51 sequentially changes in the order of yellow, amber, and red in accordance with approach of the pedestrian P1. In this case, the audio reproduction device 140 such as a speaker is not used to give a warning about the risk target in a state that the pedestrian P1 is visually recognizable through the wind shield 18.

A scene illustrated in FIG. 22 shows the pedestrian P1 visible on the front scene viewed by the driver at a position away from the portion above the linear light emission area 52. In the state that the pedestrian P1 is visible outside the pair of front pillars as in this example, the driver does not easily notice the presence of the pedestrian P1. Accordingly, the instrument panel light emission line 41 displays an animation for sliding the light emission spot 51 from the one end of the linear light emission area 52 on the side close to the pedestrian P1 toward the center of the linear light emission area 52. The light emission spot 51 may be displayed in such a mode as to slide into the linear light emission area 52 while flashing. The driver is capable of noticing animation displayed in the linear light emission area 52 within the peripheral vision range PVA (see FIG. 1). Accordingly, the visual line of the driver is guided by the instrument panel light emission line 41 toward the outside of the front pillars in accordance with movement of the light emission spot 51.

Moreover, in the state that the direction of the highest risk target viewed by the driver is located outside the range of extension of the linear light emission area 52, such as a state that the pedestrian P1 is visible outside the front pillars, a warning sound and a warning message are reproduced from a speaker or the like to give a warning about the risk target. For example, a voice message for warning the driver about the presence of the highest risk target is reproduced by the audio reproduction device 140 under control by the audio control unit 35. Accordingly, the instrument panel light emission line 41 securely attracts the visual line of the driver toward the outside of the front pillars as well through both a visual stimulus and an audio stimulus for the warning about the risk target.

Figure 23:
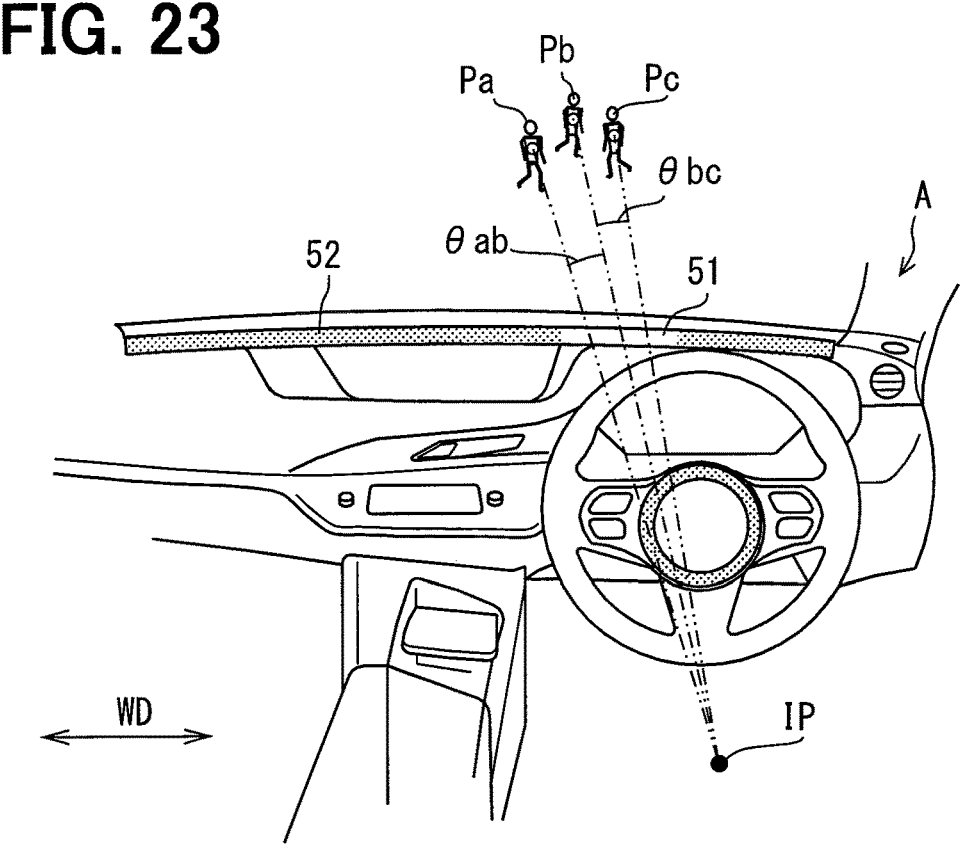
FIG. 23 is a view illustrating a light emission mode in a scene where a plurality of risk targets are located close to each other.
Figure 24:
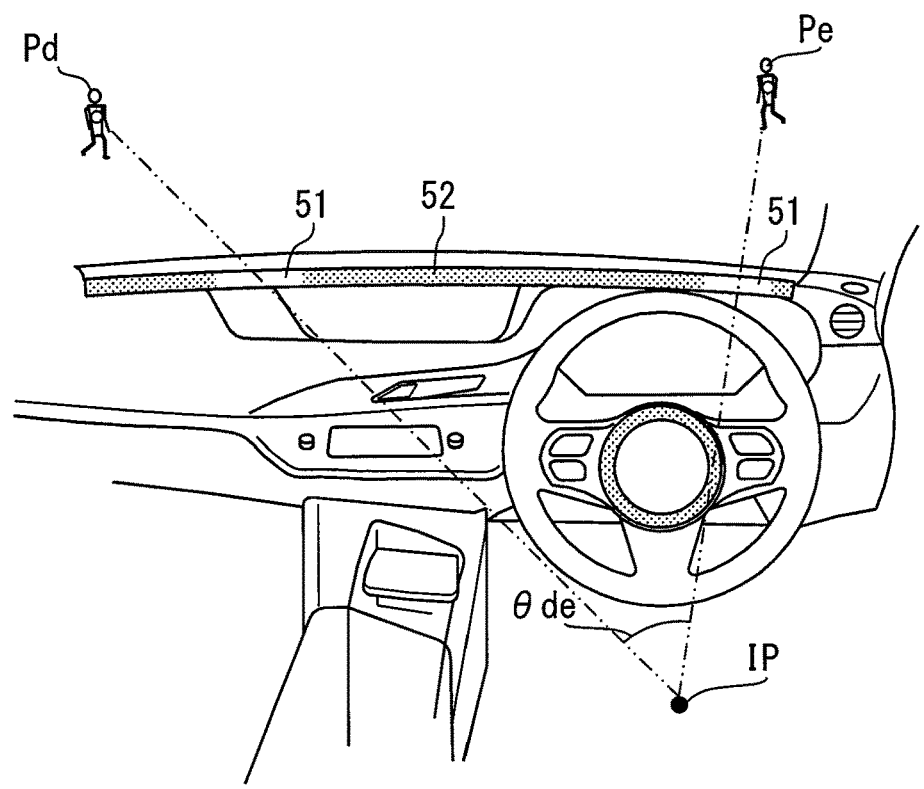
FIG. 24 is a view illustrating a light emission mode in a scene where a plurality of risk targets are located away from each other.

Each of scenes illustrated in FIGS. 23 and 24 shows presence of two or more highest risk targets indicating a highest risk level. In the scene illustrated in FIG. 23, a plurality of pedestrians Pa to Pc corresponding to the highest risk targets are located close to each other within a range defined beforehand. Accordingly, substantially an identical risk level is calculated for each of the pedestrians Pa to Pc by the risk determination unit 32. The light emission spot 51 is enlarged in the width direction WD to a size sufficient for the plurality of pedestrians Pa to Pc located close to each other, and is displayed in an emission color corresponding to the risk level of each of the pedestrians Pa to Pc.

More specifically, an eye point IP of the driver is defined beforehand in the interior of the self-vehicle A. The eye point IP indicates specific coordinates in a space assumed to contain the positions of the eyes of the driver sitting on the driver's seat 17d (see FIG. 1). Moreover, relative coordinates of the respective pedestrians Pa to Pc with respect to the self-vehicle A are acquired based on position information obtained by the external recognition system 90 or the like. The light emission control unit 34 determines the size of the light emission spot 51 based on the coordinates of the eye point IP, the coordinates of the respective pedestrians Pa to Pc, and coordinates indicating a setting range of the linear light emission area 52.

Initially, virtual lines connecting the eye point IP and each of the pedestrians Pa to Pc are defined. The virtual lines are defined substantially in parallel with the road surface on which the self-vehicle A travels. Angles, each of which is formed by a set of adjoining virtual lines included in the foregoing virtual lines, correspond to two direction differences $\theta ab$ and $\theta bc$ of the highest risk targets as viewed from the eye point IP. When each of the direction differences $\theta ab$ and $\theta bc$ is smaller than a threshold angle $\theta$ that is predetermined, the risk targets are merged into one target. In this case, a warning about the merged target is given from the one light emission spot 51, as result of determination that the merged target is present within a range defined beforehand.

Both the ends of the light emission spot 51 in the width direction WD cross the two virtual lines located on the outermost sides, and extend to the outside of the two virtual lines as viewed in the plan view of the virtual lines and the eye point IP from above. In addition, assuming that centers of gravity of the respective pedestrians Pa to Pc are defined, virtual lines extending from the eye point IP toward coordinates of the centers of gravity virtually cross the center point of the light emission spot 51. Accordingly, by enlargement of the size of the light emission spot 51 in the width direction WD in this manner, the one light emission spot 51 achieves a collective warning about the plurality of pedestrians Pa to Pc on the front scene viewed by the driver.

A scene illustrated in FIG. 24 shows two pedestrians Pd and Pe both determined as highest risk targets and located at positions away from each other as viewed from the driver. When distances to the respective pedestrians Pd and Pe from the self-vehicle A are substantially equivalent, a substantially identical risk level is calculated for each of the pedestrians Pd and Pe. When a direction difference Ode formed by two virtual lines connecting the eye point IP and each of the pedestrians Pd and Pe is larger than the threshold angle $\theta th$, the plurality of light emission spots 51 each of which indicates the direction of the corresponding pedestrian Pd or Pe are displayed in the linear light emission area 52. The display positions of the light emission spots 51 are determined with reference to a pseudo intersection at which the linear light emission area 52 virtually cross the virtual lines in the plan view of the virtual lines and the eye point IP from above.

Figure 25:
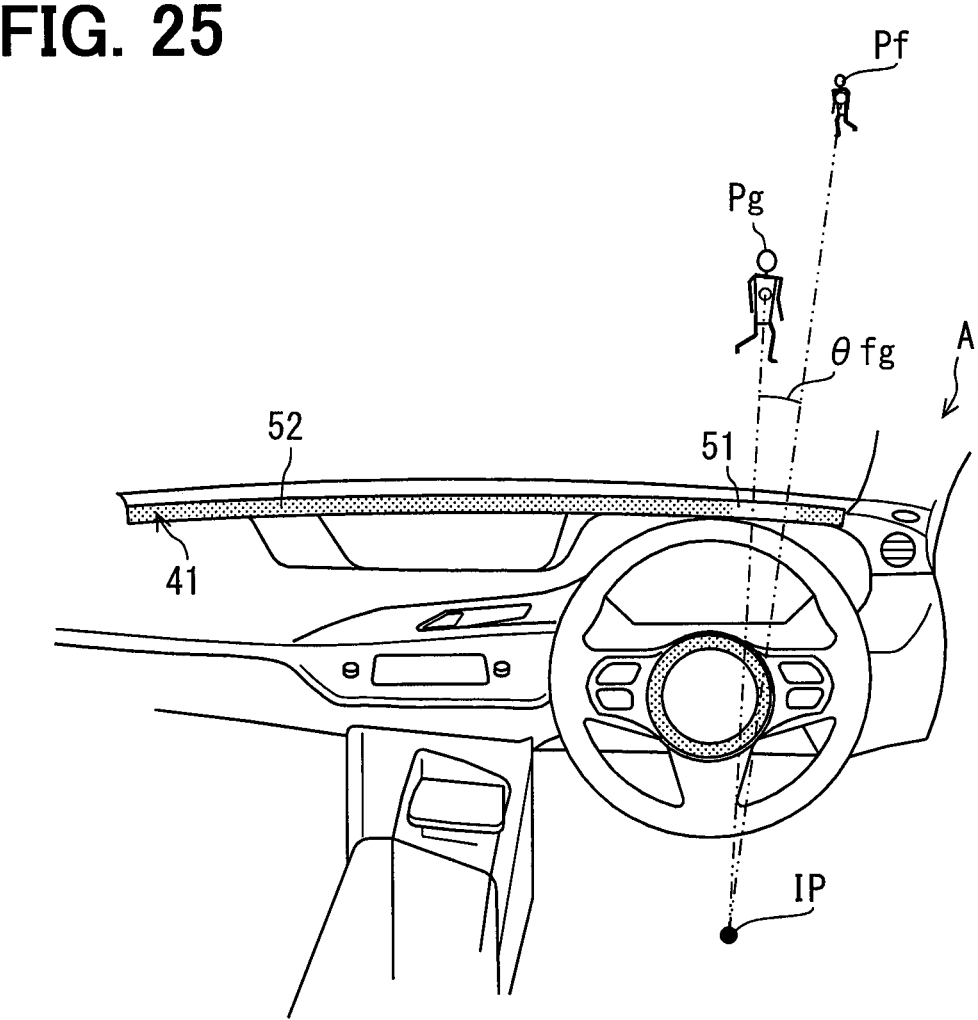
FIG. 25 is a view illustrating a light emission mode in a scene where a plurality of risk targets are present in a particular direction at different distances from the self-vehicle.

A scene illustrated in FIG. 25 shows two pedestrians Pf and Pg present as risk targets and located at different distances from the self-vehicle A. The risk level of the pedestrian Pg located closer to the self-vehicle A in this scene is higher than the risk level of the other pedestrian Pf. Accordingly, the one light emission spot 51 for a warning about the one pedestrian Pg corresponding to the highest risk target is displayed in the linear light emission area 52.

However, in such a case that a direction difference $\theta fg$ formed by two virtual lines connecting the eye point IP and the pedestrians Pf and Pg is smaller than the threshold angle $\theta th$, the light emission spot 51 is allowed to indicate a collective warning about the two pedestrians Pf and Pg. As apparent from above, the light emission spot 51 for a warning about a highest risk target may also perform a secondary function for a warning about another risk target. In this case, the emission color of the instrument panel light emission line 41 is determined based on the risk level calculated for the pedestrian Pg.

Described hereinafter with reference to FIGS. 26 to 32 in conjunction with FIG. 5 is a transition of the display mode of the instrument panel light emission line 41 in case of presence of a plurality of risk targets detected at different timing, and switching a risk target corresponding to a warning target by the light emission spot 51 to a different risk target. In the following description, for convenience, the light emission spot 51 initially displayed and indicating a direction of a highest risk target is referred to as a "first light emission spot 51a", while the light emission spot 51 displayed at a position different from the position of the first light emission spot 51a is referred to as a "second light emission spot 51b". The second light emission spot 51b indicates a direction of a near highest risk target at a highest risk level in the risk targets except for the highest risk target.

Figure 26:
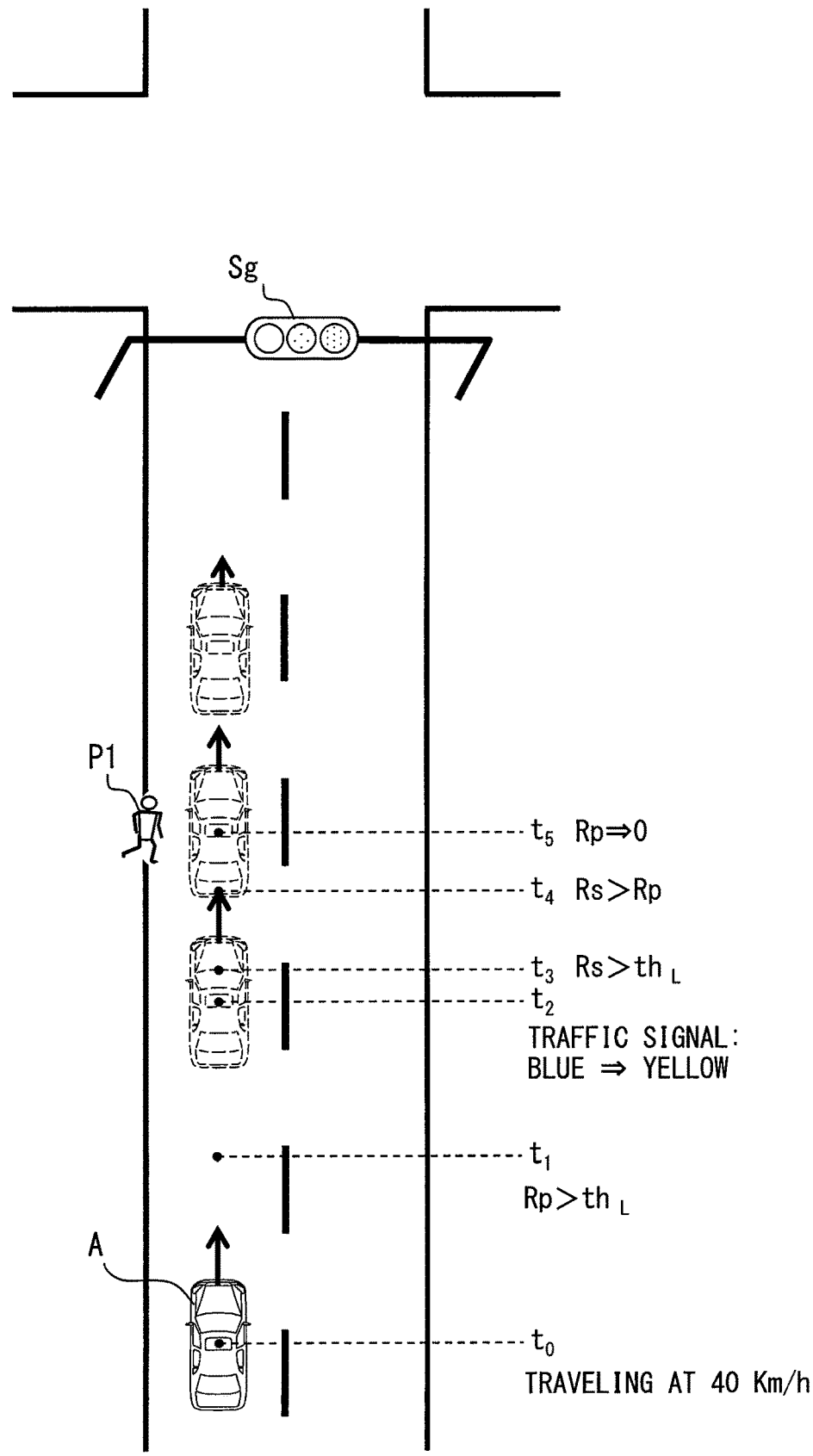
FIG. 26 is a view illustrating an example of a scene where a plurality of risk targets are detected with a time lag.
Figure 27:
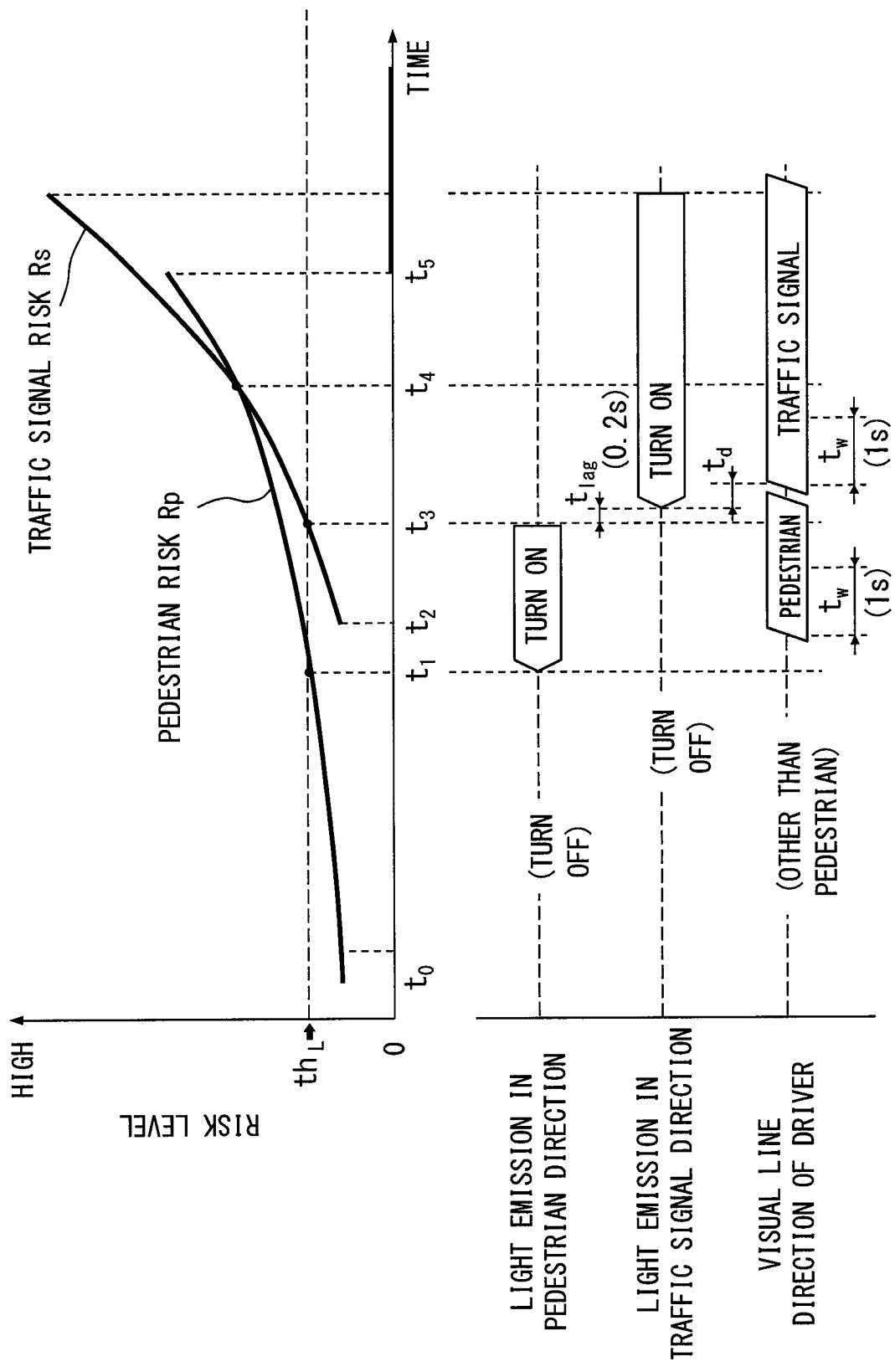
FIG. 27 is a view showing a transition of risk levels of the respective risk targets, a transition of the display position of the light emission spot, and a transition of the visual line of the driver in time series in the scene illustrated in FIG. 26.
Figure 28:
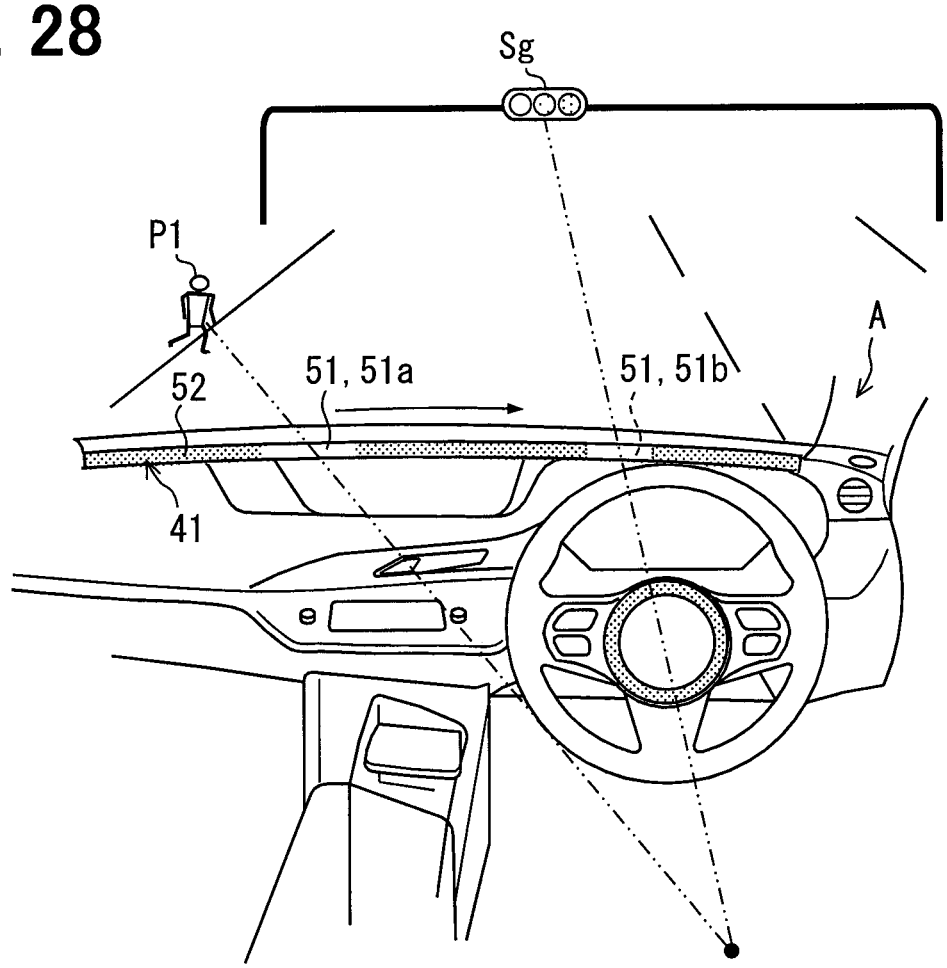
FIG. 28 is a view illustrating a situation in a traveling direction as viewed from the driver, and display of the instrument panel light emission line in the scene illustrated in FIG. 26.

In a scene illustrated in FIGS. 26 to 28, the self-vehicle A approaches an intersection provided with a traffic signal Sg, while passing through the side of the pedestrian P1. The traffic signal Sg is switched from blue to yellow, and further to red while the self-vehicle A is passing through the side of the pedestrian P1. For example, when the self-vehicle A traveling at approximately 40 kilometers per hour ($t_0$) approaches the pedestrian P1, a risk level Rp calculated for the pedestrian P1 exceeds the threshold $th_L$ ($t_1$). In this case, the first light emission spot 51a is displayed in a range indicating the direction of the pedestrian P1 in the linear light emission area 52, based on the state that the risk level Rp of the pedestrian P1 has exceeded the threshold $th_L$.

The visual line of the driver is guided by the first light emission spot 51a toward the pedestrian P1. The light emission control unit 34 determines that the driver has observed the pedestrian P1, based on a state that the visual line of the driver has been directed to the highest risk target (pedestrian P1) continuously for a predetermined time (e.g., approximately 1.0 seconds to 1.5 seconds) with reference to visual line information.

On the other hand, the traffic signal Sg switches from blue to yellow ($t_2$) after the risk level Rp of the pedestrian P1 exceeds the threshold $th_L$. As a result, a risk level Rs of the traffic signal Sg is calculated based on detection of the traffic signal Sg as a risk target. With approach of the self-vehicle A toward the intersection, the risk level Rs of the traffic signal Sg exceeds the threshold $th_L$ ($t_3$). As a result, the traffic signal Sg is selected as a near highest risk target. In case of determination that the pedestrian P1 has been observed by the driver, the risk target corresponding to a warning target by the light emission spot 51 is switched from the pedestrian P1 corresponding to the highest risk target to the traffic signal Sg corresponding to the near highest risk target.

Accordingly, display of the first light emission spot 51a for the warning about the pedestrian P1 is suspended. After the first light emission spot 51a is turned off, the light emission spot 51 shifts from the display position of the first light emission spot 51a toward the display position of the second light emission spot 51b indicating the direction of the traffic signal Sg. The visual line of the driver is guided toward the traffic signal Sg by this transition of the light emission spot 51. The shift speed of the light emission spot 51 is set to a speed perceivable by the driver in the peripheral field of vision. In addition, a time lag $t_{lag}$ (e.g., approximately 0.1 seconds to 0.3 seconds) is intentionally given between light-out of the first light emission spot 51a to a start of the transition.

The visual line of the driver is guided toward the traffic signal Sg by the second light emission spot 51b. A reaction delay $t_d$ (e.g., approximately 0.3 seconds to 1.0 second) of the driver is inevitably produced from a lighting start of the second light emission spot 51b to a shift of the visual line direction of the driver toward the traffic signal Sg. The light emission control unit 34 determines that the driver has observed the traffic signal Sg, based on a state that the visual line of the driver has been directed to the near highest risk target (traffic signal Sg) continuously for a predetermined time with reference to visual line information. Thereafter, when a risk level of a further risk target except for the pedestrian P1 and the traffic signal Sg exceeds the threshold $th_L$, the light emission spot 51 (third light emission spot) for a warning about a new risk target is displayed in the linear light emission area 52 instead of the second light emission spot 51b.

With approach of the self-vehicle A toward the intersection, the risk level Rs of the traffic signal Sg becomes higher than the risk level Rp of the pedestrian P1 ($t_4$). After the self-vehicle A passes through the side of the pedestrian P1 ($t_5$), the risk level Rp of the pedestrian P1 becomes substantially zero. Thereafter, the risk level Rp of the traffic signal Sg also becomes substantially zero when the driver stops the self-vehicle A by operating a brake pedal, for example. As a result, the second light emission spot 51b is turned off. Accordingly, in case of no detection of a new risk target at a risk level exceeding the threshold $th_L$, display of the second light emission spot 51b continues until disappearance of the near highest risk target.

The driver in the foregoing scene is guided to observe the pedestrian P1 by the first light emission spot 51a. However, when it is determined that the visual line of the driver has been directed not toward the pedestrian P1, but toward the traffic signal Sg, based on visual line information, the light emission control unit 34 may continue display of the first light emission spot 51a indicating the direction of the pedestrian P1.

There is also a case where the visual line of the driver is not guided by the first light emission spot 51a, and directed toward a position other than the pedestrian P1. In this case, the light emission control unit 34 may display the light emission spot 51 in a range to which the visual line of the driver has been directed in the linear light emission area 52 to achieve transition for shifting the visual line toward the pedestrian P1.

Figure 29:
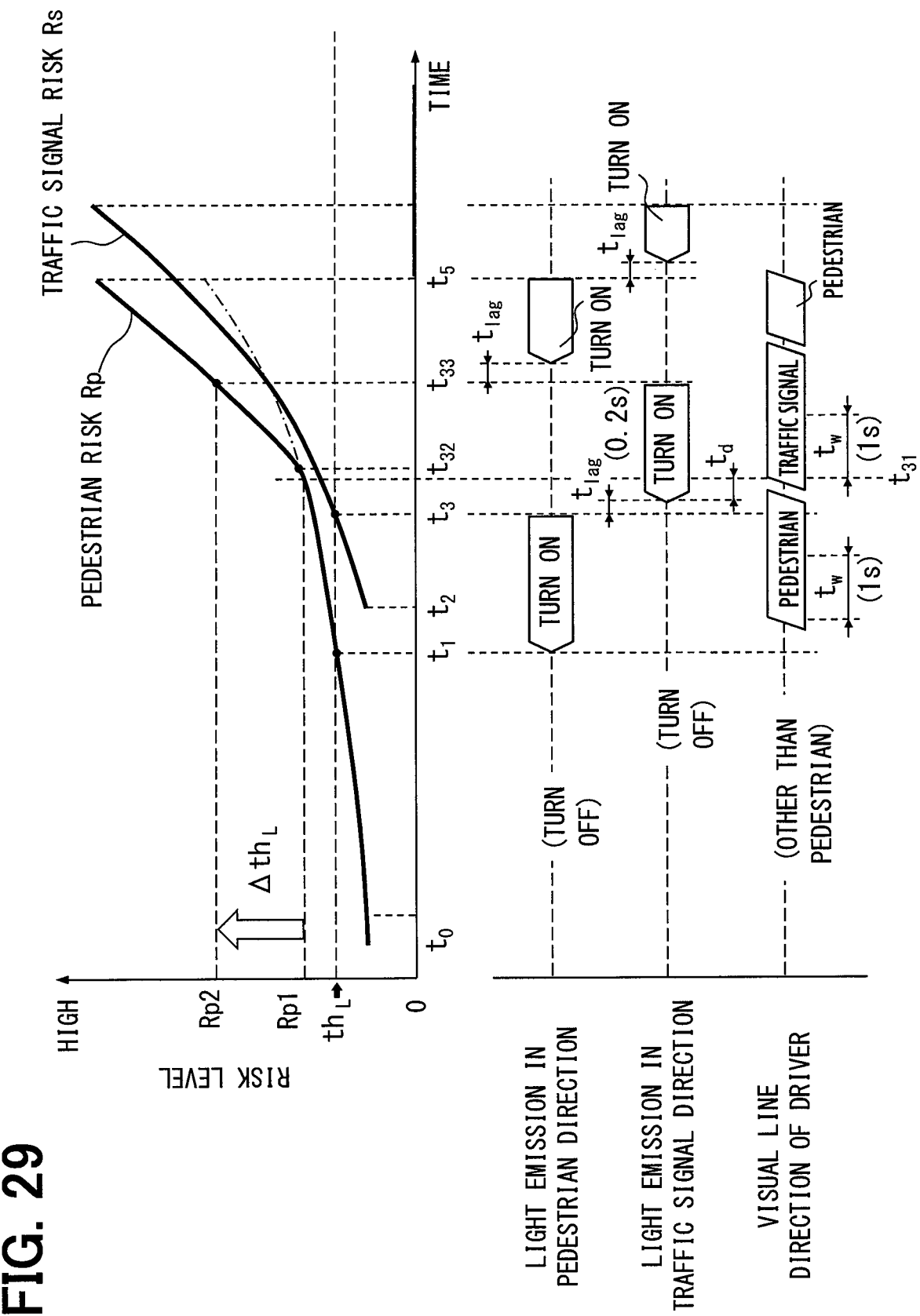
FIG. 29 is a view showing a transition of risk levels with a sharp rise of the risk level of the pedestrian, a transition of the display position of the light emission spot, and a transition of the visual line of the driver in time series in the scene illustrated in FIG. 26.

Described hereinafter with reference to FIG. 29 in conjunction with FIG. 28 is a transition of the display mode of the instrument panel light emission line 41 at the time of a rapid rise of the risk level Rp of the pedestrian P1 as a result of protrusion of the pedestrian P1 toward a roadway, for example, in the scene illustrated in FIG. 26.

The visual line of the driver is guided by the second light emission spot 51b, and directed toward the traffic signal Sg. Accordingly, the pedestrian P1 becomes an object different from an observation target for the driver ($t_{31}$). It is assumed that the risk level Rp of the pedestrian P1 rapidly rises in this state ($t_{32}$). When the rise of the risk level from a risk level Rp1 determined at a change of the visual line becomes equivalent to or larger than a threshold $\Delta th_L$ of a change amount set beforehand (Rp2, $t_{33}$), the pedestrian P1 is selected again as a risk target corresponding to a warning target by the light emission spot 51.

Accordingly, display of the second light emission spot 51b is suspended. After the second light emission spot 51b is turned off, the light emission spot 51 shifts from the display position of the second light emission spot 51b toward the display position of the first light emission spot 51a indicating the latest direction of the pedestrian P1. Accordingly, the visual line of the driver is guided toward the pedestrian P1 again.

After the self-vehicle A passes through the side of the pedestrian P1 ($t_5$), the risk level Rp of the pedestrian P1 becomes substantially zero. When the risk level Rs of the traffic signal Sg exceeds the threshold $th_L$, the second light emission spot 51b indicating the direction of the traffic signal Sg is displayed again, along with light-out of the first light emission spot 51a, to continue attraction of attention toward the traffic signal Sg. In this case, transition of the light emission spot 51 is omitted.

Figure 30:
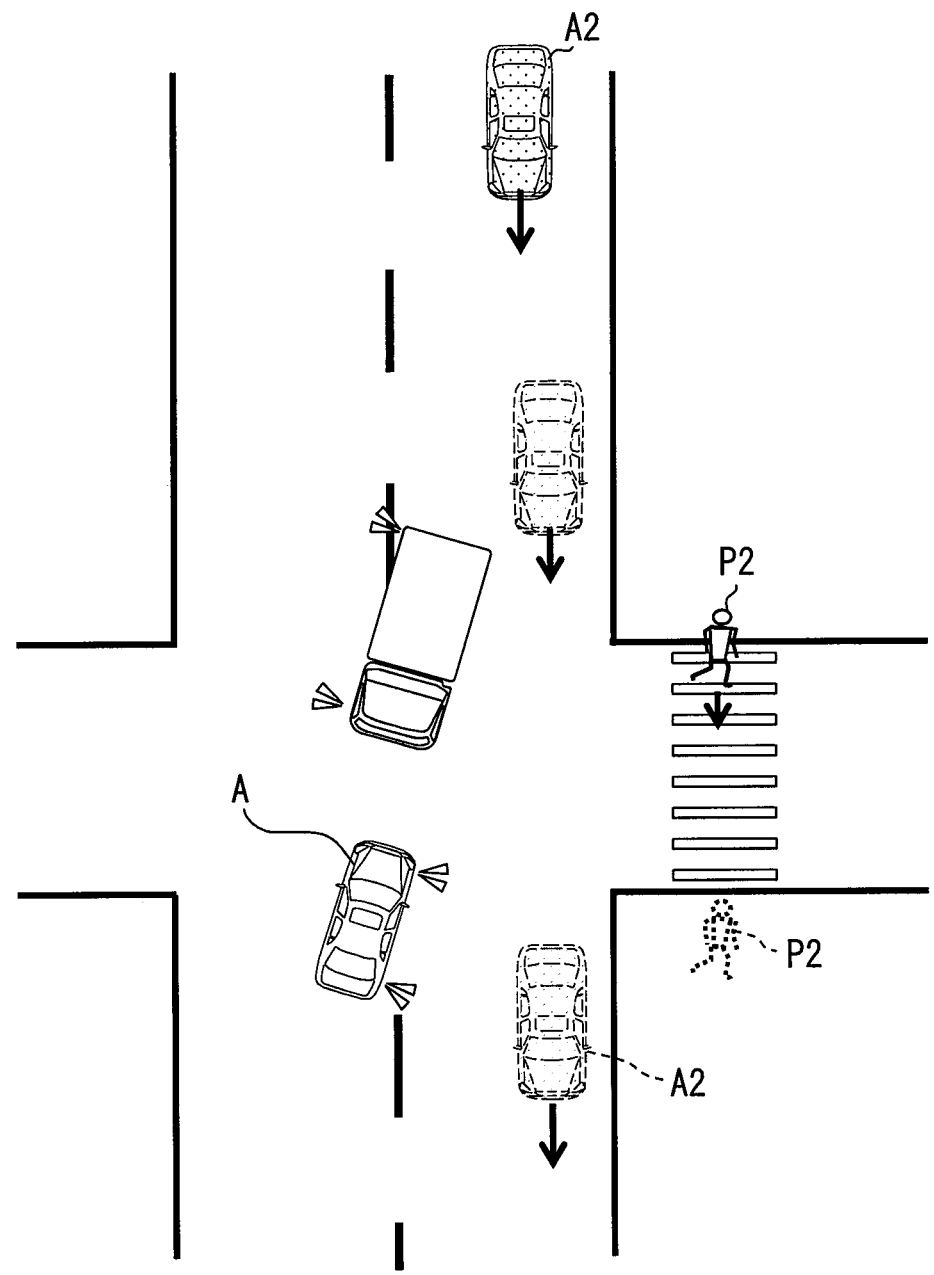
FIG. 30 is a view illustrating an example of another scene where a plurality of risk targets are detected with a time lag.
Figure 31:
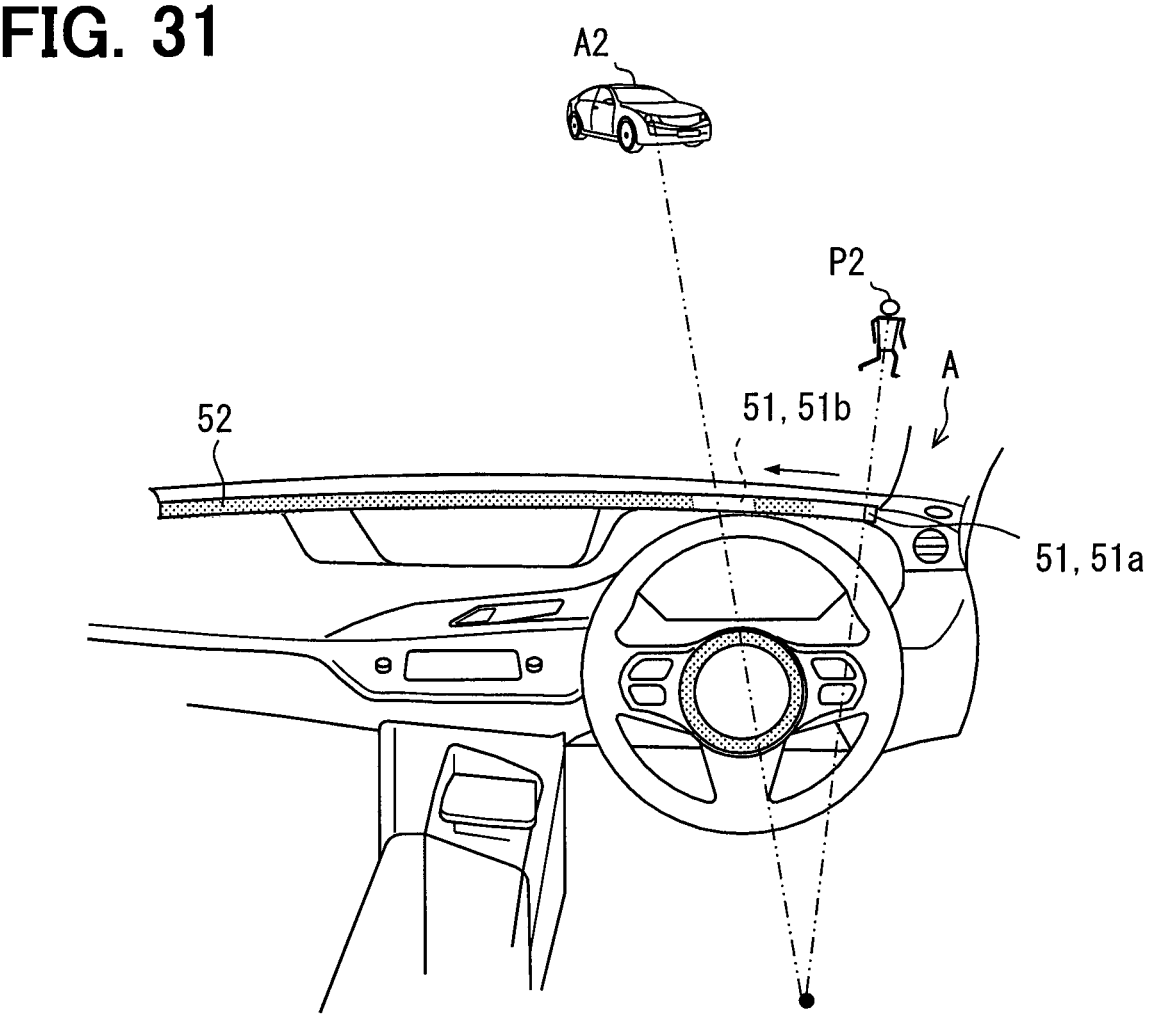
FIG. 31 is a view illustrating a situation in a traveling direction as viewed from the driver, and display of the instrument panel light emission line in the scene illustrated in FIG. 30.

Another scene illustrated in FIGS. 30 and 31 shows a pedestrian P2 crossing a crosswalk in a traveling direction of the self-vehicle A intending to turn to the right. In addition, a straight traveling oncoming vehicle A2 is approaching from the front of the self-vehicle A. The risk level Rp calculated for the crossing pedestrian P2 exceeds the threshold $th_L$ at a start of crossing the crosswalk, for example (see $t_1$ in FIG. 27). As a result, the first light emission spot 51a is displayed in a range indicating the direction of the crossing pedestrian P2 in the linear light emission area 52.

The visual line of the driver is guided by the first light emission spot 51a toward the crossing pedestrian P2. The light emission control unit 34 determines that the crossing pedestrian P2 has been observed based on visual line information indicating that the visual line of the driver has been continuously directed toward the crossing pedestrian P2 for a predetermined time. With approach of the straight traveling oncoming vehicle A2 toward the intersection, the risk level Ra of the vehicle A2 exceeds the threshold $th_L$ (see $t_3$ in FIG. 27). As a result, the straight traveling oncoming vehicle A2 is selected as a near highest risk target. In case of determination that the crossing pedestrian P2 has been observed by the driver, the risk target corresponding to the warning target by the light emission spot 51 is switched from the crossing pedestrian P2 corresponding to the highest risk target to the straight traveling oncoming vehicle A2 corresponding to the near highest risk target.

Accordingly, display of the first light emission spot 51a for the warning about the crossing pedestrian P2 is suspended. After the first light emission spot 51a is turned off, the light emission spot 51 shifts from the display position of the first light emission spot 51a toward the display position of the second light emission spot 51b indicating the direction of the straight traveling oncoming vehicle A2. The visual line of the driver is guided toward the straight traveling oncoming vehicle A2 based on this transition of the light emission spot 51. The light emission control unit 34 determines whether the straight traveling oncoming vehicle A2 has been observed based on visual line information.

With entrance of the straight traveling oncoming vehicle A2 into the intersection, the risk level Ra of the straight traveling oncoming vehicle A2 becomes higher than the risk level Rp of the crossing pedestrian P2 (see $t_4$ in FIG. 27). After the crossing pedestrian P2 passes through the crosswalk (see $t_5$ in FIG. 27), the risk level Rp of the crossing pedestrian P2 becomes substantially zero. After the straight traveling oncoming vehicle A2 subsequently passes through the intersection, the risk level Rp of the straight traveling oncoming vehicle A2 similarly becomes substantially zero. Accordingly, the second light emission spot 51b is turned off.

Figure 32:
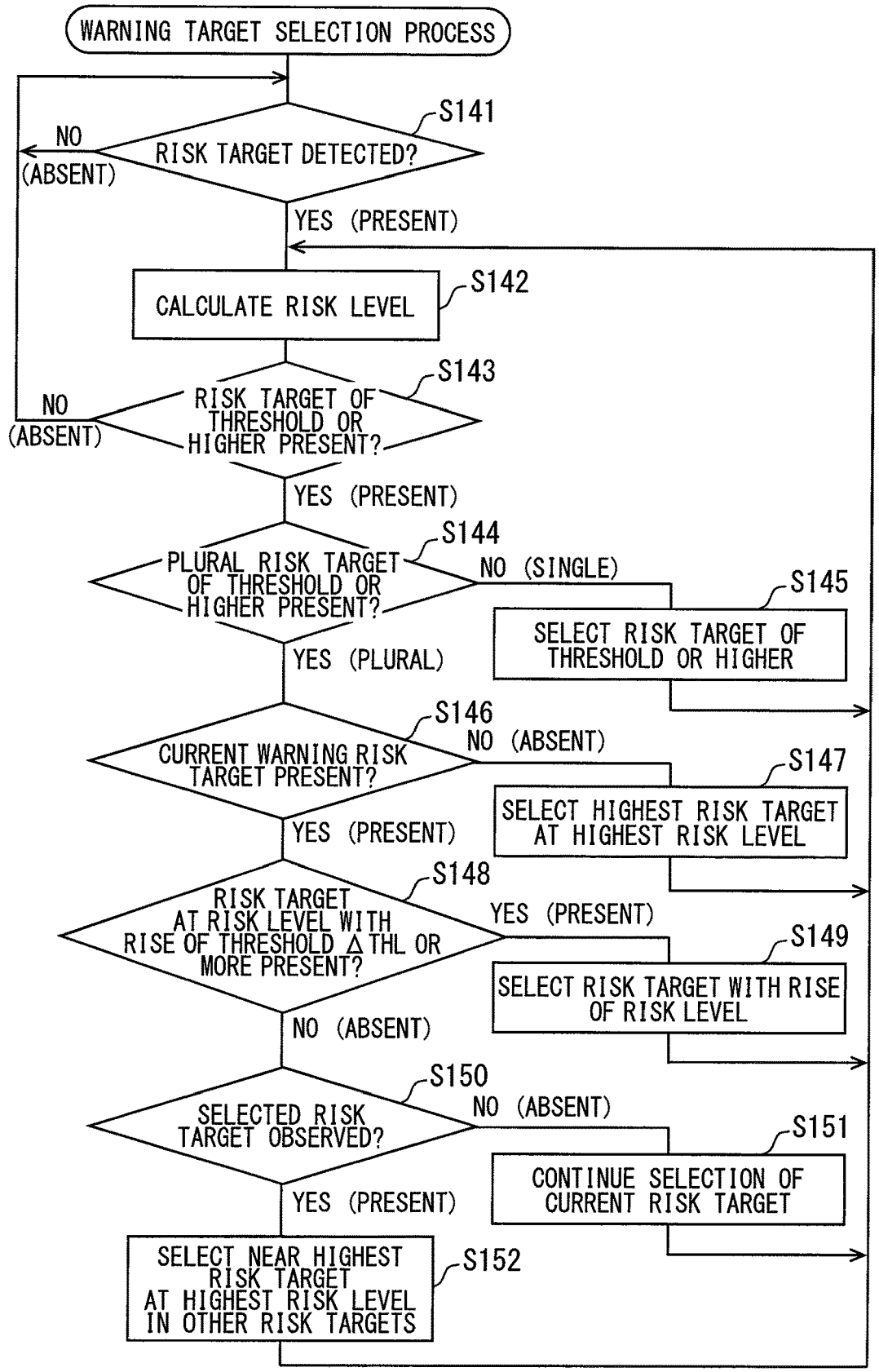
FIG. 32 is a flowchart showing a warning target selection process according to a first embodiment.

Details of a warning target selection process executed by the control circuit 20a (see FIG. 2) for realizing display of the instrument panel light emission line 41 as described above are now discussed with reference to FIG. 32 in conjunction with FIGS. 28 and 31. The warning target selection process shown in FIG. 32 is repeatedly executed by the control circuit 20a in response to switching of the light emission control mode to the risk target warning mode. The warning target selection process continues until an end of the risk target warning mode.

In S141, whether a risk target has been detected is determined based on monitoring information or the like. In case of determination that a risk target has been detected in S141, the flow proceeds to S142. On the other hand, in case of determination that no risk target has been detected, the determination in S141 is repeated.

In S142, a risk level of the risk target detected in S141 is calculated. Thereafter, the flow proceeds to S143. When a plurality of risk targets are detected, a risk level of each of the plurality of risk targets is calculated.

In S143, whether a risk target at a risk level equivalent to or higher than the threshold $th_L$ is present is determined based on calculation in S142. In case of determination that a risk target at a risk level equivalent to or larger than the threshold $th_L$ is absent in S143, the flow returns to S141. On the other hand, in case of determination that a risk target at a risk level equivalent to or larger than the threshold $th_L$ is present in S143, the flow proceeds to S144.

In S144, it is determined whether a plurality of risk targets at risk levels equivalent to or larger than the threshold $th_L$ are present. In case of determination that the risk levels of the plurality of risk targets exceed the threshold $th_L$ in S144, the flow proceeds to S146. On the other hand, in case of determination that only the one risk target at a risk level equivalent to or larger than the threshold $th_L$ is present, the flow proceeds to S145.

In S145, the one risk target at the risk level equivalent to or larger than the threshold thL is selected as a warning target. Thereafter, the flow returns to S142. Accordingly, the light emission spot 51 indicating the direction of the risk target selected in S145 is displayed in the linear light emission area 52.

In S146, it is determined whether a risk target corresponding to a warning target by the light emission spot 51 is currently present. In case of determination that a risk target corresponding to a warning target by the light emission spot 51 is currently present in S146, the flow proceeds to S148. On the other hand, in case of determination that a warning about a risk target by the light emission spot 51 has not been given yet, the flow proceeds to S147.

In S147, the highest risk target at the highest risk level is selected from the plurality of risk targets. Thereafter, the flow returns to S142. When a plurality of risk targets at the highest risk level are present, the plurality of highest risk targets are selected. Accordingly, at least the one light emission spot 51 indicating the direction of the highest risk target selected in S147 (first light emission spot 51a) is displayed in the linear light emission area 52.

In S148, it is determined whether a risk target at a risk level which has risen by a change amount equivalent to or larger than a threshold $\Delta th_L$ is present in the plurality of risk targets. In case of determination that a risk target at a risk level which has risen by the threshold $\Delta th_L$ or larger is absent in S148, the flow proceeds to S150. On the other hand, in case of determination that a risk target at a risk level which has risen by the threshold $\Delta th_L$ or larger is present, the flow proceeds to S149.

In S149, the risk target at the risk level which has risen by an amount equivalent to or larger than the threshold $\Delta th_L$ is selected. Thereafter, the flow returns to S142. Accordingly, the light emission spot 51 currently displayed is turned off, while the light emission spot 51 indicating the direction of the risk target selected in S149 is newly displayed.

In S150, it is determined whether the selected risk target has been observed. In case of determination that the risk target has not been observed in S150, the flow proceeds to S151. In S151, the current risk target is continuously selected. Thereafter, the flow returns to S142. Accordingly, lighting of the light emission spot 51 is continued until the visual line of the driver is directed toward the risk target.

On the other hand, in case of determination that the selected risk target has been observed in S150, the flow proceeds to S152. In S152, a near highest risk target at a highest risk level except for the risk target corresponding to a warning target (highest risk target) is selected. Thereafter, the flow returns to S142. Accordingly, display of the light emission spot 51 (first light emission spot 51a) is ended, while the second light emission spot 51b indicating the direction of the near highest risk target risk target is displayed.

Figure 33:
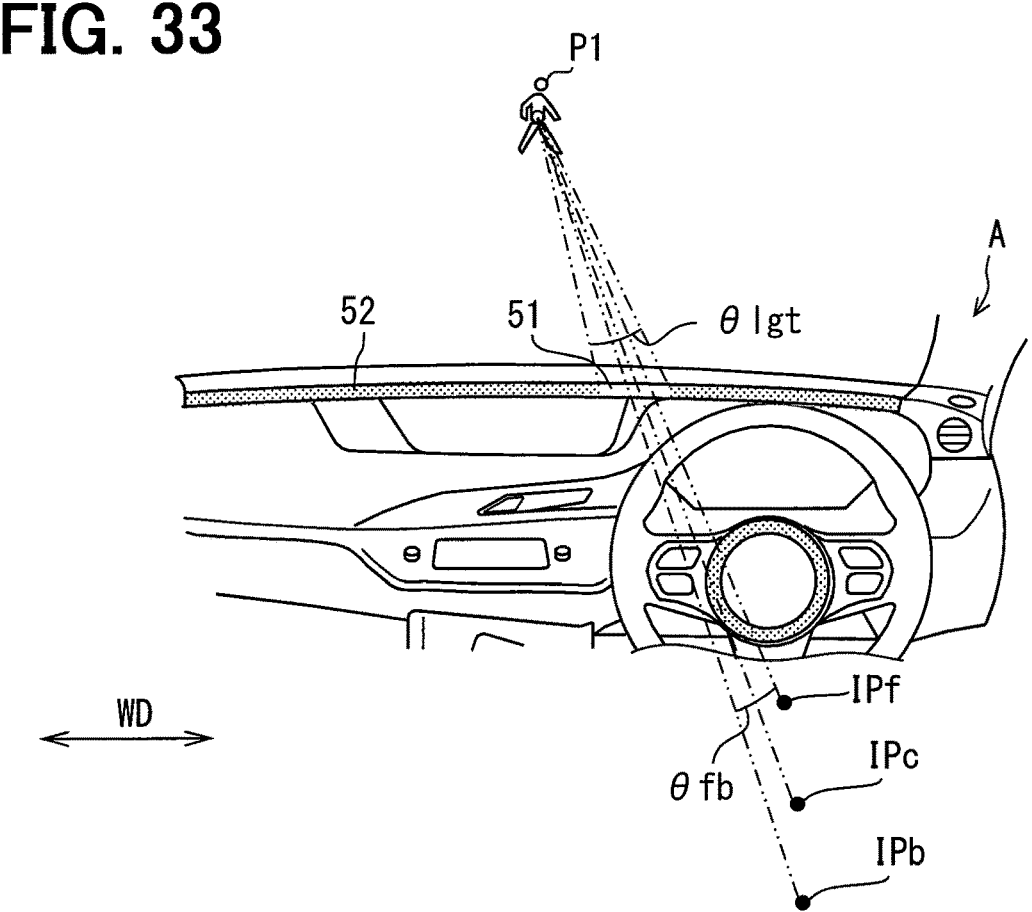
FIG. 33 is a view illustrating a method for setting the length of the light emission spot.

Described hereinafter with reference to FIG. 33 is detailed adjustment for changing the length of the light emission spot 51 in the width direction WD in accordance with a relative position of a risk target.

The length of the light emission spot 51 is adjusted by the light emission control unit 34 (see FIG. 5) in accordance with a direction of a risk target with respect to the traveling direction of the self-vehicle A, and a distance from the self-vehicle A to the risk target. More specifically, the size of the light emission spot 51 is determined such that the light emission spot 51 indicates the direction of the pedestrian P1 corresponding to the highest risk target as viewed from the driver even after a shift of the eye point IP of the driver toward the front or rear of the self-vehicle A as a result of a slide of the driver's seat 17d. In this case, not only the position of the light emission spot 51, but also the length of the light emission spot 51 are changed such that the light emission spot 51 lights below the risk target on the front scene viewed by the driver even after a change of the position of the driver's seat 17d (see FIG. 1) in the front-rear direction of the self-vehicle A.

This point is further detailed. The eye point IP described above corresponds to an eye point IPc assumed as a position of the eyes of the driver in a state that the driver's seat 17d (see FIG. 1) is located at the center of a slide range, for example. In addition to the eye point IPc, assumable beforehand are an eye point IPf in a state that the driver's seat 17d is located at a foremost position in the slide range, and an eye point IPb in a state that the driver's seat 17d is located at a rearmost position in the slide range.

Virtual lines substantially parallel with the road surface on which the self-vehicle A travels are definable between the pedestrian P1 corresponding to the risk target, and the respective eye points IPf and IPb at the foremost position and the rearmost position. A direction difference θfb formed by the two virtual lines with the pedestrian P1 located at the center of the difference indicates an amount of deviation of a visual recognition direction produced by the difference between the eye points IPf and IPb.

On the other hand, virtual lines substantially parallel with the road surface on which the self-vehicle A travels are similarly definable between the pedestrian P1 and both ends of the light emission spot 51. On the assumption that an angle formed by the two virtual lines with the pedestrian P1 located at the center of the angle is a lighting angle θlgt of the light emission spot 51, the lighting angle θlgt is set to a value larger than the direction difference θfb. In such a setting that the eye point IP of the driver is located within the range of the lighting angle θlgt, the light emission spot 51 is visible below the pedestrian P1 on the front scene of the driver. Note that the center of the light emission spot 51 in the width direction WD is determined at a virtual intersection between the linear light emission area 52 and the virtual line extending from the eye point IPc to the pedestrian P1.

According to the setting method described above, the light emission control unit 34 increases the calculated direction difference θfb and the lighting angle θlgt to enlarge the light emission spot 51 in the width direction WD in accordance with approach of the risk target toward the self-vehicle A. This adjustment of the length of the light emission spot 51 allows the light emission spot 51 to light below the risk target to notify the driver about the direction of the risk target.

Figure 34:
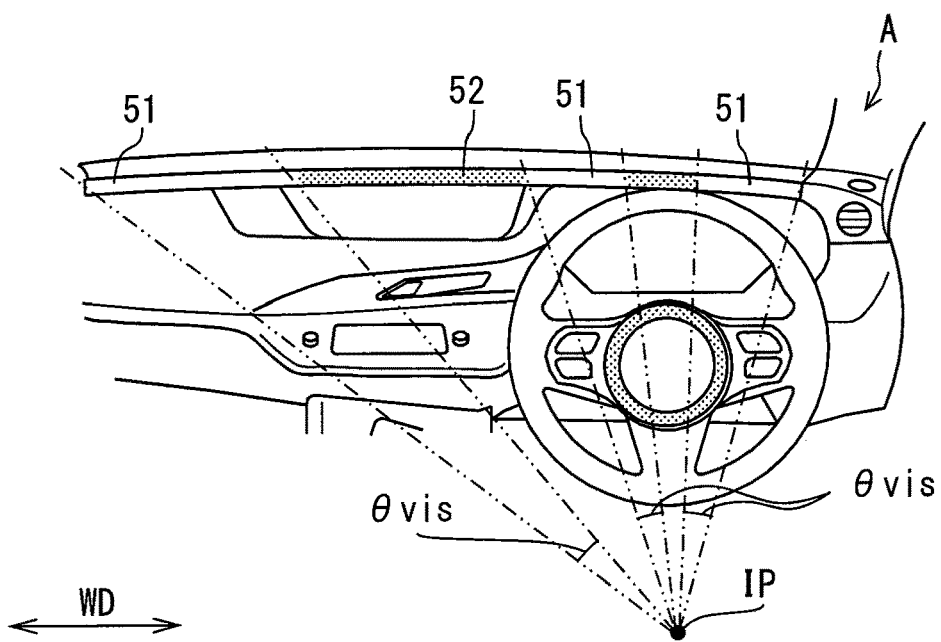
FIG. 34 is a view illustrating a method for setting the length of the light emission spot.

A method for changing the length of the light emission spot 51 in the width direction WD in accordance with the display position of the light emission spot 51 is hereinafter described with reference to FIG. 34.

The length of the light emission spot 51 increases in the width direction WD as the display position of the light emission spot 51 moves away from the driver. More specifically, on the assumption that sizes and relative positions of risk targets with respect to the self-vehicle A are substantially the same, the length of the light emission spot 51 decreases to the minimum in front of the driver, and gradually increases with a shift from the front along the linear light emission area 52. More specifically, angles θvis formed by virtual lines connecting the eye point IP and both ends of each of the light emission spots 51 displayed at respective positions in the linear light emission area 52 (hereinafter, each of the angles is referred to as "viewing angle") are substantially uniform. Each of the viewing angles θvis is set to approximately 10°, for example.

According to the setting method described above, the light emission control unit 34 enlarges the light emission spot 51 in the width direction WD by increasing the number of lighting light emitting elements in accordance with a shift of the display position of the light emission spot 51 from the front of the driver. This adjustment of the length of the light emission spot 51 allows the driver to securely notice the light emission spot 51 even when the lighting light emission spot 51 is displayed on the assistant driver's seat side located at a long distance from the driver.

According to the first embodiment described above, the HCU 100 selects a highest risk target at a highest risk level from a plurality of risk targets when the plurality of risk targets are detected by the external recognition system 90 as risk targets requiring attention of the driver. In this case, the light emission spot 51 indicating the direction of the highest risk target as viewed from the driver is displayed in the linear light emission area 52.

As described above, attention is not easily attracted toward a risk target at a relatively low risk level in the plurality of risk targets, but is attracted by the light emission spot 51 toward a risk target at a high risk level with priority. Accordingly, attention of the driver is accurately attracted by the light emission device 40 toward an important risk target even in such a scene where a plurality of risk targets are detected.

Moreover, according to the first embodiment, the second light emission spot 51b is displayed in the linear light emission area 52 as the light emission spot 51 indicating the direction of a near highest risk target after the visual line of the driver is directed toward a highest risk target. Accordingly, the light emission device 40 is capable of successively selecting one of a plurality of risk targets in the descending order of risk levels, and guiding the visual line of the driver toward the selected risk target.

In addition, according to the first embodiment, the first light emission spot 51a for a warning about a highest risk target is turned off in response to display of the second light emission spot 51b. In this case, the second light emission spot 51b becomes conspicuous. Accordingly, the visual line of the driver is securely guided from a highest risk target already observed toward a near highest risk target.

In addition, according to the first embodiment, the light emission spot 51 for a warning about a highest risk target is displayed again even after observation of the highest risk target, in response to a rapid rise of the risk level in a state that the visual line of the driver is directed away from the highest risk target. According to this control, the HCU 100 further accurately guides the visual line of the driver in accordance with a change of a situation of a risk target.

In addition, according to the first embodiment, when a new risk target at a risk level exceeding the threshold thL is not detected, display of the light emission spot 51 for warning a risk target continues until disappearance of the risk target even in a state that the current risk target has been observed by the driver. Accordingly, the driver does not misunderstand light-out of the light emission spot 51 as disappearance of the risk target even in a state that the risk target is still present.

In addition, according to the first embodiment, the instrument panel light emission line 41 achieves a transition to change the display position of the light emission spot 51 in accordance with a transition of a risk target corresponding to a warning target. According to this display of the light emission spot 51, the instrument panel light emission line 41 is capable of smoothly guiding the visual line of the driver toward a new risk target.

In addition, according to the first embodiment, display of the first light emission spot 51a continues when the visual line of the driver is guided not toward a highest risk target, but toward a near highest risk target after display of the first light emission spot 51a. Accordingly, the light emission device 40 does not attract attention of the driver toward a position different from an important highest risk target without recognition of presence of the highest risk target by the driver.

In addition, the light emission device 40 according to the first embodiment is capable of realizing display for shifting the light emission spot 51 from a position to which the visual line of the driver has been directed toward a highest risk target. Accordingly, the HCU 100 is capable of securely attracting attention of the driver toward an important risk target even in such a scene where a plurality of risk targets are detected.

In addition, according to the first embodiment, the light emission device 40 is capable of indicating each of directions of highest risk targets by displaying the plurality of light emission spots 51 in case of presence of two or more highest risk targets. According to this display, overlook of an important risk target by the driver is further securely avoidable.

In addition, according to the first embodiment, the light emission device 40 indicates a direction of collective presence of highest risk targets by enlarged display of the light emission spot 51 when a plurality of highest risk targets at a highest risk level are located close to each other. Accordingly, the light emission device 40 is capable of warning the driver about the risk targets at the high risk level in a simplified manner of display.

According to the first embodiment, the HCU 100 and the light emission device 40 correspond to an "information presentation apparatus", while the risk determination unit 32 corresponds to a "risk calculation unit". In addition, the instrument panel light emission line 41 corresponds to a "light emission display unit", the linear light emission area 52 corresponds to a "light emission area", and the external recognition system 90 corresponds to a "peripheral monitoring device".

Second Embodiment

A second embodiment is a modified example of the first embodiment. In a risk target warning mode of the second embodiment, display of the instrument panel light emission line 41 is controlled without the use of visual line information about the driver. Accordingly, the DSM 11, the wearable device 110, and the wearable communicator 97 shown in FIG. 2 are unnecessary.

Figure 35:
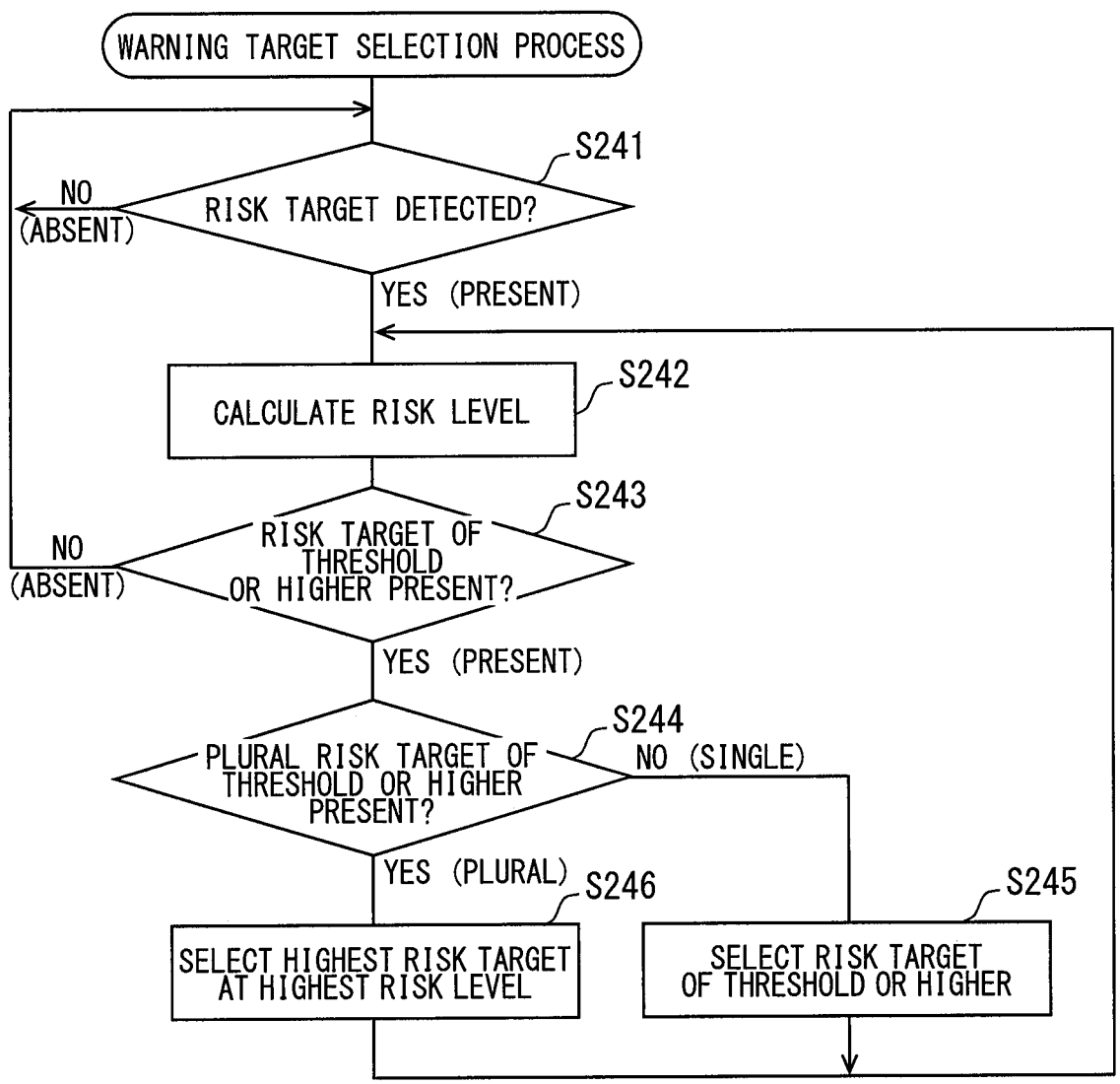
FIG. 35 is a flowchart showing a warning target selection process according to a second embodiment.

According to the configuration described above, the light emission control unit 34 (see FIG. 5) displays, in the linear light emission area 52, the light emission spot 51 indicating a direction of a highest risk target newly selected at the time of a change of a current highest risk target (see $t_4$ in FIG. 27) in a scene where a plurality of risk targets are detected. In addition, display of the light emission spot 51 indicating the direction of the risk target which does not show the highest risk level any longer is ended after display of the light emission spot 51 indicating the direction of a newly selected highest risk target. Details of a warning target selection process according to the second embodiment are hereinafter described with reference to FIG. 35 in conjunction with FIG. 1.

Contents in S241 to S244 are substantially identical to the contents in S141 to S144 in the first embodiment. In case of determination that only the one risk target at a risk level equivalent to or larger than the threshold thL is present in S244, the flow proceeds to S245. In S245, the one risk target at the risk level equivalent to or larger than the threshold thL is selected as a warning target. Thereafter, the flow returns to S242. Accordingly, the light emission spot 51 indicating the direction of the risk target selected in S245 is displayed in the linear light emission area 52.

On the other hand, in case of determination that the risk levels of the plurality of risk targets exceed the threshold thL in S244, the flow proceeds to S246. In S246, the highest risk target at the highest risk level is selected from the plurality of risk targets. Thereafter, the flow returns to S242. Accordingly, at least the one light emission spot 51 indicating the direction of the risk target selected in S246 is displayed in the linear light emission area 52.

According to the second embodiment described above, advantageous effects similar to those of the first embodiment are offered. Accordingly, attention of the driver is accurately directed toward an important risk target with priority by attraction of attention toward a risk target at a high risk level by the light emission spot 51.

In addition, according to the second embodiment, the light emission spot 51 indicating a direction of a new highest risk target is displayed in the linear light emission area 52 in case of a change of a current highest risk target. According to this display control, the light emission spot 51 is capable of accurately attracting attention of the driver toward a risk target at a high risk level even in a mode not detecting the visual line of the driver.

In addition, according to the second embodiment, display of the light emission spot 51 indicating a direction of a highest risk target ends when the risk level of the risk target lowers to a level below the highest. In this case, the necessary number of the light emission spots 51 displayed in the linear light emission area 52 is allowed to decrease to the minimum. Accordingly, the instrument panel light emission line 41 provides a display that is easily recognizable, and not disturbing for the driver.

Other Embodiments

Exemplary embodiments are not limited to the plurality of embodiments specifically described herein. The technical spirits of the present disclosure are applicable to various other embodiments and combinations.

Figure 36:
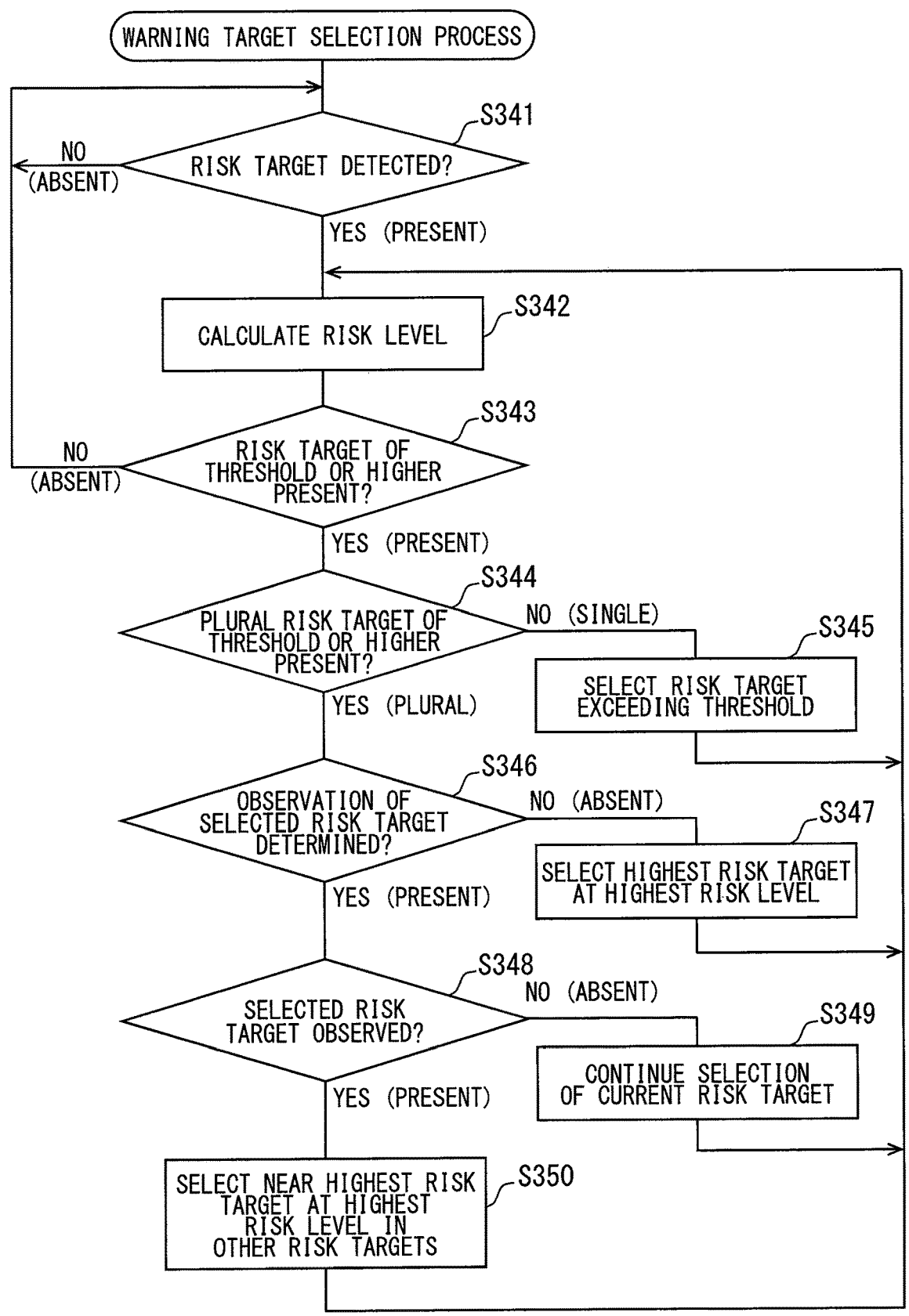
FIG. 36 is a view illustrating a first modified example of FIG. 32.

A first modified example of the first embodiment illustrated in FIG. 36 omits the process for notification with priority about a risk target at a risk level which has rapidly risen (see S148 and S149 in FIG. 32). Contents of S341 to S347 in a warning target selection process in the first modified example are substantially identical to the contents of S141 to S147 (see FIG. 32) in the first embodiment. In addition, contents of S348 to S350 are substantially identical to the contents of S150 to S152 (see FIG. 32) in the first embodiment. In the first modified example described above, an advantageous effect for accurately directing attention of the driver toward an important risk target is offered similarly to the first embodiment.

According to the embodiments, the light emission spot currently displayed is turned off in case of a change of a risk target corresponding to a warning target by the light emission spot 51, such as a change of a highest risk target, and selection of a near highest risk target after determination that the current risk target has been observed. However, the light emission spot currently displayed may be continuously turned on even after display of a new light emission spot.

The second light emission spot in the first embodiment is continuously displayed until disappearance of a near risk target in case of no detection of other risk targets. However, display of the second light emission spot may be ended based on determination that the near highest risk target has been observed by the driver.

In the risk target warning mode of each of the embodiments, attention of the driver is attracted based on transition of the light emission spot in case of a change of a risk target corresponding to a warning target. However, this transition may be omitted.

According to the first embodiment, the light emission spot displayed in the visual line direction of the driver is shifted toward a direction of a highest risk target in case of determination that the visual line of the driver is directed to a position different from the highest risk target. However, this attraction of attention toward the highest risk target may be omitted.

According to the embodiments, a plurality of the light emission spots may be displayed in case of presence of a plurality of highest risk targets. However, the risk target corresponding to a warning target by the light emission spot may be limited to one target by additional application of a selection rule for selecting a highest risk target. In addition, the light emission spot is not required to enlarge even in case of a collective warning about a plurality of highest risk targets located close to each other.

According to the embodiments, monitoring information indicating a risk target is output to the HCU not only by the external recognition system but also by the V2X communicator. However, monitoring information may be detected only by the external recognition system. In addition, when the V2X communicator is capable of functioning as a "peripheral monitoring device", a warning about a risk target may be issued only based on monitoring information acquired via road-to-vehicle communication. Furthermore, various types of stationary objects and moving objects, such as a parked vehicle, a section of lane restriction, a construction vehicle performing road construction, may be regarded as risk targets.

According to the embodiments described herein, the light emission spot is temporarily turned off before switching from the state notification mode to the other light emission control modes. However, an instrument panel light emission line in a second modified example may superimpose, on a main light emission spot, a sub light emission spot in an emission color different from the color of the main light emission spot that performs notification about the state while displaying the main light emission spot at the reference position. In this case, the instrument panel light emission line shifts the sub light emission spot to the left or the right to guide the visual line of the driver. Moreover, the types of the light emission control modes set for the light emission device may be varied as appropriate. Furthermore, the priorities of the respective light emission control modes may be varied as appropriate.

Each of the reference positions RPa and RPm in the respective embodiments indicates the center position of the light emission spot 51 in a state that the self-vehicle A travels straight in the state notification mode. However, each of the reference positions may be located at any position in the light emission spot as long as the reference position defines the position of the light emission spot. For example, each of the reference positions may be disposed at the right end or the left end. Furthermore, each of the reference positions may be manually adjusted by the driver.

The light emission spot 51 in the respective embodiments is capable of changing both the emission color and the display width in accordance with the risk level. However, the emission color associated with the risk level is not limited to the range of colors from green to red as described in the respective embodiments. Moreover, the light emission spot may change only either the emission color or the display width in accordance with the risk level. Furthermore, it is difficult to greatly enlarge the light emission spot toward the right during manual driving without operation of the LKA. Accordingly, the light emission spot may have a shape asymmetrically enlarged in the left-right direction, i.e., a shape more greatly enlarged toward the left of the reference position than toward the right of the reference position.

According to the embodiments described above, the light emission spot 51 in the linear light emission area 52 and the light emission spot 56 in the annular light emission area 57 have the same emission color. However, the light emission spots may respectively have different emission colors for light emissions. In addition, brightness of the light emission spots may be synchronously changed. On the other hand, brightness of the light emission spots may be repeatedly changed in different cycles. Furthermore, while synchronous information presentation by the instrument panel light emission line 41 and the steer light emission ring 42 is realized in the embodiments, only the instrument panel light emission line 41 may be used to present operation information about the driving assist device to the occupants without use of the steer light emission ring 42.

According to the embodiments, the light emission spot 56 in the annular light emission area 57 is turned off so as not to disturb attraction of attention from the driver by the light emission spot 51 in the linear light emission area 52. However, the light emission spot on the steering may be turned on even during the light emission control mode for attracting attention of the driver.

The instrument panel light emission line 41 in the embodiments forms the linear light emission area 52 extending in the horizontal direction above the combination meter 12a and the CID 12b. However, the shape and position of the "light emission area" may be varied as appropriate. For example, the ends of the linear light emission area are not required to reach the bases of the respective pillars as long as the linear light emission area extends to cross the respective centers of the combination meter and the CID. Moreover, the linear light emission area may be formed below the combination meter and the CID, for example. Furthermore, the instrument panel light emission line may be a "light emission display unit" which shows a light emission spot visible for the driver, and formed as a virtual image of emission light projected on the lower edge of the wind shield and reflected on the lower edge. According to this configuration, the "light emission area" is defined at the lower edge of the wind shield. In addition, the instrument panel light emission line may be constituted by a plurality of linear light emission areas formed on the instrument panel.

Furthermore, the number and layout of many light emitting elements configuring the instrument panel light emission line 41 may be varied as necessary. In addition, the instrument panel light emission line for displaying the shiftable light emission spot may be realized by a self-emitting panel such as a band-shaped organic electroluminescence (EL) in place of the configuration of light emitting diodes.

According to the embodiments, the reference position is switched based on whether the LKA is operating. However, the driving assist function used as a trigger for switching the reference position is not limited to the LKA. The reference position may be switched based on the operation and stop of various types of functions capable of functioning as the "driving assist device".

For example, the reference position may be switched in response to automatic lane change, automatic passing or the like under the operative state of the LKA. Furthermore, the reference position may be switched based on the operation of the ACC. Alternatively, the reference position may be switched in response to an operation of completely automatic driving constantly performing all controls by the automatic driving system mounted on the vehicle.

According to the embodiments, the shift speeds of the light emission spot to the left and the right are equalized. However, the shift speeds of the light emission spot may be varied as appropriate. In a state that the shift speed of the light emission spot is excessively high, the corresponding light emission spot is visually recognized as only linear light emission in the peripheral view of the driver. Accordingly, the shift of the light emission spot is not perceivable. It is therefore preferable that the shift speed of the light emission spot is set to the maximum speed in the speed range recognizable by the driver as movement of the spot to realize attraction of attention.

Furthermore, in the light emission control modes for notification about an event, the shift speed of the light emission spot to the right may be different from the shift speed of the light emission spot to the left. In addition, the shift speed of the light emission spot during operation of the driving assist function may be different from the shift speed of the light emission spot during non-operation of the driving assist function. Moreover, the light emission spot flowing from the reference position RPm toward the left during manual operation may continuously shift to the end 52*b* without ending the shift at the end position EP.

The light emission spot in the embodiments cyclically repeats blinking to change brightness in the state notification mode. The light emission spot may be turned off in the darkest state during the blinking operation. Furthermore, brightness of the light emission spot may be changed by varying a tone (brightness) of the emission color in addition to variations of luminance, or in place of variations of luminance. Alternatively, the light emission spot may be a display which cyclically repeats expansion and contraction in the width direction WD.

The light emission spot according to the embodiments presents information about the operation state of the driving assist function, the risk level and the like to the driver. However, the information presented by the light emission spot is not limited to these items of information. For example, the instrument panel light emission line may light the light emission spot for attraction of attention in case of occurrence of abnormality of the self-vehicle A. In this case, indicators are displayed on the combination meter, the HUD device and the like as well as attraction of attention by the light emission spot. The emission color of the light emission spot is equalized with the display color of the indicators, such as blue, red, and other colors easily noticeable by the driver.

The light emission device is provided on a right-handle vehicle according to the embodiments. However, needless to say, modes for a light emission device mounted on a left-handle vehicle are also regarded as embodiments.

In the looking-aside notification mode of the embodiments, the visual line of the driver is guided toward the front by the light emission spot shifting to the center of the combination meter regardless of whether the driving assist function (device) is operating. However, the visual line of the driver may be guided to the reference position RPa at the center of the CID during operation of the driving assist device. As described above, the destination position for attraction of attention for correcting the looking-aside state may be varied in accordance with the operation of the driving assist function similarly to the reference position. In addition, the destination position may be disposed substantially at the same position as the reference position. Furthermore, the destination position in the looking-aside notification mode may be disposed in a direction to which the visual line of the driver is desired to be directed.

In the risk target warning mode according to the respective embodiments, the length of the light emission spot is changed by the plurality of adjusting methods. However, use of these adjusting methods may be omitted as necessary. Furthermore, in such a scene where a large number of highest risk targets are present, for example, the light emission spot need not follow the risk targets.

According to the embodiments, the internal risk level is determined based on the degree of carelessness of the driver. However, the determination method of the internal risk level may be changed as necessary. For example, the risk determination unit may determine the risk level of the driver, based on the degree of sleepiness of the driver, a staggering behavior of the self-vehicle A, information about other vehicles traveling around the self-vehicle A, and the like.

According to the embodiments, the functions performed by the respective processors 21 and 22 of the control circuit 20*a* may be performed by hardware and software different from the processors 21 and 22, or a combination of these hardware and software. For example, in case of a vehicle onboard network from which the HCU 100 is removed, a part or all of processes such as the reference position setting process, the light emission mode setting process, and the warning target selection process may be executed by a control circuit of a light emission device, a control circuit of a vehicle control ECU, or others.

The invention claimed is:

1. An information presentation apparatus that is mounted on a vehicle together with a peripheral monitoring device for detecting a risk target, to which a driver should pay attention, and presents information about the vehicle to the driver, the information presentation apparatus comprising:

a light emission display that is disposed on an instrument panel of the vehicle, and displays at least one light emission spot in a light emission area arranged to extend in a width direction of the vehicle;

a light emission control unit that controls, using a processor, a light emission mode of the light emission spot in the light emission area;

an information acquisition unit that acquires, using the processor, monitoring information including at least position information of the risk target detected by the peripheral monitoring device; and a risk calculation unit that calculates, using the processor, a risk level of the risk target, detected in an area along a traveling direction of the vehicle, based on the monitoring information acquired by the information acquisition unit, wherein:

in response to the peripheral monitoring device detecting a plurality of risk targets, the light emission control unit selects one of the plurality of risk targets having a highest risk level calculated by the risk calculation unit as a highest risk target, and displays the light emission spot, indicative of a direction of the highest risk target as viewed from the driver, in the light emission area;

the information acquisition unit further acquires visual line information indicative of a detected visual line direction of the driver;

in response to determining that, based on the visual line information, the detected visual line direction of the driver is directed to the highest risk target after the light emission spot has been displayed, in which the light emission spot is defined as a first light emission spot and indicative of the direction of the highest risk target in the light emission area, the light emission control unit selects another one of the plurality of risk targets having a second highest risk level as a second highest risk target, and displays a second light emission spot in the light emission area, in which the second light emission spot is indicative of a direction of the second highest risk target as viewed from the driver;

the light emission control unit finishes displaying the first light emission spot in response to displaying the second light emission spot; and in response to the highest risk level of the highest risk target increasing by an amount equal to or larger than a predetermined threshold after determining that the detected visual line direction of the driver is directed toward the second highest risk target, the light emission control unit again displays the first light emission spot indicative of the direction of the highest risk target.

2. The information presentation apparatus according to claim 1, wherein:

in response to the second light emission spot being displayed in the light emission area, the light emission display shifts the light emission spot from a display position of the first light emission spot toward a display position of the second light emission spot.

3. The information presentation apparatus according to claim 1, wherein:

in response to determining based on the visual line information that the detected visual line direction of the driver is directed to the second highest risk target, the light emission control unit continues to display the first light emission spot indicative of the direction of the highest risk target.

4. The information presentation apparatus according to claim 1, wherein:

in response to determining based on the visual line information that the detected visual line direction of the driver deviates from the highest risk target, the light emission control unit displays another light emission spot in a range of the detected visual line direction of the driver in the light emission area to transition the detected visual line direction of the driver toward the highest risk target.

5. The information presentation apparatus according to claim 1, wherein:

in response to two or more highest risk targets each having the highest risk level being disposed in the plurality of risk targets, the light emission control unit displays light emission spots, indicative of the direction of each of the two or more highest risk targets, in the light emission area.

6. The information presentation apparatus according to claim 5, wherein:

in response to a plurality of highest risk targets being disposed in a predetermined range, the light emission control unit notifies the driver about a direction where the plurality of highest risk targets are collectively disposed by displaying a light emission spot, enlarged in the width direction of the vehicle, in the light emission area.

7. The information presentation apparatus according to claim 1, wherein:

the light emission control unit shifts a position of the light emission spot in the light emission area to follow a relative positional change of the highest risk target with respect to the vehicle.

8. The information presentation apparatus according to claim 1, further comprising:

an audio control unit that warns, using the processor, the driver about a presence of the highest risk target with a sound from an audio reproduction device in response to the direction of the highest risk target as viewed from the driver deviating from an extension range of the light emission area.

9. An information presentation apparatus that is mounted on a vehicle together with a peripheral monitoring device for detecting a risk target, to which a driver should pay attention, and presents information about the vehicle to the driver, the information presentation apparatus comprising:

a light emission display that is disposed on an instrument panel of the vehicle, and displays at least one light emission spot in a light emission area arranged to extend in a width direction of the vehicle;

a light emission control unit that controls, using a processor, a light emission mode of the light emission spot in the light emission area;

an information acquisition unit that acquires, using the processor, monitoring information including at least position information of the risk target detected by the peripheral monitoring device; and a risk calculation unit that calculates, using the processor, a risk level of the risk target, detected in an area along a traveling direction of the vehicle, based on the monitoring information acquired by the information acquisition unit, wherein:

in response to the peripheral monitoring device detecting a plurality of the risk targets, the light emission control unit selects one of the plurality of risk targets having a highest risk level calculated by the risk calculation unit as a highest risk target, and displays the light emission spot, indicative of a direction of the highest risk target as viewed from the driver, in the light emission area;

the information acquisition unit further acquires visual line information indicative of a detected visual line direction of the driver;

in response to determining that, based on the visual line information, the detected visual line direction of the driver is directed to the highest risk target after the light emission spot has been displayed, in which the light emission spot is defined as a first light emission spot and indicative of the direction of the highest risk target in the light emission area, the light emission control unit selects another one of the plurality of risk targets having a second highest risk level as a second highest risk target, and displays a second light emission spot in the light emission area, in which the second light emission spot is indicative of a direction of the second highest risk target as viewed from the driver; and in response to a risk target other than the highest risk target and the second highest risk target not being detected after determining that the detected visual line direction of the driver is directed to the second highest risk target, the light emission control unit continues to display the second light emission spot until the second highest risk target disappears.

10. An information presentation apparatus that is mounted on a vehicle together with a peripheral monitoring device for detecting a risk target, to which a driver should pay attention, and presents information about the vehicle to the driver, the information presentation apparatus comprising:

a light emission display that is disposed on an instrument panel of the vehicle, and displays at least one light emission spot in a light emission area arranged to extend in a width direction of the vehicle;

a light emission control unit that controls, using a processor, a light emission mode of the light emission spot in the light emission area;

an information acquisition unit that acquires, using the processor, monitoring information including at least position information of the risk target detected by the peripheral monitoring device; and a risk calculation unit that calculates, using the processor, a risk level of the risk target, detected in an area along a traveling direction of the vehicle, based on the monitoring information acquired by the information acquisition unit, wherein:

in response to the peripheral monitoring device detecting a plurality of the risk targets, the light emission control unit selects one of the plurality of risk targets having a highest risk level calculated by the risk calculation unit as a highest risk target, and displays the light emission spot, in which the light emission spot is defined as a first light emission spot and indicative of a direction of the highest risk target as viewed from the driver, in the light emission area;

in response to the driver sliding a driver's seat, and an eye point of the driver shifting frontward or rearward, the light emission control unit sets a size of the first light emission spot to indicate the direction of the highest risk target as viewed from the driver;

the light emission control unit finishes displaying the first light emission spot in response to displaying a second light emission spot; and in response to the highest risk level of the highest risk target increasing by an amount equal to or larger than a predetermined threshold after determining that a detected visual line direction of the driver is directed toward a second highest risk target, the light emission control unit again displays the first light emission spot indicative of the direction of the highest risk target.

11. The information presentation apparatus according to claim 10, wherein:

in response to the driver sliding a driver's seat, and an eye point of the driver shifting frontward or rearward, the light emission control unit sets a size of the light emission spot to indicate the direction of the highest risk target as viewed from the driver.

12. The information presentation apparatus according to claim 10, wherein:

the information acquisition unit further acquires visual line information indicative of a detected visual line direction of the driver.

13. The information presentation apparatus according to claim 12, wherein:

in response to determining based on the visual line information that the detected visual line direction of the driver is directed to the highest risk target after displaying the light emission spot, indicative of the direction of the highest risk target defined as a first light emission spot, in the light emission area, the light emission control unit selects another one of the plurality of risk targets having a second highest risk level as a second highest risk target next to the highest risk target, and displays a second light emission spot, indicative of a direction of the second highest risk target as viewed from the driver, in the light emission area.

14. The information presentation apparatus according to claim 10, wherein:

in response to the highest risk target having the highest risk level changed to another one of the plurality of risk targets, the light emission control unit displays the light emission spot, indicative of the direction of the highest risk target newly selected, in the light emission area.

15. The information presentation apparatus according to claim 14, wherein:

in response to the light emission spot indicative of the direction of the highest risk target newly selected being displayed, the light emission control unit finishes displaying the light emission spot indicative of the direction of the one of the plurality of risk targets that previously had the highest risk level.

16. An information presentation apparatus that is mounted on a vehicle together with a peripheral monitoring device for detecting a risk target, to which a driver should pay attention, and presents information about the vehicle to the driver, the information presentation apparatus comprising:

a light emission display that is disposed on an instrument panel of the vehicle, and displays at least one light emission spot in a light emission area arranged to extend in a width direction of the vehicle;

a light emission control unit that controls, using a processor, a light emission mode of the light emission spot in the light emission area;

an information acquisition unit that acquires, using the processor, monitoring information including at least position information of the risk target detected by the peripheral monitoring device; and a risk calculation unit that calculates, using the processor, a risk level of the risk target, detected in an area along a traveling direction of the vehicle, based on the monitoring information acquired by the information acquisition unit, wherein:

in response to the peripheral monitoring device detecting a plurality of the risk targets, the light emission control unit selects one of the plurality of risk targets having a highest risk level calculated by the risk calculation unit as a highest risk target, and displays the light emission spot, indicative of a direction of the first highest risk target as viewed from the driver, in the light emission area;

in response to the driver sliding a driver's seat, and an eye point of the driver shifting frontward or rearward, the light emission control unit sets a size of the first light emission spot to indicate the direction of the first highest risk target as viewed from the driver; and in response to a risk target other than the first highest risk target and the second highest risk target not being detected after determining that a detected visual line direction of the driver is directed to the second highest risk target, the light emission control unit continues to display a second light emission spot until the second highest risk target disappears.

* * * * *